(12) United States Patent
Matsumura

(10) Patent No.: US 8,699,632 B2
(45) Date of Patent: Apr. 15, 2014

(54) OFDM RECEPTION DEVICE, OFDM RECEPTION CIRCUIT, OFDM RECEPTION METHOD, AND OFDM RECEPTION PROGRAM

(75) Inventor: Yoshinobu Matsumura, Osaka (JP)

(73) Assignee: Panasonic Corporation, Osaka (JP)

( * ) Notice: Subject to any disclaimer, the term of this patent is extended or adjusted under 35 U.S.C. 154(b) by 1 day.

(21) Appl. No.: 13/503,749

(22) PCT Filed: Sep. 15, 2011

(86) PCT No.: PCT/JP2011/005201
§ 371 (c)(1),
(2), (4) Date: Apr. 24, 2012

(87) PCT Pub. No.: WO2012/046393
PCT Pub. Date: Apr. 12, 2012

(65) Prior Publication Data
US 2012/0207250 A1 Aug. 16, 2012

(30) Foreign Application Priority Data
Oct. 5, 2010 (JP) ................................ 2010-225667

(51) Int. Cl.
H04L 27/06 (2006.01)
(52) U.S. Cl.
USPC ............................. 375/340; 370/203; 370/208
(58) Field of Classification Search
USPC ................... 370/203, 208, 338, 343; 375/340
See application file for complete search history.

(56) References Cited

U.S. PATENT DOCUMENTS

| 8,223,625 | B2* | 7/2012 | Malladi et al. ................. 370/208 |
| 2002/0038720 | A1 | 4/2002 | Kai et al. |
| 2005/0113258 | A1 | 5/2005 | Kai et al. |
| 2005/0254414 | A1* | 11/2005 | Suda et al. ..................... 370/203 |
| 2005/0259757 | A1 | 11/2005 | Wu et al. |
| 2009/0103651 | A1 | 4/2009 | Lahtonen et al. |
| 2010/0002811 | A1* | 1/2010 | Razazian et al. .............. 375/340 |
| 2011/0131464 | A1* | 6/2011 | Ko et al. ........................ 714/752 |

FOREIGN PATENT DOCUMENTS

| JP | 9-102774 | 4/1997 |
| JP | 2000-151542 | 5/2000 |
| JP | 2004-241916 | 8/2004 |
| JP | 2005-533417 | 11/2005 |

(Continued)

OTHER PUBLICATIONS

International Search Report issued Oct. 18, 2011 in International (PCT) Application No. PCT/JP2011/005201.

(Continued)

Primary Examiner — Leon-Viet Nguyen
(74) Attorney, Agent, or Firm — Wenderoth, Lind & Ponack, L.L.P.

(57) ABSTRACT

An OFDM reception device receives an OFDM symbol that includes a signal for a useful symbol duration generated based on transmission information and a signal for a guard interval duration generated based on the signal for the useful symbol duration. The OFDM reception device includes a first orthogonal transformation unit configured to perform an orthogonal transformation on the signal for the useful symbol duration, a second orthogonal transformation unit configured to perform an orthogonal transformation on the signal for the guard interval duration, and a decoding unit configured to decode the OFDM symbol in accordance with results of the orthogonal transformation by the first orthogonal transformation unit and results of the orthogonal transformation by the second orthogonal transformation unit.

18 Claims, 40 Drawing Sheets

(56) References Cited

FOREIGN PATENT DOCUMENTS

| JP | 2006-304152 | 11/2006 |
| JP | 2006-319463 | 11/2006 |
| WO | 2009/050552 | 4/2009 |
| WO | 2009/096720 | 8/2009 |

OTHER PUBLICATIONS

Draft ETSI TR 102 831 V0.10.04 (Mar. 2010) Digital Video Broadcasting (DVB); Implementation guidelines for a second generation digital terrestrial television broadcasting system (DVB-T2).

* cited by examiner

FIG. 31

| Physical subcarrier interval | Weight |
|---|---|
| 1 | 1 |
| 2 | 1/2 |
| 3 | 1/3 |
| 4 | 1/4 |
| 5 | 1/5 |

FIG. 32

| Physical subcarrier interval | Weight |
|---|---|
| 1 | 1 |
| 2 | 0.9 |
| 3 | 0.8 |
| 4 | 0.7 |
| 5 | 0.6 |

FIG. 38

| Signal | Value | Sequences (hexadecimal) CSSs1 and CSSs2 |
|---|---|---|
| S1 | 000 | 124721741D482E7B |
| | 001 | 47127421481D7B2E |
| | 010 | 217412472E7B1D48 |
| | 011 | 742147127B2E481D |
| | 100 | 1D482E7B12472174 |
| | 101 | 481D7B2E47127421 |
| | 110 | 2E7B1D4821741247 |
| | 111 | 7B2E481D74214712 |
| S2 | 0000 | 121D4748212E747B1D1248472E217B7412E247B721D174841DED48B82EDE7B8B |
| | 0001 | 4748121D747B212E48471D127B742E21147B712E2748421D148B81DED7B8B2EDE |
| | 0010 | 212E747B121D47482E217B741D124847 21D1748412E247B72EDE7B8B1DED48B8 |
| | 0011 | 747B212E4748121D7B742E2148471D12748421D147B712E27B8B2EDE48B81DED |
| | 0100 | 1D1248472E217B74121D4748212E747B1DED48B82EDE7B8B12E247B721D17484 |
| | 0101 | 48471D127B742E214748121D747B212E48B81DED7B8B2EDE47B712E2748421D1 |
| | 0110 | 2E217B741D124847212E747B121D47482EDE7B8B1DED48B821D1748412E247B7 |
| | 0111 | 7B742E2148471D12747B212E4748121D7B8B2EDE48B81DED748421D147B712E2 |
| | 1000 | 12E247B721D174841DED48B82EDE7B8B121D4748212E747B1D1248472E217B74 |
| | 1001 | 47B712E2748421D148B81DED7B8B2EDE4748121D747B212E48471D127B742E21 |
| | 1010 | 21D1748412E247B72EDE7B8B1DED48B8212E747B121D47482E217B741D124847 |
| | 1011 | 748421D147B712E27B8B2EDE48B81DED747B212E4748121D7B742E2148471D12 |
| | 1100 | 1DED48B82EDE7B8B12E247B721D174841D1248472E217B74121D4748212E747B |
| | 1101 | 48B81DED7B8B2EDE47B712E2748421D148471D127B742E214748121D747B212E |
| | 1110 | 2EDE7B8B1DED48B821D1748412E247B72E217B741D124847212E747B121D4748 |
| | 1111 | 7B8B2EDE48B81DED748421D147B712E27B742E2148471D12747B212E4748121D |

FIG. 39

| Modulation sequence | Position of active carriers in P1 symbol k(0)...k(383) | | | | | | | | | | |
|---|---|---|---|---|---|---|---|---|---|---|---|
| k(0)...k(63) CSS_S1 | 44 | 45 | 47 | 51 | 54 | 59 | 62 | 64 | 65 | 66 | 70 | 75 | 78 | 80 | 81 | 82 | 84 | 85 | 87 | 88 | 89 | 90 |
| | 94 | 96 | 97 | 98 | 102 | 107 | 110 | 112 | 113 | 114 | 116 | 117 | 119 | 120 | 121 | 122 | 124 |
| | 125 | 127 | 131 | 132 | 133 | 135 | 136 | 137 | 138 | 142 | 144 | 145 | 146 | 148 | 149 | 151 |
| | 152 | 153 | 154 | 158 | 160 | 161 | 162 | 166 | 171 |
| k(64)...k(319) CSS_S2 | 172 173 175 179 182 187 190 192 193 194 198 203 206 208 209 210 |
| | 212 213 215 216 217 218 222 224 225 226 230 235 238 240 241 242 |
| | 244 245 247 248 249 250 252 253 255 259 260 261 263 264 265 266 |
| | 270 272 273 274 276 277 279 280 281 282 286 288 289 290 294 299 |
| | 300 301 303 307 310 315 318 320 321 322 326 331 334 336 337 338 |
| | 340 341 343 344 345 346 350 352 353 354 358 363 364 365 367 371 |
| | 374 379 382 384 385 386 390 395 396 397 399 403 406 411 412 413 |
| | 415 419 420 421 423 424 425 426 428 429 431 435 438 443 446 448 |
| | 449 450 454 459 462 464 465 466 468 469 471 472 473 474 478 480 |
| | 481 482 486 491 494 496 497 498 500 501 503 504 505 506 508 509 |
| | 511 515 516 517 519 520 521 522 526 528 529 530 532 533 535 536 |
| | 537 538 542 544 545 546 550 555 558 560 561 562 564 565 567 568 |
| | 569 570 572 573 575 579 580 581 583 584 585 586 588 589 591 595 |
| | 598 603 604 605 607 611 612 613 615 616 617 618 622 624 625 626 |
| | 628 629 631 632 633 634 636 637 639 643 644 645 647 648 649 650 |
| | 654 656 657 658 660 661 663 664 665 666 670 672 673 674 678 683 |
| k(320)...k(383) CSS_S1 | 684 689 692 696 698 699 701 702 703 704 706 707 708 |
| | 712 714 715 717 718 719 720 722 723 725 726 727 729 |
| | 733 734 735 736 738 739 740 744 746 747 748 753 756 |
| | 760 762 763 765 766 767 768 770 771 772 776 778 779 |
| | 780 785 788 792 794 795 796 801 805 806 807 809 |

FIG. 40

| | FFT size | Guard interval ratio | | | | | | |
|---|---|---|---|---|---|---|---|---|
| | | 1/128 | 1/32 | 1/16 | 19/256 | 1/8 | 19/128 | 1/4 |
| | 32k | PP7 | PP4<br>PP6 | PP2<br>PP8<br>PP4 | PP2<br>PP8<br>PP4 | PP2<br>PP8 | PP2<br>PP8 | NA |
| | 16k | PP7 | PP7<br>PP4<br>PP6 | PP2<br>PP8<br>PP4<br>PP5 | PP2<br>PP8<br>PP4<br>PP5 | PP2<br>PP3<br>PP8 | PP2<br>PP3<br>PP8 | PP1<br>PP8 |
| | 8k | PP7 | PP7<br>PP4 | PP8<br>PP4<br>PP5 | PP8<br>PP4<br>PP5 | PP2<br>PP3<br>PP8 | PP2<br>PP3<br>PP8 | PP1<br>PP8 |
| | 4k, 2k | NA | PP7<br>PP4 | PP4<br>PP5 | NA | PP2<br>PP3 | NA | PP1 |
| SISO | 1k | NA | NA | PP4<br>PP5 | NA | PP2<br>PP3 | NA | PP1 |
| | FFT size | Guard interval ratio | | | | | | |
| | | 1/128 | 1/32 | 1/16 | 19/256 | 1/8 | 19/128 | 1/4 |
| | 32k | PP8<br>PP4<br>PP6 | PP8<br>PP4 | PP2<br>PP8 | PP2<br>PP8 | NA | NA | NA |
| | 16k | PP8<br>PP4<br>PP5 | PP8<br>PP4<br>PP5 | PP3<br>PP8 | PP3<br>PP8 | PP1<br>PP8 | PP1<br>PP8 | NA |
| | 8k | PP8<br>PP4<br>PP5 | PP8<br>PP4<br>PP5 | PP3<br>PP8 | PP3<br>PP8 | PP1<br>PP8 | PP1<br>PP8 | NA |
| | 4k, 2k | NA | PP4<br>PP5 | PP3 | NA | PP1 | NA | PP1 |
| MISO | 1k | NA | NA | PP3 | NA | PP1 | NA | PP1 |

FIG. 41

| FFT size | Number of P2 symbols |
|---|---|
| 1k | 16 |
| 2k | 8 |
| 4k | 4 |
| 8k | 2 |
| 16k | 1 |
| 32k | 1 |

| Physical subcarrier interval | Number of subcarriers |
|---|---|
| 1 | 192 |
| 2 | 96 |
| 3 | 23 |
| 4 | 48 |
| 5 | 24 |

OFDM RECEPTION DEVICE, OFDM RECEPTION CIRCUIT, OFDM RECEPTION METHOD, AND OFDM RECEPTION PROGRAM

TECHNICAL FIELD

The present invention relates to technology for receiving a signal transmitted by multiplexing a plurality of orthogonal subcarriers.

BACKGROUND ART

Currently, Orthogonal Frequency Division Multiplexing (OFDM) is a widely used transmission scheme that has been adopted for digital terrestrial broadcasting and a variety of other digital communications, such as IEEE 802.11a. In the OFDM method, a plurality of narrow band digital modulated signals are frequency multiplexed using a plurality of orthogonal subcarriers. OFDM is therefore an excellent transmission scheme for efficiently using frequencies.

Furthermore, in the OFDM method, one symbol duration is composed of a useful symbol duration and a guard interval duration. To provide periodicity within a symbol, a signal for a portion of the useful symbol duration is copied and inserted into the guard interval duration. This allows for elimination of the effect of interference between symbols produced by multipath interference. OFDM is therefore also highly resistant to multipath interference.

In recent years, analog television broadcasting has ceased in countries around the world, and efforts towards frequency reallocation are gaining momentum. In Europe, in addition to Standard Definition (SD) broadcasting for Digital Video Broadcasting-Terrestrial (DVB-T), a demand for High Definition (HD) service is rising. Given these circumstances, progress has been made in the standardization of DVB-T2, the second generation of European digital terrestrial broadcasting. In the DVB-T2 system, as shown in FIG. 34, DVB-T2 frames are used. A DVB-T2 frame is composed of a P1 symbol, P2 symbols, and data symbols.

First, P1 symbols are described.

A P1 symbol is set to have a Fast Fourier Transform (FFT) size of 1 k (1024). As shown in FIG. 35, a guard interval duration is provided on both sides of the useful symbol duration. Note that FIG. 35 shows a P1 symbol in the time domain. The guard intervals in a P1 symbol differ from the guard interval in the conventional Integrated Services Digital Broadcasting-Terrestrial (ISDB-T) and DVB-T standards. In a P1 symbol, a signal for 59 μs from the earlier half of the useful symbol duration is copied and inserted into the guard interval duration that is earlier than the useful symbol duration (hereinafter referred to as "earlier guard interval duration"). A signal for 53 μs from the later half of the useful symbol duration is copied and inserted into the guard interval duration that is after the useful symbol duration (hereinafter referred to as "later guard interval duration"). Furthermore, when copying and inserting, the original signal is frequency shifted by a predetermined $f_{SH}$ amount before insertion into the guard interval duration (the earlier guard interval duration or the later guard interval duration). In this case, $f_{SH}$ corresponds to one physical subcarrier interval of a P1 symbol. In other words, the signal for the earlier guard interval duration and the signal for the later guard interval duration are one P1 symbol subcarrier higher in frequency than the signal for the useful symbol duration. Note that as shown in FIG. 35, the entire useful symbol is used in the guard intervals in a P1 symbol.

As shown in FIG. 36, a P1 symbol is composed of active carriers and null carriers (unused carriers). Note that FIG. 36 shows a P1 symbol in the frequency domain.

A P1 symbol includes information (hereinafter referred to as "P1 transmission information") such as the following: information on whether the transmission format of the P2 symbols and the data symbols is Multiple-Input-Single-Output (MISO) or Single-Input-Single-Output (SISO) (hereinafter referred to as "MISO/SISO information"), information on what the FFT size of the P2 symbols and data symbols is (hereinafter referred to as "FFT size information"), information on whether Future Extension Frames (FEFs) are included (hereinafter referred to as "FEF inclusion information"), and the like. In this context, an FEF is a period for future service transmission differing from DVB-T2. An FEF is inserted between DVB-T2 frames, and a P1 symbol is located at the top of an FEF as well.

The following describes generation of a P1 symbol.

FIG. 37 shows the structure of a P1 symbol generation unit 1000 that generates a P1 symbol. The P1 symbol generation unit 1000 is provided with a sequence transformation unit 1001, a differential modulation unit 1002, a scrambling unit 1003, a CDS table generation unit 1004, a padding unit 1005, an IFFT unit 1006, and a GI adding unit 1007.

As described above, P1 transmission information is transmitted by a P1 symbol. This information is represented as a three-bit S1 signal and a four-bit S2 signal. The three-bit S1 signal and the four-bit S2 signal are input into the sequence transformation unit 1001. The sequence transformation unit 1001 stores a transform table such as the one shown in FIG. 38. By referring to the table, the sequence transformation unit 1001 transforms the three-bit S1 signal into a 64-bit sequence $CSS_{S1}$, represented by Equation 1 below, and the four-bit S2 signal into a 256-bit sequence $CSS_{S2}$, represented by Equation 2 below. The "Value" column in FIG. 38, represents the value that is input into the sequence transformation unit 1001, whereas the "Sequences (hexadecimal) $CSS_{S1}$ and $CSS_{S2}$" represent the sequences after transformation (the sequences output from the sequence transformation unit 1001). Note that in FIG. 38, for the sake of convenience, the transformed sequences $CSS_{S1}$ and $CSS_{S2}$ are represented in hexadecimal.

$$CSS_{S1} = (CSS_{S1,0}, \ldots, CSS_{S1,63}) \quad \text{Equation 1}$$

$$CSS_{S2} = (CSS_{S2,0}, \ldots, CSS_{S2,255}) \quad \text{Equation 2}$$

The sequence transformation unit 1001 uses the sequence $CSS_{S1}$ represented by Equation 1 and the sequence $CSS_{S2}$ represented by Equation 2 to construct the 384-bit signal sequence MSS_SEQ shown in Equation 3 below, outputting the signal sequence MSS_SEQ to the differential modulation unit 1002. Note that the signal sequence MSS_SEQ includes two identical S1 signals.

$$\begin{aligned}
\text{MSS\_SEQ} &= (\text{MSS\_SEQ}_0, \ldots, \text{MSS\_SEQ}_{383}) \quad \text{Equation 3}\\
&= (CSS_{S1}, CSS_{S2}, CSS_{S1})\\
&= (CSS_{S1,0}, \ldots, CSS_{S1,63}, CSS_{S2,0}, \ldots,\\
&\quad CSS_{S2,255}, CSS_{S1,0}, \ldots, CSS_{S1,63})
\end{aligned}$$

The differential modulation unit 1002 performs the differential modulation shown in Equation 4 below on the signal sequence MSS_SEQ input from the sequence transformation unit 1001 and outputs a signal sequence MSS_DIFF resulting from differential modulation to the scrambling unit 1003. The differential modulation performed by the differential modulation unit 1002 is Differential Binary Phase Shift Keying (DBPSK).

$$MSS\_DIFF = DBPSK(MSS\_SEQ) \quad \text{Equation 4}$$

Specifically, the differential modulation unit 1002 treats a reference signal $MSS\_DIFF_{-1}$ as 1, as shown in Equation 5 below, and performs differential modulation based on Equation 6 below on the signals $MSS\_SEQ_i$ (i=0, 1, . . . , 383) constituting the signal sequence MSS_SEQ input from the sequence transformation unit 1001. The differential modulation unit 1002 outputs the differentially modulated signal $MSS\_DIFF_i$ to the scrambling unit 1003.

$$MSS\_DIFF_{-1} = 1 \quad \text{Equation 5}$$

$$MSS\_DIFF_i = \begin{cases} MSS\_DIFF_{i-1} & : MSS\_SEQ_i = 0 \\ -MSS\_DIFF_{i-1} & : MSS\_SEQ_i = 1 \end{cases} \quad \text{Equation 6}$$

The scrambling unit 1003 performs the scrambling shown in Equation 7 below on the differentially modulated signal sequence MSS_DIFF from the differential modulation unit 1002 and outputs a scrambled signal sequence MSS_SCR to the padding unit 1005.

$$MSS\_SCR = SCRAMBLING(MSS\_DIFF) \quad \text{Equation 7}$$

Specifically, the scrambling unit 1003 uses a signal $PRBS_i$ (i=0, 1, . . . , 383) based on a Pseudo Random Binary Sequence (PRBS) to scramble the differentially modulated signal $MSS\_DIFF_i$ using Equation 8 below. The scrambling unit 1003 outputs a scrambled signal $MSS\_SCR_i$ to the padding unit 1005.

$$MSS\_SCR_i = MSS\_DIFF_i \times 2\left(\frac{1}{2} - PRBS_i\right) \quad \text{Equation 8}$$

The CDS table generation unit 1004 generates the Carrier Distribution Sequence (CDS) table shown in FIG. 39 to indicate the position k(i) (i=0, 1, . . . , 383) of each active carrier in a P1 symbol. Note that as shown in FIG. 39, identical S1 signals are transmitted in two positions in one P1 symbol, one in a high frequency domain and another in a low frequency domain, whereas an S2 signal is transmitted in a central frequency domain.

The padding unit 1005 treats the subcarriers at subcarrier positions k(i), as shown in the CDS table of the CDS table generation unit 1004 (see FIG. 39), as active carriers and maps the scrambled signal $MSS\_SCR_i$ onto the subcarriers at subcarrier positions k(i). The padding unit 1005 then outputs the result to the IFFT unit 1006. Furthermore, the padding unit 1005 outputs the subcarriers at subcarrier positions not listed in FIG. 39 to the IFFT unit 1006 as null carriers.

The IFFT unit 1006 performs an Inverse Fast Fourier Transform (IFFT) with an FFT size of 1 k on the signal output by the padding unit 1005. The IFFT unit 1006 then outputs the result of the IFFT (a signal in the time domain of the useful symbol duration in FIG. 35) to the GI adding unit 1007.

The GI adding unit 1007 uses the signal in the useful symbol duration input from the IFFT unit 1006 to shift the frequency of an earlier portion of the signal in the useful symbol duration by $f_{SH}$ and insert the result in the earlier guard interval duration, and also to shift the frequency of a later portion of the signal in the useful symbol duration by $f_{SH}$ and insert the result in the later guard interval duration (see FIG. 35). A P1 symbol is thus generated.

Next, P2 symbols and data symbols are described.

A shared FFT size and guard interval ratio (ratio of the time of the guard interval duration to the time of the useful symbol duration) are used in P2 symbols and data symbols. As in DVB-T and ISDB-T, the guard interval duration in P2 symbols and in data symbols is provided before the useful symbol duration. A signal for a later portion of the useful symbol duration is copied and inserted into the guard interval duration provided before the useful symbol duration.

FIG. 40 shows combinations of the FFT size and guard interval ratio used in DVB-T2, as well as pilot patterns that can be set for these combinations. There are eight types of pilot patterns, from PP1 through PP8. In FIG. 40, "N/A" indicates a combination of FFT size and guard interval ratio not supported by standards.

Pilots with equal intervals (hereinafter referred to as "P2 pilots") are inserted in P2 symbols. With an FFT size of 32 k and in SISO mode, a P2 pilot exists every six subcarriers. Otherwise, a P2 pilot exists every three subcarriers.

A P2 symbol includes any transmission parameter information necessary for reception (hereinafter referred to as "P2 transmission information") such as the following: information on what the pilot pattern of the data symbols is (hereinafter referred to as "pilot pattern information"), information on whether the carrier extension mode is extended mode or normal mode (hereinafter referred to as "transmission mode information"), the number of symbols per frame, the modulation method, the coding ratio of the Forward Error Correction (FEC) code, and the like. Note that the number of P2 symbols is set in accordance with the FFT size of the P2 symbols, as shown in FIG. 41.

Technology for demodulating P1 symbols with the above DVB-T2 transmission format includes the method described in Non-Patent Literature 1.

FIG. 42 shows the structure of a P1 demodulation unit 2000 that demodulates P1 symbols. The P1 demodulation unit 2000 includes a P1 position detection unit 2001, a P1 narrow band fc error detection and correction unit 2002, an FFT unit 2003, a CDS table generation unit 2004, a P1 wide band fc error detection and correction unit 2005, and a P1 decoding unit 2006.

The P1 position detection unit 2001 uses an input signal to calculate the correlation (guard correlation) between the signal for the guard interval duration of a P1 symbol (earlier guard interval duration and later guard interval duration) and the signal for a predetermined section of the useful symbol duration of the P1 symbol. The P1 position detection unit 2001 calculates the interval integral of the calculated correlation over the time of each guard interval duration (earlier guard interval duration, later guard interval duration) and detects the position of the P1 symbol in the input signal by detecting the peak of the interval integral.

The calculation of the correlation takes into consideration the frequency shift of $f_{SH}$ that is added at the transmitting end. The above "predetermined section" is the earlier portion within the useful symbol duration for the earlier guard interval duration and is the later portion within the useful symbol duration for the later guard interval duration (see FIG. 35). The same is true for the calculation of the correlation by the P1 narrow band fc error detection and correction unit 2002, described below. The P1 narrow band fc error detection and correction unit 2002 calculates the correlation (guard correlation) between the signal for the guard interval duration of a P1 symbol (earlier guard interval duration and later guard interval duration) and the signal for a predetermined section of the useful symbol duration of the P1 symbol. Based on the correlation, the P1 narrow band fc error detection and correction unit 2002 detects the frequency error amount (narrow band carrier frequency error amount) that is equal to or less than the subcarrier interval of the P1 symbol. Based on the detected narrow band carrier frequency error amount, the P1 narrow band fc error detection and correction unit 2002 corrects a shift for the narrow band carrier frequency of the P1 symbol and outputs the P1 symbol whose shift for the narrow band carrier frequency has been corrected to the FFT unit 2003.

The FFT unit 2003 performs an FFT with an FFT size of 1 k on the signal in the time domain of the useful symbol duration of the P1 symbol, outputting the results of the FFT (a signal in the frequency domain of the useful symbol duration of the P1 symbol) to the P1 wide band fc error detection and correction unit 2005.

The CDS table generation unit 2004 generates a sequence showing the positions of active carriers (hereinafter referred to as "active carrier arrangement sequence") and outputs the generated active carrier arrangement sequence to the P1 wide band fc error detection and correction unit 2005. The active carrier arrangement sequence is a sequence with a "1" at positions of active carriers, as shown in FIG. 39, and a "0" at other positions to indicate null carriers.

The P1 wide band fc error detection and correction unit 2005 uses the active carrier arrangement sequence input from the CDS table generation unit 2004 to detect the frequency error amount (wide band carrier frequency error amount) in units of subcarrier intervals of the P1 symbol in the signal output by the FFT unit 2003. Based on the detected wide band carrier frequency error amount, the P1 wide band fc error detection and correction unit 2005 corrects a shift for the wide band carrier frequency of the P1 symbol and outputs the active carriers in the P1 symbol whose shift for the wide band carrier frequency has been corrected to the P1 decoding unit 2006.

The following describes detection of the wide band carrier frequency error amount of the P1 symbol. As described above, subcarriers composing a P1 symbol are either active carriers or null carriers. Based on this fact, the power of each subcarrier is calculated, and the correction between the results of calculation and a known active carrier arrangement sequence (input from the CDS table generation unit 2004) is calculated while shifting the results of calculation one subcarrier at a time.

Since signals on which DBPSK has been performed are mapped to active carriers, the correlation for a shift amount at which the wide band carrier frequency error amount is zero is the sum of the power of all active carriers. This correlation is a larger value than the correlations for other shift amounts that include null carriers. Based on this fact, the shift amount yielding the largest correlation is the wide band carrier frequency error amount. It is thus possible to detect the wide band carrier frequency error amount. Note that the shift amount when there is no wide band carrier frequency error in the input signal is treated as a reference (shift amount "0") here and in the following description.

The P1 decoding unit 2006 in FIG. 42 decodes the P1 symbol based on the active carriers in the P1 symbol input from the P1 wide band fc error detection and correction unit 2005 and extracts the P1 transmission information.

The P1 decoding unit 2006 is described with reference to FIG. 43. FIG. 43 shows the structure of the P1 decoding unit 2006 in FIG. 42. The P1 decoding unit 2006 is provided with a descrambling unit 2101, a differential demodulation unit 2102, and a pattern matching unit 2103. Note that here, a P1 symbol is decoded using only the S1 signal in the low frequency domain of the P1 symbol.

A signal sequence Act of active carriers is input from the P1 wide band fc error detection and correction unit 2005 in FIG. 42 into the descrambling unit 2101. The descrambling unit 2101 performs the descrambling shown in Equation 9 below on the signal sequence Act of active carriers and outputs a descrambled signal sequence DESCR to the differential demodulation unit 2102.

$$\text{DESCR} = \text{DESCRAMBLING}(\text{Act}) \qquad \text{Equation 9}$$

Specifically, the descrambling unit 2101 uses a signal $PRBS_i$ (i=0, 1, 2, . . . , 319), based on PRBS and used for multiplication at the transmitting end, to perform the descrambling shown in Equation 10 below on a signal $Act_i$ of active carriers, outputting a descrambled signal $DESCR_i$ to the differential demodulation unit 2102.

$$DESCR_i = Act_i \times 2\left(\frac{1}{2} - PRBS_i\right) \qquad \text{Equation 10}$$

A signal $DESCR_i$ (i=0, 1, . . . , 319) is input into the differential demodulation unit 2102 from the descrambling unit 2101. The differential demodulation unit 2102 performs differential detection by complex multiplication of a signal $DESCR_i$ (i=1, 2, . . . , 319) and a signal $DESCR^*_{i-1}$, which is the complex conjugate of a signal $DESCR_{i-1}$ shifted by one active carrier. Note that the "*" suffix in superscript represents a complex conjugate (the same being true below as well). Based on the polarity of the real axis, the differential demodulation unit 2102 demodulates (hard decision) the signal $DESCR_i$, and outputs a demodulated signal $DEMOD_i$ to the pattern matching unit 2103. Processing by the differential demodulation unit 2102 is represented by Equation 11 below. The differential demodulation by the differential demodulation unit 2102 corresponds to DBPSK.

$$DEMOD_i = \begin{cases} 0: \text{real}(DESCR_i \cdot DESCR^*_{i-1}) \geq 0 \\ 1: \text{real}(DESCR_i \cdot DESCR^*_{i-1}) < 0 \end{cases} \qquad \text{Equation 11}$$

Since i=0 is a reference, the differential demodulation unit 2102 performs demodulation (hard decision) based on the polarity of the real axis of the signal $DESCR_0$, outputting a demodulated signal $DEMOD_0$ to the pattern matching unit 2103.

The pattern matching unit 2103 divides the signals $DEMOD_0$, $DEMOD_1$, . . . , $DEMOD_{319}$ differentially demodulated by the differential demodulation unit 2102 into a signal sequence $DEMOD\_CSS_{S1}$ (corresponding to the S1 signal) and a signal sequence $DEMOD\_CSS_{S2}$ (corresponding to the S2 signal), as shown in Equations 12 and 13 below.

$$\begin{aligned} DEMOD\_CSS_{S1} &= (DEMOD_0, \ldots, DEMOD_{63}) \\ &= (DEMOD\_CSS_{S1,0}, \ldots, \\ &\quad DEMOD\_CSS_{S1,63}) \end{aligned} \qquad \text{Equation 12}$$

$$\begin{aligned} DEMOD\_CSS_{S2} &= (DEMOD_{64}, \ldots, DEMOD_{319}) \\ &= (DEMOD\_CSS_{S2,0}, \ldots, \\ &\quad DEMOD\_CSS_{S2,255}) \end{aligned} \qquad \text{Equation 13}$$

To calculate which of the sequences $CSS_{S1,k}$ (k=0, 1, ..., 7) shown in FIG. 38 is the most probable, and to calculate which of the sequences $CSS_{S2,k}$ (k=0, 1, ..., 15) shown in FIG. 38 is the most probable, the pattern matching unit 2103 performs the following processing. In this context, the index k is used to differentiate the eight sequences $CSS_{S1}$ shown in FIG. 38 and to differentiate the 16 sequences $CSS_{S2}$ shown in FIG. 38 (the same being true below as well).

The pattern matching unit 2103 calculates correlations $CORR_{S1,k}$ between each sequence $CSS_{S1,k}$ in FIG. 38 and the sequence $DEMOD\_CSS_{S1}$, as shown in Equation 14 below. The pattern matching unit 2103 also calculates correlations $CORR_{S2,k}$ between each sequence $CSS_{S2,k}$ in FIG. 38 and the sequence $DEMOD\_CSS_{S2}$, as shown in Equation 15 below.

$$CORR_{S1,k} = \sum_{i=0}^{63} DEMOD\_CSS_{S1,i} \oplus CSS_{S1,k,i} \quad \text{Equation 14}$$

$\oplus$ indicates exclusive or $$CORR_{S2,k} = \sum_{i=0}^{255} DEMOD\_CSS_{S2,i} \oplus CSS_{S2,k,i} \quad \text{Equation 15}$$

$\beta$ indicates exclusive or

The pattern matching unit 2103 estimates that the three-bit S1 signal (see FIG. 38) corresponding to the sequence $CSS_{S1,k}$ with the largest correlation among the eight correlations calculated using Equation 14 is the transmitted S1 signal. The pattern matching unit 2103 also estimates that the four-bit S2 signal (see FIG. 38) corresponding to the sequence $CSS_{S2,k}$ with the largest correlation among the 16 correlations calculated using Equation 15 is the transmitted S2 signal. The pattern matching unit 2103 acquires the P1 transmission information using the estimated S1 signal and S2 signal.

CITATION LIST

Non-Patent Literature

Non-Patent Literature 1: Draft ETSI TR 102 831 v0.10.04 Digital Video Broadcasting (DVB); Implementation guidelines for a second generation digital terrestrial television broadcasting system (DVB-T2)

SUMMARY OF INVENTION

Technical Problem

Since the P1 symbol is differentially modulated in the carrier direction, however, the following problem occurs in an environment with multipath interference.

A received signal Y(n) is represented in Equation 16 below in terms of a transmitted signal X(n) and channel characteristics H(n). The transmitted signal X(n) is a signal that has undergone DBPSK and consists only of real numbers. Note that n is the subcarrier number.

$$Y(n)=H(n)X(n) \quad \text{Equation 16}$$

In this case the differential detection performed by the differential demodulation unit 2102 in FIG. 43 is represented by Equation 17 below.

$$Y(n) \cdot Y^*(n-k) = H(n) \cdot X(n) \cdot H^*(n-k) \cdot X^*(n-k) \quad \text{Equation 17}$$

Note that Equation 11 above targets a signal sequence of only active carriers. Therefore, the subcarrier number is represented by "i" and "i−1". In Equation 17 above, however, the subcarrier number of the physical subcarrier after the FFT is used. Active carriers are not necessarily one physical carrier apart, and therefore subcarrier numbers are represented by "n" and "n−k", with "k" being the physical subcarrier interval between adjacent active carriers.

When $H(n) \approx H(n-k)$, the channel characteristics component $H(n) \cdot H^*(n-k)$ is almost exclusively the real axis component. Therefore, DBPSK decoding can be performed correctly, without mistaking the determination of phase information (0°, 180°).

In an environment with multipath interference, however, a difference in the phase of channel characteristics develops between active carriers targeted for differential detection. This phase difference remains after differential detection. For example, if a delayed wave with a delay $\tau(s)$ exists at the same power as the main wave, the channel characteristics can be expressed as in Equation 18 below, ignoring an inter-symbol interference component and noise for the sake of simplicity.

$$H(n)=1+e^{-j2\pi n\tau/T} \quad \text{Equation 18}$$

T in Equation 18 is the time (useful symbol length) of the useful symbol duration of the P1 symbol.

In this case, the phase difference in the channel characteristics due to multipath interference remain when performing differential detection, as shown in Equation 19 below. This phase difference yields a demodulation error.

$$\begin{aligned} Y(n)Y^*(n-k) &= H(n)X(n)H^*(n-k)X^*(n-k) \\ &= (1+e^{-j2\pi n\tau/T})(1+e^{j2\pi(n-k)\tau/T}) \\ &\quad X(n)X^*(n-k) \end{aligned} \quad \text{Equation 19}$$

In particular, the FFT size of the P1 symbol is 1 k, the subcarrier interval is wider than data symbols using 32 k, and active carriers are arranged discretely, as shown in FIG. 39. Therefore, the physical interval between active carriers that are targeted for differential detection is one subcarrier or greater, and the remaining phase difference easily grows large. FIG. 44 shows the physical subcarrier interval between adjacent active carriers (represented as "physical subcarrier interval" in FIG. 44) and the number of physical subcarriers.

As described above, an environment with multipath interference poses the problem that phase error occurs in differential detection, causing errors in demodulation. Information therefore cannot be extracted correctly, preventing stable reception.

Furthermore, in the P1 position detection unit 2001, if error occurs in the position of the P1 symbol and the FFT starting position is shifted, then a different rotation component is yielded for each subcarrier in the frequency domain. This rotation component similarly remains after differential detection, producing a phase error and causing the problem of errors in demodulation of the P1 symbol.

Note that the above description focuses on P1 symbols in DVB-T2 frames, describing the problem of phase error during differential detection in an environment with multipath interference. Nevertheless, deterioration of reception performance for received signals (not limited to received signals that have been differentially modulated) is a major problem at the receiving end.

To address this problem, it is an object of the present invention to provide an OFDM reception device, an OFDM reception circuit, an OFDM reception method, and an OFDM reception program that can improve reception performance of an OFDM symbol that includes a signal for a useful symbol duration generated based on transmission information and a signal for a guard interval duration generated based on the signal for the useful symbol duration.

Solution to Problem

In order to solve the above problem, an OFDM reception device according to an aspect of the present invention is an OFDM reception device for receiving an OFDM symbol that includes a signal for a useful symbol duration generated based on transmission information and a signal for a guard interval duration generated based on the signal for the useful symbol duration, comprising: a first orthogonal transformation unit configured to perform an orthogonal transformation on the signal for the useful symbol duration; a second orthogonal transformation unit configured to perform an orthogonal transformation on the signal for the guard interval duration; and a decoding unit configured to decode the OFDM symbol in accordance with results of the orthogonal transformation by the first orthogonal transformation unit and results of the orthogonal transformation by the second orthogonal transformation unit.

Advantageous Effects of Invention

With the above OFDM reception device, decoding is performed using the signal for the useful symbol duration and the signal for the guard interval duration. Therefore, decoding errors can be reduced in a very noisy environment, in an environment with multipath interference, or when the starting position of orthogonal transformation is shifted, thus allowing for stable reception.

BRIEF DESCRIPTION OF DRAWINGS

FIG. 31 shows an example of weights, generated by a weighting generation unit 701 in FIG. 30, for physical sub-carrier intervals.
FIG. 32 shows an example of weights, generated by the weighting generation unit 701 in FIG. 30, for physical sub-carrier intervals.
FIG. 38 shows transformation sequences for values of an S1 signal and an S2 signal.
FIG. 39 shows active carrier positions within a P1 symbol.
FIG. 40 shows combinations of FFT size, guard interval ratio, and pilot patterns allowed by the DVB-T2 transmission standard.
FIG. 41 shows the number of P2 symbols per frame by FFT size.

DESCRIPTION OF EMBODIMENTS

Figure 1:
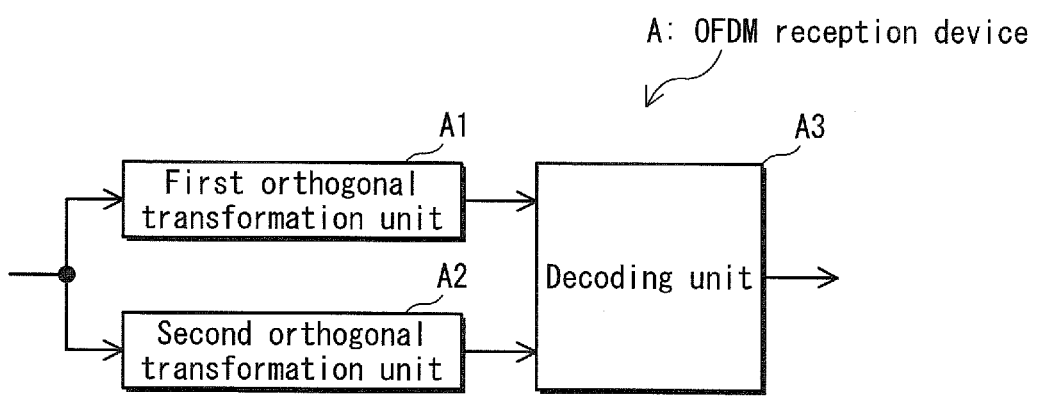
FIG. 1 shows the structure of an OFDM reception device A as an example of the present invention.

A first OFDM reception device that is an aspect of the present invention is an OFDM reception device for receiving an OFDM symbol that includes a signal for a useful symbol duration generated based on transmission information and a signal for a guard interval duration generated based on the signal for the useful symbol duration, comprising: a first orthogonal transformation unit configured to perform an orthogonal transformation on the signal for the useful symbol duration; a second orthogonal transformation unit configured to perform an orthogonal transformation on the signal for the guard interval duration; and a decoding unit configured to decode the OFDM symbol in accordance with results of the orthogonal transformation by the first orthogonal transformation unit and results of the orthogonal transformation by the second orthogonal transformation unit.

A first OFDM reception circuit that is an aspect of the present invention is an OFDM reception circuit for receiving an OFDM symbol that includes a signal for a useful symbol duration generated based on transmission information and a signal for a guard interval duration generated based on the signal for the useful symbol duration, comprising: a first orthogonal transformation circuit configured to perform an orthogonal transformation on the signal for the useful symbol duration; a second orthogonal transformation circuit configured to perform an orthogonal transformation on the signal for the guard interval duration; and a decoding circuit configured to decode the OFDM symbol in accordance with results of the orthogonal transformation by the first orthogonal transformation circuit and results of the orthogonal transformation by the second orthogonal transformation circuit.

A first OFDM reception method that is an aspect of the present invention is an OFDM reception method used in an OFDM reception device for receiving an OFDM symbol that includes a signal for a useful symbol duration generated based on transmission information and a signal for a guard interval duration generated based on the signal for the useful symbol duration, comprising: a first orthogonal transformation step of performing an orthogonal transformation on the signal for the useful symbol duration; a second orthogonal transformation step of performing an orthogonal transformation on the signal for the guard interval duration; and a decoding step of decoding the OFDM symbol in accordance with results of the orthogonal transformation in the first orthogonal transformation step and results of the orthogonal transformation in the second orthogonal transformation step.

A first OFDM reception program that is an aspect of the present invention is an OFDM reception program for causing an OFDM reception device, which receives an OFDM symbol that includes a signal for a useful symbol duration generated based on transmission information and a signal for a guard interval duration generated based on the signal for the useful symbol duration, to perform: a first orthogonal transformation step of performing an orthogonal transformation on the signal for the useful symbol duration; a second orthogonal transformation step of performing an orthogonal transformation on the signal for the guard interval duration; and a decoding step of decoding the OFDM symbol in accordance with results of the orthogonal transformation in the first orthogonal transformation step and results of the orthogonal transformation in the second orthogonal transformation step.

In these aspects, decoding is performed using the signal for the useful symbol duration and the signal for the guard interval duration. Therefore, decoding errors can be reduced in a very noisy environment, in an environment with multipath interference, or when the starting position of orthogonal transformation is shifted, thus allowing for stable reception.

An example of the structure of the first OFDM reception device is shown in FIG. 1. The OFDM reception device A in FIG. 1 receives an OFDM symbol including a signal for a useful symbol duration generated based on transmission information and a signal for a guard interval duration generated based on the signal for the useful symbol duration. The first orthogonal transformation unit A1 corresponds to the first orthogonal transformation unit of the first OFDM reception device and performs an orthogonal transformation on the signal for the useful symbol duration. The second orthogonal transformation unit A2 corresponds to the second orthogonal transformation unit of the first OFDM reception device and performs an orthogonal transformation on the signal for the guard interval duration. Furthermore, the decoding unit A3 corresponds to the decoding unit of the first OFDM reception device and perform demodulation of the OFDM symbol in accordance with results of the orthogonal transformation by the first orthogonal transformation unit A1 and results of the orthogonal transformation by the second orthogonal transformation unit A2.

A second OFDM reception device that is an aspect of the present invention is the first OFDM reception device, wherein a portion or entirety of the signal for the guard interval duration is a frequency-shifted portion or entirety of the useful symbol duration.

In this aspect, since a portion or entirety of the signal for the guard interval duration is a frequency-shifted portion or entirety of the useful symbol duration, a portion or entirety of the same transmission information is transmitted at two different frequencies (i.e. transmitted with two different channel characteristics), and the OFDM symbol is decoded using both signals. Therefore, decoding errors can be reduced in a very noisy environment or an environment with multipath interference, thus allowing for stable reception.

A third OFDM reception device that is an aspect of the present invention is the second OFDM reception device, further comprising a correction unit configured to perform correction on (i) the signal for the guard interval duration or (ii) the results of the orthogonal transformation by the second orthogonal transformation unit, by applying an additional frequency shift in an opposite direction of the frequency shift so as to eliminate the frequency shift, wherein the decoding unit decodes the OFDM symbol in accordance with the results of the orthogonal transformation by the first orthogonal transformation unit and (i) results of the orthogonal transformation by the second orthogonal transformation unit on the signal, after the correction, for the guard interval duration or (ii) the corrected results of the orthogonal transformation.

In this aspect, decoding can be performed while taking into account that a portion or entirety of the signal for the guard interval duration is a frequency-shifted portion or entirety of the useful symbol duration. Therefore, decoding errors can be reduced in a very noisy environment or an environment with multipath interference, thus allowing for stable reception.

A fourth OFDM reception device that is an aspect of the present invention is the first OFDM reception device, wherein the OFDM symbol is a P1 symbol in a DVB-T2 transmission scheme, the guard interval duration is composed of an earlier guard interval duration that is earlier than the useful symbol duration and a later guard interval duration that is after the useful symbol duration, and the second orthogonal transformation unit performs the orthogonal transformation by orthogonally transforming a signal that is a combination of a signal for the earlier guard interval duration and a signal for the later guard interval duration.

In this aspect, errors can be reduced when decoding a P1 symbol in the DVB-T2 transmission scheme.

A fifth OFDM reception device that is an aspect of the present invention is the first OFDM reception device, wherein the signal for the useful symbol duration and the signal for the guard interval duration are differentially modulated in a subcarrier direction, and the decoding unit includes: a differential demodulation unit configured to perform differential demodulation in accordance with the results of the orthogonal transformation by the first orthogonal transformation unit and the results of the orthogonal transformation by the second orthogonal transformation unit; and a transmission information estimation unit configured to estimate the transmission information in accordance with results of the differential demodulation by the differential demodulation unit.

A sixth OFDM reception device that is an aspect of the present invention is the fifth OFDM reception device, wherein the differential demodulation unit performs the differential demodulation by using the results of the orthogonal transformation by the first orthogonal transformation unit and the results of the orthogonal transformation by the second orthogonal transformation unit without adding the results of the orthogonal transformation by the first orthogonal transformation unit and the results of the orthogonal transformation by the second orthogonal transformation unit.

A seventh OFDM reception device that is an aspect of the present invention is the fifth OFDM reception device, wherein the differential demodulation unit performs the differential demodulation using results of adding the results of the orthogonal transformation by the first orthogonal transformation unit and the results of the orthogonal transformation by the second orthogonal transformation unit.

In these aspects, differential demodulation is performed using two signals, the signal for the useful symbol duration and the signal for the guard interval duration. This reduces decoding errors and improves reception performance.

An eighth OFDM reception device that is an aspect of the present invention is the first OFDM reception device, wherein the signal for the useful symbol duration and the signal for the guard interval duration are differentially modulated in a subcarrier direction, and the decoding unit includes: a differential demodulation unit configured to perform at least two of (i) differential demodulation in accordance with the results of the orthogonal transformation by the first orthogonal transformation unit and the results of the orthogonal transformation by the second orthogonal transformation unit, (ii) differential demodulation in accordance with only the results of the orthogonal transformation by the first orthogonal transformation unit, and (iii) differential demodulation in accordance with only the results of the orthogonal transformation by the second orthogonal transformation unit; and a transmission information estimation unit configured to estimate the transmission information in accordance with results of the differential demodulation by the differential demodulation unit.

A ninth OFDM reception device that is an aspect of the present invention is the eighth OFDM reception device, wherein the differential demodulation in accordance with the results of the orthogonal transformation by the first orthogonal transformation unit and the results of the orthogonal transformation by the second orthogonal transformation unit is at least one of (i) differential demodulation using the results of the orthogonal transformation by the first orthogonal transformation unit and the results of the orthogonal transformation by the second orthogonal transformation unit without adding the results of the orthogonal transformation by the first orthogonal transformation unit and the results of the orthogonal transformation by the second orthogonal transformation unit, and (ii) differential demodulation using results of adding the results of the orthogonal transformation by the first orthogonal transformation unit and the results of the orthogonal transformation by the second orthogonal transformation unit.

In these aspects, a plurality of types of differential demodulation, which use different combinations of signals, are performed in order to estimate the transmission information, thus improving the accuracy of estimation of the transmission information transmitted in the OFDM symbol.

A tenth OFDM reception device that is an aspect of the present invention is the first OFDM reception device, wherein the signal for the useful symbol duration and the signal for the guard interval duration are differentially modulated in a subcarrier direction, the signal for the useful symbol duration and the signal for the guard interval duration are each composed of a plurality of active carriers and a plurality of null carriers, a physical subcarrier interval between adjacent active carriers is not constant, and the decoding unit includes: a differential demodulation unit configured to perform differential demodulation in accordance with the results of the orthogonal transformation by the first orthogonal transformation unit and the results of the orthogonal transformation by the second orthogonal transformation unit; and a transmission information estimation unit configured to estimate the transmission information in accordance with results of the differential demodulation by the differential demodulation unit by applying weights such that the weights decrease for larger physical subcarrier intervals.

In this aspect, transmission information is estimated by placing a greater weight on differential demodulation results that have a lower probability of error, thus improving the accuracy of estimation of the transmission information transmitted in the OFDM symbol.

An eleventh OFDM reception device that is an aspect of the present invention is an OFDM reception device for receiving an OFDM symbol that includes a signal for a useful symbol duration generated based on transmission information and a signal for a guard interval duration generated based on the signal for the useful symbol duration, comprising: an adding unit configured to perform addition on the signal for the useful symbol duration and the signal for the guard interval duration; an orthogonal transformation unit configured to perform an orthogonal transformation on results of the addition by the adding unit; and a decoding unit configured to decode the OFDM symbol in accordance with results of the orthogonal transformation by the orthogonal transformation unit.

A second OFDM reception circuit that is an aspect of the present invention is an OFDM reception circuit for receiving an OFDM symbol that includes a signal for a useful symbol duration generated based on transmission information and a signal for a guard interval duration generated based on the signal for the useful symbol duration, comprising: an adding circuit configured to perform addition on the signal for the useful symbol duration and the signal for the guard interval duration; an orthogonal transformation circuit configured to perform an orthogonal transformation on results of the addition by the adding circuit; and a decoding circuit configured to decode the OFDM symbol in accordance with results of the orthogonal transformation by the orthogonal transformation circuit.

A second OFDM reception method that is an aspect of the present invention is an OFDM reception method used in an OFDM reception device for receiving an OFDM symbol that includes a signal for a useful symbol duration generated based on transmission information and a signal for a guard interval duration generated based on the signal for the useful symbol duration, comprising: an adding step of performing addition on the signal for the useful symbol duration and the signal for the guard interval duration; an orthogonal transformation step of performing an orthogonal transformation on results of the addition in the adding step; and a decoding step of decoding the OFDM symbol in accordance with results of the orthogonal transformation in the orthogonal transformation step.

A second OFDM reception program that is an aspect of the present invention is an OFDM reception program for causing an OFDM reception device, which receives an OFDM symbol that includes a signal for a useful symbol duration generated based on transmission information and a signal for a guard interval duration generated based on the signal for the useful symbol duration, to perform: an adding step of performing addition on the signal for the useful symbol duration and the signal for the guard interval duration; an orthogonal transformation step of performing an orthogonal transformation on results of the addition in the adding step; and a decoding step of decoding the OFDM symbol in accordance with results of the orthogonal transformation in the orthogonal transformation step.

In these aspects, decoding is performed using the signal for the useful symbol duration and the signal for the guard interval duration. Therefore, decoding errors can be reduced in a very noisy environment or an environment with multipath interference, thus allowing for stable reception.

Figure 2:
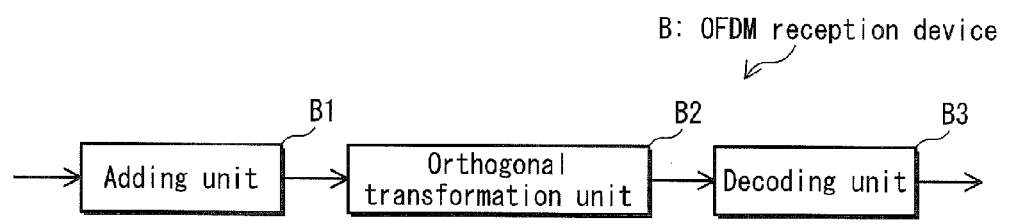
FIG. 2 shows the structure of an OFDM reception device B as another example of the present invention.

An example of the structure of the eleventh OFDM reception device is shown in FIG. 2. The OFDM reception device B in FIG. 2 receives an OFDM symbol including a signal for a useful symbol duration generated based on transmission information and a signal for a guard interval duration generated based on the signal for the useful symbol duration. The adding unit B1 corresponds to the adding unit of the eleventh OFDM reception device and performs addition on the signal for the useful symbol duration and the signal for the guard interval duration. The orthogonal transformation unit B2 corresponds to the orthogonal transformation unit of the eleventh OFDM reception device and performs an orthogonal transformation on results of the addition by the adding unit B1. Furthermore, the decoding unit B3 corresponds to the decoding unit of the eleventh OFDM reception device and performs decoding of the OFDM symbol in accordance with results of the orthogonal transformation by the orthogonal transformation unit B2.

A twelfth OFDM reception device that is an aspect of the present invention is the eleventh OFDM reception device, wherein a portion or entirety of the signal for the guard interval duration is a frequency-shifted portion or entirety of the useful symbol duration.

In this aspect, since a portion or entirety of the signal for the guard interval duration is a frequency-shifted portion or entirety of the useful symbol duration, a portion or entirety of the same transmission information is transmitted at two different frequencies (i.e. transmitted with two different channel characteristics), and the OFDM symbol is decoded using both signals. Therefore, decoding errors can be reduced in a very noisy environment or an environment with multipath interference, thus allowing for stable reception.

A thirteenth OFDM reception device that is an aspect of the present invention is the twelfth OFDM reception device, further comprising a correction unit configured to perform correction on the signal for the guard interval duration by applying an additional frequency shift in an opposite direction of the frequency shift so as to eliminate the frequency shift, wherein the adding unit performs the addition by adding the signal for the useful symbol duration and the corrected signal for the guard interval duration.

In this aspect, decoding can be performed while taking into account that a portion or entirety of the signal for the guard interval duration is a frequency-shifted portion or entirety of the useful symbol duration. Therefore, decoding errors can be reduced in a very noisy environment or an environment with multipath interference, thus allowing for stable reception.

A fourteenth OFDM reception device that is an aspect of the present invention is the eleventh OFDM reception device, wherein the OFDM symbol is a P1 symbol in a DVB-T2 transmission scheme, the guard interval duration is composed of an earlier guard interval duration that is earlier than the useful symbol duration and a later guard interval duration that is after the useful symbol duration, and the adding unit performs the addition using a signal that is a combination of a signal for the earlier guard interval duration and a signal for the later guard interval duration.

In this aspect, errors can be reduced when decoding a P1 symbol in the DVB-T2 transmission scheme.

A fifteenth OFDM reception device that is an aspect of the present invention is the eleventh OFDM reception device, wherein the signal for the useful symbol duration and the signal for the guard interval duration are differentially modulated in a subcarrier direction, and the decoding unit includes: a differential demodulation unit configured to perform differential demodulation in accordance with only the results of the orthogonal transformation by the orthogonal transformation unit; and a transmission information estimation unit configured to estimate the transmission information in accordance with results of the differential demodulation by the differential demodulation unit.

In these aspects, differential demodulation is performed on the result of the addition of two signals, the signal for the useful symbol duration and the signal for the guard interval duration. This reduces decoding errors and improves reception performance.

A sixteenth OFDM reception device that is an aspect of the present invention is the eleventh OFDM reception device, further comprising a first orthogonal transformation unit configured to perform an orthogonal transformation on the signal for the useful symbol duration, wherein the decoding unit includes: a differential demodulation unit configured to perform (i) differential demodulation in accordance with only the results of the orthogonal transformation by the orthogonal transformation unit and (ii) differential demodulation in accordance with only results of the orthogonal transformation by the first orthogonal transformation unit; and a transmission information estimation unit configured to estimate the transmission information in accordance with results of the differential demodulation by the differential demodulation unit.

A seventeenth OFDM reception device that is an aspect of the present invention is the sixteenth OFDM reception device, further comprising a second orthogonal transformation unit configured to perform an orthogonal transformation on the signal for the guard interval duration, wherein the differential demodulation unit additionally performs differential demodulation in accordance with only results of the orthogonal transformation by the second orthogonal transformation unit.

An eighteenth OFDM reception device that is an aspect of the present invention is the seventeenth OFDM reception device, wherein the differential demodulation unit additionally performs differential demodulation in accordance with the results of the orthogonal transformation by the first orthogonal transformation unit and the results of the orthogonal transformation by the second orthogonal transformation unit.

In these aspects, a plurality of types of differential demodulation, which use different combinations of signals, are performed in order to estimate the transmission information, thus improving the accuracy of estimation of the transmission information transmitted in the OFDM symbol.

A nineteenth OFDM reception device that is an aspect of the present invention is the sixteenth OFDM reception device, further comprising a second orthogonal transformation unit configured to perform an orthogonal transformation on the signal for the guard interval duration, wherein the differential demodulation unit additionally performs differential demodulation in accordance with the results of the orthogonal transformation by the first orthogonal transformation unit and results of the orthogonal transformation by the second orthogonal transformation unit.

In this aspect, a plurality of types of differential demodulation are performed in order to estimate the transmission information, thus improving the accuracy of estimation of the transmission information transmitted in the OFDM symbol.

A twentieth OFDM reception device that is an aspect of the present invention is the eleventh OFDM reception device, further comprising a first orthogonal transformation unit configured to perform an orthogonal transformation on the signal for the guard interval duration, wherein the decoding unit includes: a differential demodulation unit configured to perform (i) differential demodulation in accordance with only the results of the orthogonal transformation by the orthogonal transformation unit and (ii) differential demodulation in accordance with only results of the orthogonal transformation by the first orthogonal transformation unit; and a transmission information estimation unit configured to estimate the transmission information in accordance with results of the differential demodulation by the differential demodulation unit.

A twenty-first OFDM reception device that is an aspect of the present invention is the twentieth OFDM reception device, further comprising a second orthogonal transformation unit configured to perform an orthogonal transformation on the signal for the useful symbol duration, wherein the differential demodulation unit additionally performs differential demodulation in accordance with the results of the orthogonal transformation by the first orthogonal transformation unit and results of the orthogonal transformation by the second orthogonal transformation unit.

In these aspects, a plurality of types of differential demodulation, which use different combinations of signals, are performed in order to estimate the transmission information, thus improving the accuracy of estimation of the transmission information transmitted in the OFDM symbol.

A twenty-second OFDM reception device that is an aspect of the present invention is the eleventh OFDM reception device, further comprising a first orthogonal transformation unit configured to perform an orthogonal transformation on the signal for the useful symbol duration; and a second orthogonal transformation unit configured to perform an orthogonal transformation on the signal for the guard interval duration, wherein the decoding unit includes: a differential demodulation unit configured to perform (i) differential demodulation in accordance with only the results of the orthogonal transformation by the orthogonal transformation unit and (ii) differential demodulation in accordance with results of the orthogonal transformation by the first orthogonal transformation unit and results of the orthogonal transformation by the second orthogonal transformation unit; and a transmission information estimation unit configured to estimate the transmission information in accordance with results of the differential demodulation by the differential demodulation unit.

In these aspects, a plurality of types of differential demodulation are performed in order to estimate the transmission information, thus improving the accuracy of estimation of the transmission information transmitted in the OFDM symbol.

A twenty-third OFDM reception device that is an aspect of the present invention is the eleventh OFDM reception device, wherein the signal for the useful symbol duration and the signal for the guard interval duration are differentially modulated in a subcarrier direction, the signal for the useful symbol duration and the signal for the guard interval duration are each composed of a plurality of active carriers and a plurality of null carriers, a physical subcarrier interval between adjacent active carriers is not constant, and the decoding unit includes: a differential demodulation unit configured to perform differential demodulation in accordance with the results of the orthogonal transformation by the orthogonal transformation unit; and a transmission information estimation unit configured to estimate the transmission information in accordance with results of the differential demodulation by the differential demodulation unit by applying weights such that the weights decrease for larger physical subcarrier intervals.

In this aspect, transmission information is estimated by placing a greater weight on differential demodulation results that have a lower probability of error, thus improving the accuracy of estimation of the transmission information transmitted in the OFDM symbol.

A twenty-fourth OFDM reception device that is an aspect of the present invention is an OFDM reception device for receiving an OFDM symbol that includes a signal for a useful symbol duration generated based on transmission information and a signal for a guard interval duration composed of a plurality of guard interval duration segments that are generated based on the signal for the useful symbol duration and are temporally discontinuous, comprising: an orthogonal transformation unit configured to combine the plurality of guard interval duration segments so that the signal for the guard interval duration is temporally continuous and to perform an orthogonal transformation on results of combination; and a decoding unit configured to decode the OFDM symbol in accordance with results of the orthogonal transformation by the orthogonal transformation unit.

A third OFDM reception circuit that is an aspect of the present invention is an OFDM reception circuit for receiving an OFDM symbol that includes a signal for a useful symbol duration generated based on transmission information and a signal for a guard interval duration composed of a plurality of guard interval duration segments that are generated based on the signal for the useful symbol duration and are temporally discontinuous, comprising: an orthogonal transformation circuit configured to combine the plurality of guard interval duration segments so that the signal for the guard interval duration is temporally continuous and to perform an orthogonal transformation on results of combination; and a decoding circuit configured to decode the OFDM symbol in accordance with results of the orthogonal transformation by the orthogonal transformation circuit.

A third OFDM reception method that is an aspect of the present invention is an OFDM reception method used in an OFDM reception device for receiving an OFDM symbol that includes a signal for a useful symbol duration generated based on transmission information and a signal for a guard interval duration composed of a plurality of guard interval duration segments that are generated based on the signal for the useful symbol duration and are temporally discontinuous, comprising: an orthogonal transformation step of combining the plurality of guard interval duration segments so that the signal for the guard interval duration is temporally continuous and performing an orthogonal transformation on results of combination; and a decoding step of decoding the OFDM symbol in accordance with results of the orthogonal transformation in the orthogonal transformation step.

A third OFDM reception program that is an aspect of the present invention is an OFDM reception program for causing an OFDM reception device, which receives an OFDM symbol that includes a signal for a useful symbol duration generated based on transmission information and a signal for a guard interval duration composed of a plurality of guard interval duration segments that are generated based on the signal for the useful symbol duration and are temporally discontinuous, to perform: an orthogonal transformation step of combining the plurality of guard interval duration segments so that the signal for the guard interval duration is temporally continuous and performing an orthogonal transformation on results of combination; and a decoding step of decoding the OFDM symbol in accordance with results of the orthogonal transformation in the orthogonal transformation step.

In these aspects, decoding is performed using the signal for the guard interval duration generated based on the signal for the useful symbol duration. Therefore, errors when decoding OFDM symbols can be reduced even in an environment in which the signal for the useful symbol duration is blocked, thus allowing for stable reception.

Figure 3:
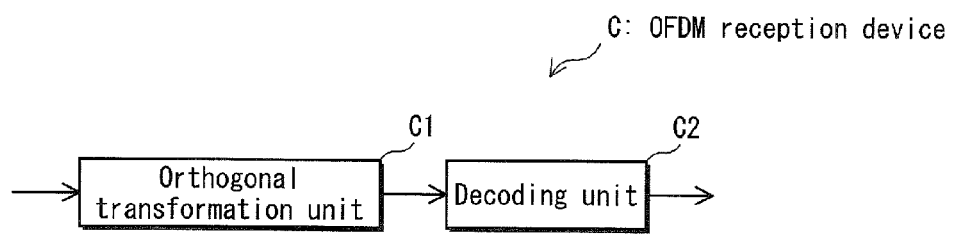
FIG. 3 shows the structure of an OFDM reception device C as yet another example of the present invention.

An example of the structure of the twenty-fourth OFDM reception device is shown in FIG. 3. The OFDM reception device in FIG. 3 receives an OFDM symbol that includes a signal for a useful symbol duration generated based on transmission information and a signal for a guard interval duration composed of a plurality of guard interval duration segments that are generated based on the signal for the useful symbol duration and are temporally discontinuous. The orthogonal transformation unit C1 corresponds to the orthogonal transformation unit of the twenty-fourth OFDM reception device, combines the plurality of guard interval duration segments so that the signal for the guard interval duration is temporally continuous, and performs an orthogonal transformation on results of combination. The decoding unit C2 corresponds to the decoding unit of the twenty-fourth OFDM reception device and performs decoding of the OFDM symbol in accordance with results of the orthogonal transformation by the orthogonal transformation unit C1.

With reference to the drawings, the following describes embodiments of the present invention.

Embodiment 1

With reference to the drawings, the following describes an OFDM reception device 1 according to an embodiment of the present invention. In Embodiment 1 and other embodiments below, the example described is an OFDM reception device that operates as a receiver of a digital broadcast conforming to the DVB-T2 system, which is a standard for the second generation of European digital terrestrial broadcasting. Note that the signal received by the OFDM reception device 1 is an OFDM signal composed of OFDM symbols conforming to the DVB-T2 transmission format.

Figure 4:
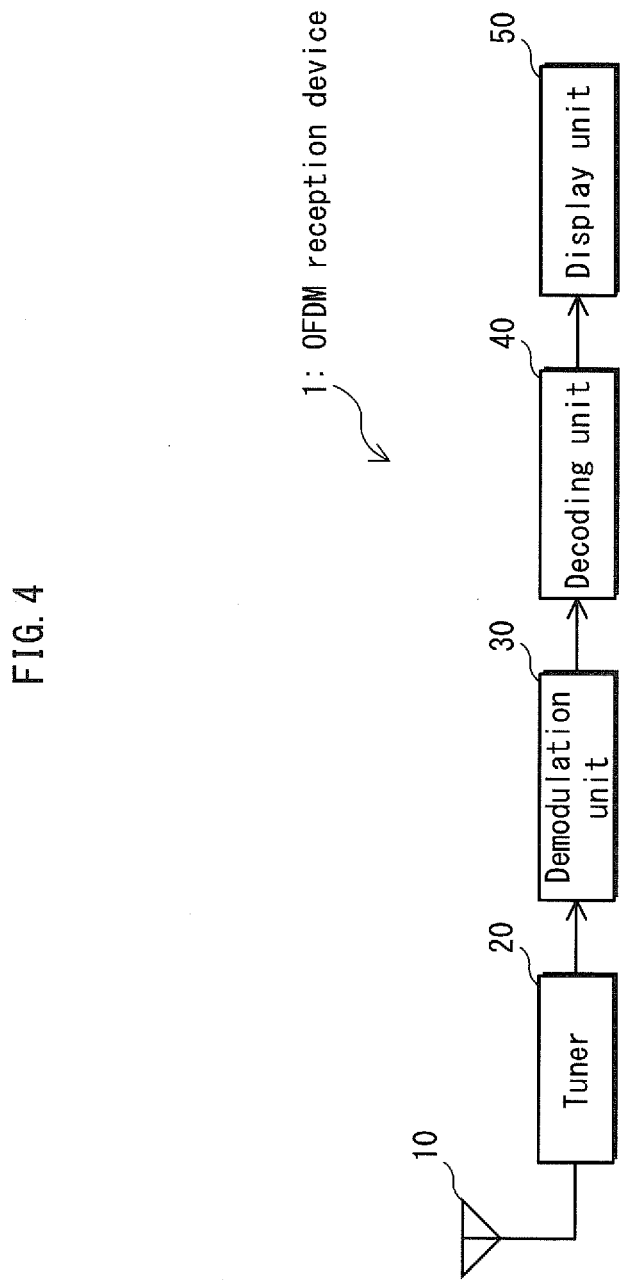
FIG. 4 shows the structure of an OFDM reception device 1 according to Embodiment 1.

FIG. 4 shows the structure of the OFDM reception device 1 according to Embodiment 1. The OFDM reception device 1 is provided with an antenna 10, a tuner 20, a demodulation unit 30, a decoding unit 40, and a display unit 50.

The antenna 10 receives broadcast waves emitted by a broadcasting station, not shown in the figures, and outputs the received broadcast waves to the tuner 20. The tuner 20 selects a received signal for a desired reception channel from among a plurality of broadcast waves input from the antenna 10. The tuner 20 converts the selected received signal from a Radio Frequency (RF) band to an Intermediate Frequency (IF) band and outputs the received signal in the IF band to the demodulation unit 30. As described in detail below, the demodulation unit 30 demodulates the received signal input from the tuner 20 and outputs the signal resulting from demodulation to the decoding unit 40.

The decoding unit 40 decodes the signal input from the demodulation unit 30, such as a signal compressed with H.264 or the like, into a video signal and an audio signal and outputs the decoded video signal and audio signal to the display unit 50. The display unit 50 produces a video display based on the video signal input from the decoding unit 40 and produces audio output based on the audio signal input from the decoding unit 40.

Figure 5:
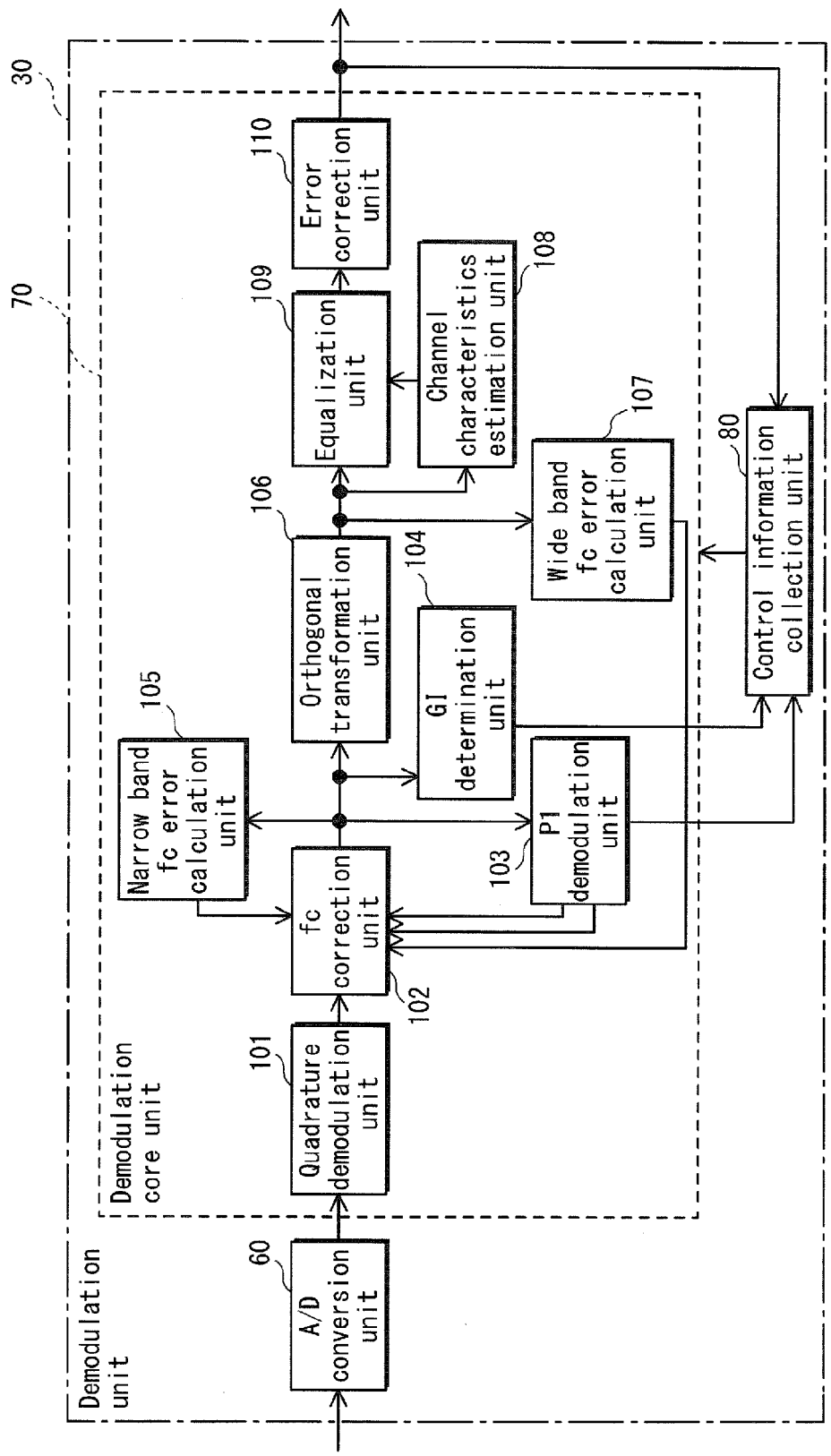
FIG. 5 shows the structure of a demodulation unit 30 in FIG. 4.

The following describes the demodulation unit 30 in FIG. 4 with reference to FIG. 5. FIG. 5 shows the structure of the demodulation unit 30 in FIG. 4. The demodulation unit 30 is provided with an A/D conversion unit 60, a demodulation core unit 70, and a control information collection unit 80.

A received signal in the IF band is input into the A/D conversion unit 60 from the tuner 20 in FIG. 4. The A/D conversion unit 60 converts a received signal input from the tuner 20 from an analog signal to a digital signal. The A/D conversion unit 60 then outputs the received signal converted into a digital signal (hereinafter referred to as a "digital received signal") to a quadrature demodulation unit 101, described below, in the demodulation core unit 70.

The demodulation core unit 70 is provided with the quadrature demodulation unit 101, an fc correction unit 102, a P1 demodulation unit 103, a GI determination unit 104, a narrow band fc error calculation unit 105, an orthogonal transformation unit 106, a wide band fc error calculation unit 107, a channel characteristics estimation unit 108, an equalization unit 109, and an error correction unit 110. Each unit within the demodulation core unit 70 operates while using, as necessary, the information collected by the control information collection unit 80.

The quadrature demodulation unit 101 performs quadrature demodulation at a fixed frequency on the digital received signal in the IF band input from the A/D conversion unit 60 and outputs a complex baseband signal obtained as a result of quadrature demodulation (a signal composed of an in-phase component and a quadrature component) to the fc correction unit 102.

The fc correction unit 102 generates a corrected carrier frequency based on a narrow band carrier frequency error amount and a wide band carrier frequency error amount that have been detected by the P1 demodulation unit 103 so far (the respective amounts are described below), a narrow band carrier frequency error amount calculated by the narrow band fc error calculation unit 105 so far (described below), and a wide band carrier frequency error amount calculated by the wide band fc error calculation unit 107 so far (described below). Based on the corrected carrier frequency, the fc correction unit 102 corrects the shift for the carrier frequency of the complex baseband signal input from the quadrature demodulation unit 101 and outputs the complex baseband signal with a corrected shift for the carrier frequency to the P1 demodulation unit 103, the GI determination unit 104, the narrow band fc error calculation unit 105, and the orthogonal transformation unit 106.

Note that while the quadrature demodulation unit 101 is described as performing quadrature demodulation using a fixed frequency, and the fc correction unit 102 as correcting the shift for carrier frequency, the present invention is not limited in this way. For example, the following structure may be adopted. An orthogonal demodulation unit may simultaneously correct the shift for carrier frequency and perform an orthogonal demodulation using a frequency that is the sum of a fixed frequency and the error amount in the detected carrier frequency in order to obtain a complex baseband signal with a corrected shift for the carrier frequency.

The complex baseband signal with a corrected shift for the carrier frequency is input into the P1 demodulation unit 103 from the fc correction unit 102. The P1 demodulation unit 103 detects a P1 symbol included in a DVB-T2 frame from the complex baseband signal that is input. From the P1 symbol, the P1 demodulation unit 103 detects a frequency error amount within the subcarrier interval of the P1 symbol (narrow band carrier frequency error amount) and a frequency error amount in units of subcarrier intervals of the P1 symbol (wide band carrier frequency error amount) and, based on these error amounts, corrects the shift for the carrier frequency of the P1 symbol. The P1 demodulation unit 103 decodes the P1 symbol with a corrected shift for the carrier frequency and outputs the P1 transmission information transmitted in the P1 symbol (the FFT size information, the MISO/SISO information, the FEF inclusion information, and the like) to the control information collection unit 80 as control information. The P1 demodulation unit 103 outputs the detected narrow band carrier frequency error amount and wide band carrier frequency error amount to the fc correction unit 102. Note that details on the P1 demodulation unit 103 are provided below with reference to FIG. 6 and other figures.

The GI determination unit 104 receives, from the control information collection unit 80, information transmitted by the P1 symbol on the FFT size of the P2 symbols and the data symbols (FFT size information). Based on the received FFT size, the GI determination unit 104 calculates, at the respective guard interval ratios stipulated by DVB-T2, the correlation (guard correlation) between the signal for the guard interval duration and the signal for the later part of the useful symbol duration in the P2 symbols and data symbols input from the fc correction unit 102. Based on the result of calculation of the guard correlation, the GI determination unit 104 estimates the guard interval ratio actually used for transmission of the P2 symbols and the data symbols, outputting the estimated guard interval ratio to the control information collection unit 80 as control information.

Note that instead of the GI determination unit 104 calculating the guard correlation for all of the guard interval ratios stipulated by DVB-T2, the calculation may, for example, be made only for the guard interval ratios that can be identified as possibly being used for transmission based on the FFT size (see FIG. 40). Alternatively, the calculation may be made only for the guard interval ratios that can be identified as possibly being used for transmission based on the FFT size and on whether MISO or SISO is used (see FIG. 40).

The narrow band fc error calculation unit 105 receives, from the control information collection unit 80, the FFT size of the P2 symbols and the data symbols and their respective guard interval ratios. Using the FFT size and the guard interval ratios, the narrow band fc error calculation unit 105 calculates the correlation (guard correlation) between the signal for the guard interval duration and the signal for the later part of the useful symbol duration in the P2 symbols and data symbols input from the fc correction unit 102. Based on the calculated guard correlation, the narrow band fc error calculation unit 105 calculates the frequency error amount within the subcarrier interval of the P2 symbols and data symbols (narrow band carrier frequency error amount) and outputs the calculated narrow band carrier frequency error amount to the fc correction unit 102.

The orthogonal transformation unit 106 orthogonally transforms the signal for the useful symbol duration of the P2 symbols and the data symbols input from the fc correction unit 102 (complex baseband signal in the time domain) and outputs the result of orthogonal transformation (complex baseband signal in the frequency domain) to the wide band fc error calculation unit 107, the channel characteristics estimation unit 108, and the equalization unit 109. Note that the orthogonal transformation unit 106 performs orthogonal transformation based on a Fourier transform, a cosine transform, a wavelet transform, a Hadamard transform, or the like.

In this embodiment, as an example, the orthogonal transformation unit 106 performs orthogonal transformation using a Fourier transform. An FFT is used for the Fourier transform. The orthogonal transformation unit 106 performs an FFT on the signal for the useful symbol duration of the P2 symbols and the data symbols (complex baseband signal in the time domain) and outputs the result of the FFT (complex baseband signal in the frequency domain) to the wide band fc error calculation unit 107, the channel characteristics estimation unit 108, and the equalization unit 109. Note that processing by the orthogonal transformation unit 106 is not limited to the above processing.

The wide band fc error calculation unit 107 uses the complex baseband signal in the frequency domain input from the orthogonal transformation unit 106 (signal relating to the P2 symbols and the data symbols) to calculate the correlation of the arrangement sequence of the pilot signals included therein. The wide band fc error calculation unit 107 uses the results of calculation of the correlation to calculate the frequency error amount in units of subcarrier intervals of the P2 symbols and the data symbols (wide band carrier frequency error amount), outputting the calculated wide band carrier frequency error amount to the fc correction unit 102.

The P1 demodulation unit 30 may, for example, be changed to the following sort of structure. A wide band fc correction unit may be provided between (i) the orthogonal transformation unit 106 and (ii) the channel characteristics estimation unit 108 and the equalization unit 109, and the wide band fc error calculation unit 107 may output the calculated wide band carrier frequency error amount to the wide band fc correction unit instead of to the fc correction unit 102. The wide band fc correction unit uses the wide band carrier frequency error amount calculated by the wide band fc error calculation unit 107 to correct the shift for the carrier frequency of the P2 symbols and the data symbols input from the orthogonal transformation unit 106, outputting the P2 symbols and the data symbols with a corrected shift for the carrier frequency to the channel characteristics estimation unit 108 and the equalization unit 109.

The complex baseband signal in the frequency domain (signal relating to the P2 symbols and the data symbols) is input into the channel characteristics estimation unit 108 from the orthogonal transformation unit 106. The channel characteristics estimation unit 108 estimates the characteristics of amplitude and phase distortion experienced along the channel (channel characteristics) by the input complex baseband signal in the frequency domain using the pilot signal included therein. The channel characteristics estimation unit 108 outputs the estimated channel characteristics to the equalization unit 109.

The complex baseband signal in the frequency domain (signal relating to the P2 symbols and the data symbols) is input into the equalization unit 109 from the orthogonal transformation unit 106. The equalization unit 109 uses the channel characteristics estimated by the channel characteristics estimation unit 108 to correct the amplitude and phase distortion in the input complex baseband signal in the frequency domain. The equalization unit 109 outputs the signal with corrected amplitude and phase distortion to the error correction unit 110.

The error correction unit 110 performs error correction processing on the signal with corrected amplitude and phase distortion input from the equalization unit 109 and outputs a stream, such as a transport stream, to the decoding unit 40 in FIG. 4. The error correction unit 110 outputs the P2 transmission information transmitted by the P2 symbols (pilot pattern information, transmission mode information, number of symbols per frame, modulation method, coding ratio of FEC coding, and the like) to the control information collection unit 80 as control information.

The control information collection unit 80 categorizes the pieces of control information collected from the P1 demodulation unit 103, the GI determination unit 104, and the error correction unit 110 into transmission parameters and outputs the transmission parameters to the units in the demodulation core unit 70. Each unit within the demodulation core unit 70 operates while using, as necessary, the information collected by the control information collection unit 80.

Note that in the OFDM reception device 1 of Embodiment 1, among the units described with reference to FIGS. 4 and 5, the P1 demodulation unit 103 in the demodulation unit 30 differs greatly from conventional technology.

Figure 6:
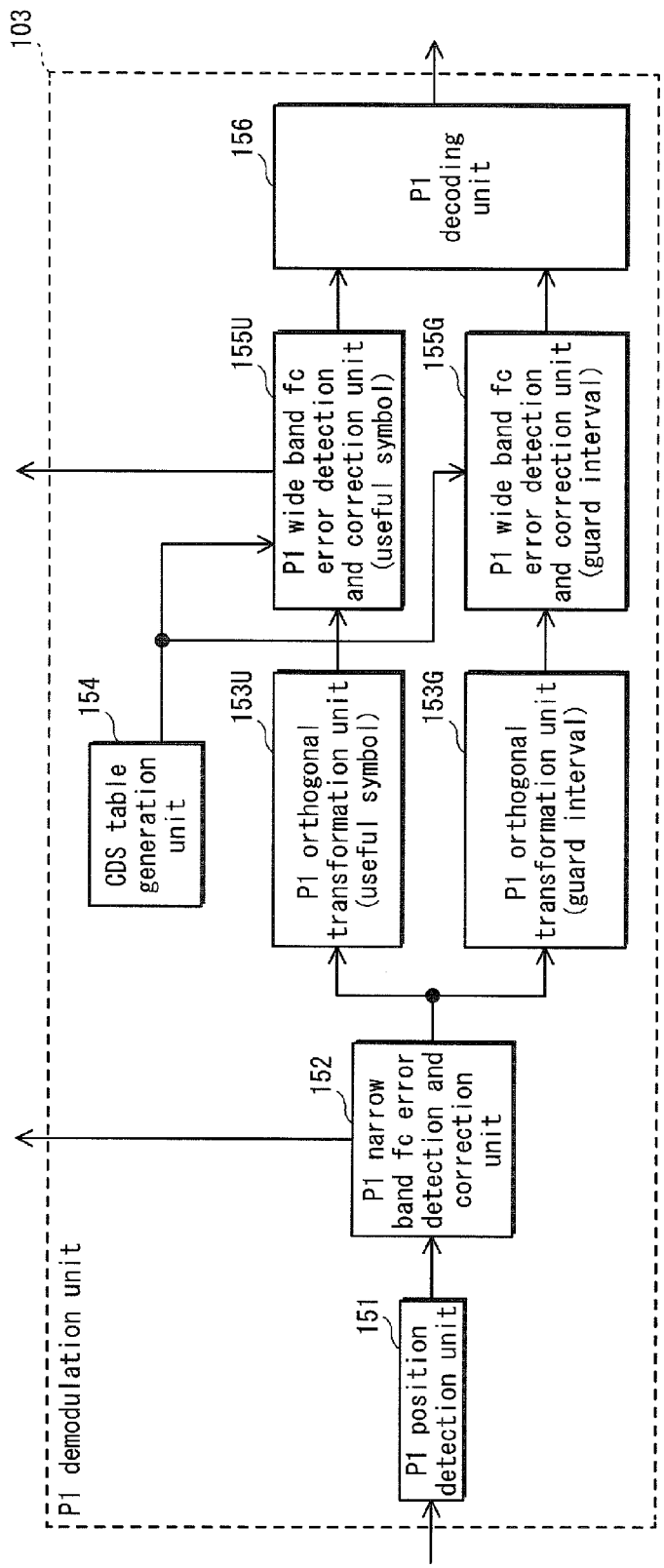
FIG. 6 shows the structure of a P1 demodulation unit 103 in FIG. 5.

The following describes the P1 demodulation unit 103 in FIG. 5 with reference to FIG. 6.

FIG. 6 shows the structure of the P1 demodulation unit 103 in FIG. 5. The P1 demodulation unit 103 is provided with a P1 position detection unit 151, a P1 narrow band fc error detection and correction unit 152, a P1 orthogonal transformation unit 153U, a P1 orthogonal transformation unit 1536, a CDS table generation unit 154, a P1 wide band fc error detection and correction unit 155U, a P1 wide band fc error detection and correction unit 1556, and a P1 decoding unit 156.

The complex baseband signal in the time domain is input into the P1 position detection unit 151 from the fc correction unit 102 in FIG. 5. The P1 position detection unit 151 uses the input complex baseband signal in the time domain to calculate the correlation (guard correlation) between the signal for the guard interval duration of a P1 symbol (earlier guard interval duration and later guard interval duration) and the signal for a predetermined section of the useful symbol duration of the P1 symbol. The P1 position detection unit 151 calculates the interval integral of the calculated correlation over the time of each guard interval duration (earlier guard interval duration, later guard interval duration) and detects the position of the P1 symbol in the input complex baseband signal by detecting the peak of the interval integral.

Figure 35:
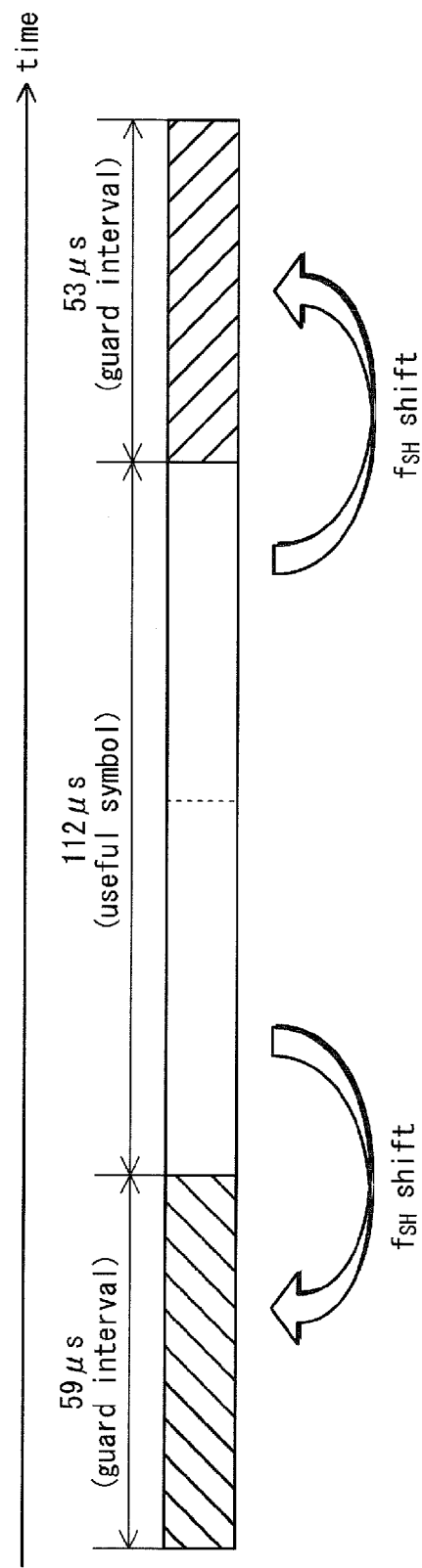
FIG. 35 is a schematic diagram showing the transmission format in the time domain for a P1 symbol.
Figure 36:
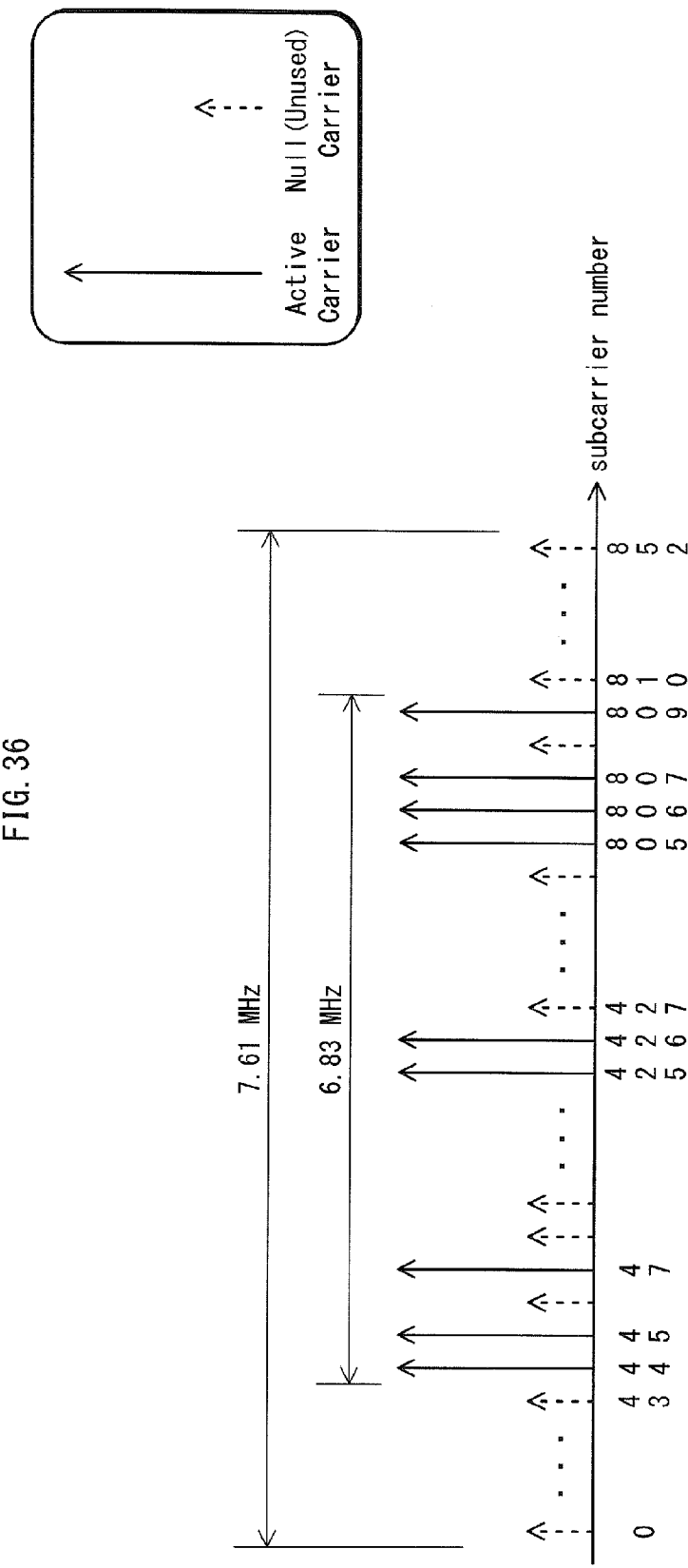
FIG. 36 is a schematic diagram showing the transmission format in the frequency domain for a P1 symbol.
Figure 37:
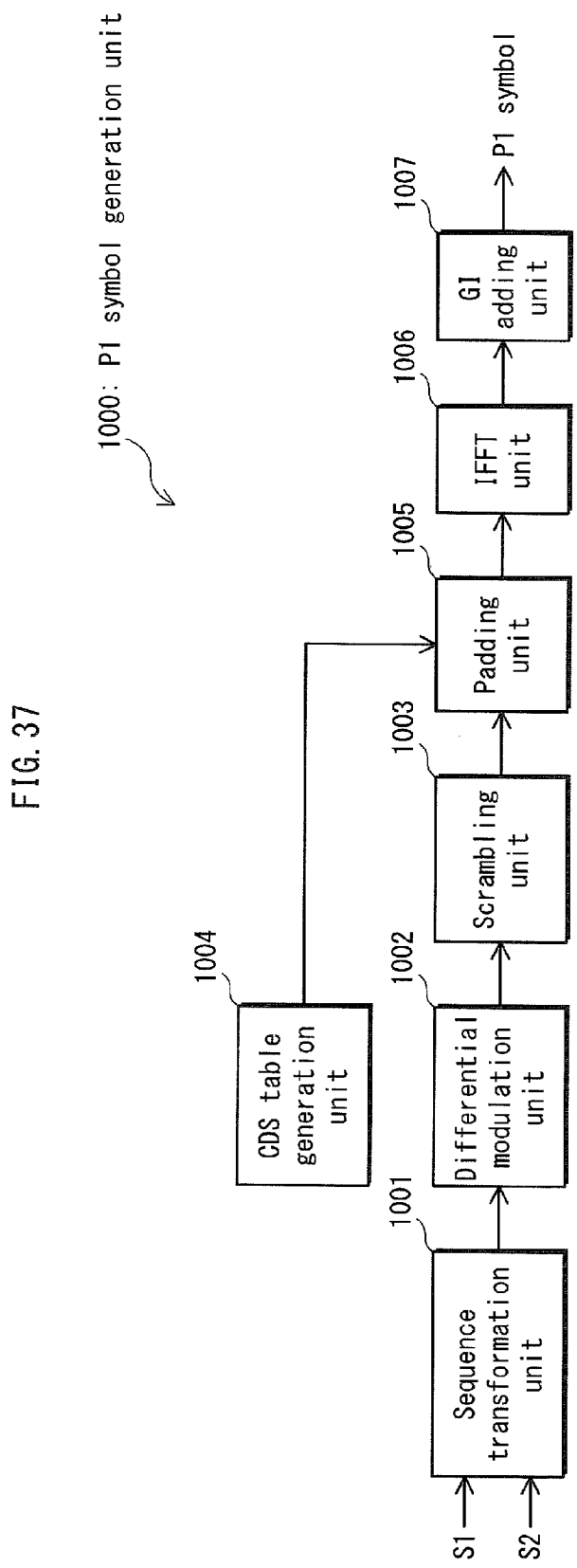
FIG. 37 shows the structure of a P1 symbol generation unit 1000 that generates a P1 symbol.
Figure 42:
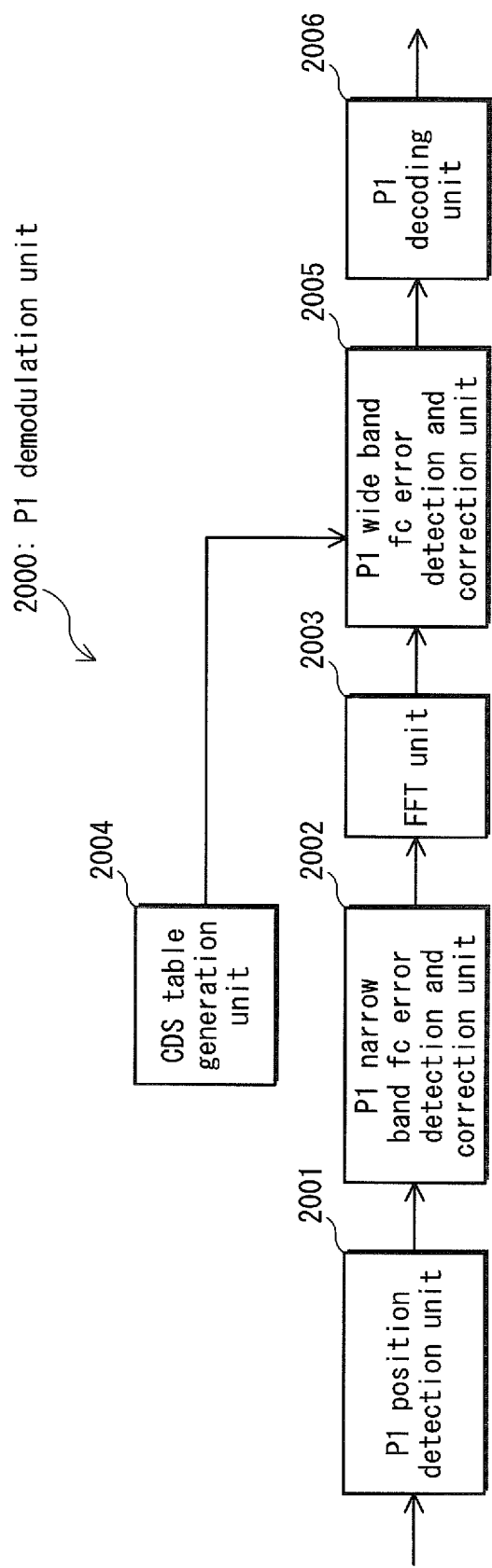
FIG. 42 shows the structure of a conventional P1 demodulation unit 2000.
Figures 43, 44:
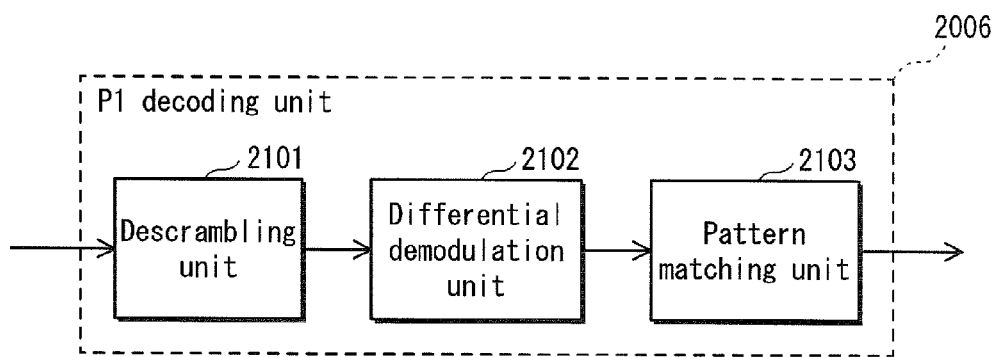
FIG. 43 shows the structure of a P1 decoding unit 2006 in FIG. 42.
FIG. 44 shows a distribution of intervals between adjacent active carriers.

The calculation of the correlation takes into consideration the frequency shift of $f_{SH}$ that is added at the transmitting end. The above "predetermined section" is the earlier portion within the useful symbol duration for the earlier guard interval duration and is the later portion within the useful symbol duration for the later guard interval duration (see FIG. 35). The same is true for the calculation of the correlation by the P1 narrow band fc error detection and correction unit 152, described below.

The P1 narrow band fc error detection and correction unit 152 calculates the correlation (guard correlation) between the signal for the guard interval duration of a P1 symbol (earlier guard interval duration and later guard interval duration) and the signal for a predetermined section of the useful symbol duration of the P1 symbol. The P1 narrow band fc error detection and correction unit 152 calculates the interval integral of the calculated correlation over the time of each guard interval duration (earlier guard interval duration, later guard interval duration) to calculate the phase of the interval integral. Based on the phase at the timing of the position of the P1 symbol detected by the P1 position detection unit 151, the P1 narrow band fc error detection and correction unit 152 detects the frequency error amount within the subcarrier interval of the P1 symbol (narrow band carrier frequency error amount). Based on the detected narrow band carrier frequency error amount, the P1 narrow band fc error detection and correction unit 152 corrects the shift for the narrow band carrier frequency of the P1 symbol and outputs the P1 symbol whose shift for the narrow band carrier frequency has been corrected to the P1 orthogonal transformation unit 153U and the P1 orthogonal transformation unit 153G. The P1 narrow band fc error detection and correction unit 152 outputs the detected narrow band carrier frequency error amount to the fc correction unit 102 in FIG. 5.

Figure 7:
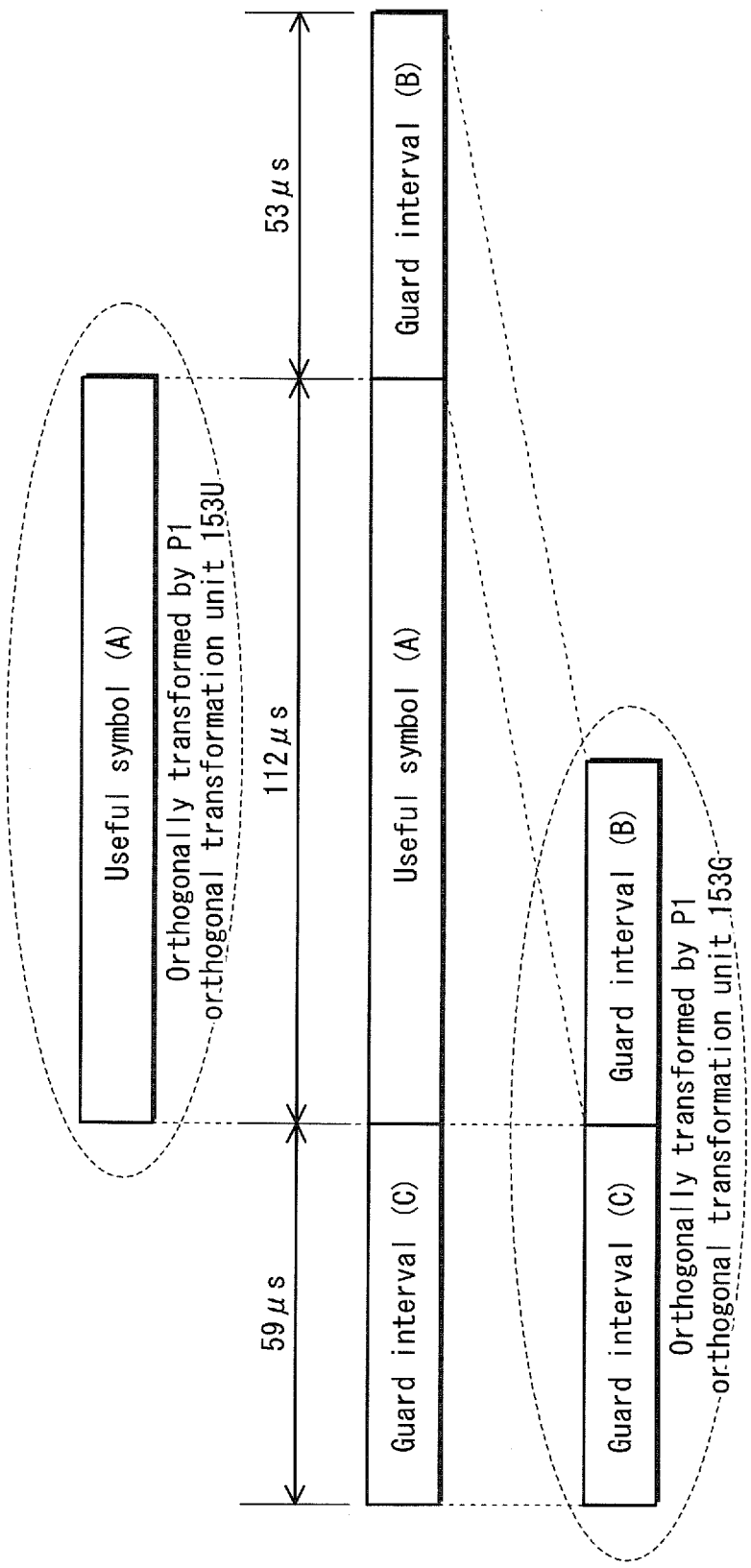
FIG. 7 is a schematic diagram illustrating the portion of a signal for a P1 symbol on which a P1 orthogonal transformation unit 153U and a P1 orthogonal transformation unit 153G in FIG. 6 perform an orthogonal transformation.

The P1 symbol is input into the P1 orthogonal transformation unit 153U from the P1 narrow band fc error detection and correction unit 152. As shown in FIG. 7, the P1 orthogonal transformation unit 153U extracts the signal for the useful symbol duration from the P1 symbol (the signal for the useful symbol (A) in FIG. 7), orthogonally transforms the extracted signal for the useful symbol duration (a complex baseband signal in the time domain), and outputs the result of orthogonal transformation (a complex baseband signal in the frequency domain) to the P1 wide band fc error detection and correction unit 155U. Note that the P1 orthogonal transformation unit 153U performs orthogonal transformation based on a Fourier transform, a cosine transform, a wavelet transform, a Hadamard transform, or the like.

In this embodiment, as an example, the P1 orthogonal transformation unit 153U performs orthogonal transformation using a Fourier transform. An FFT is used for the Fourier transform. The P1 orthogonal transformation unit 153U performs an FFT with an FFT size of 1 k on the signal for the useful symbol duration of the P1 symbol (the complex baseband signal in the time domain), outputting the results of the FFT (a complex baseband signal in the frequency domain) to the P1 wide band fc error detection and correction unit 155U. Note that processing by the P1 orthogonal transformation unit 153U is not limited to the above processing.

The CDS table generation unit 154 generates a sequence showing the positions of active carriers (active carrier arrangement sequence) and outputs the generated active carrier arrangement sequence to the P1 wide band fc error detection and correction unit 155U and the P1 wide band fc error detection and correction unit 155G. The active carrier arrangement sequence is a sequence with a "1" at positions of active carriers, as shown in FIG. 39, and a "0" at other positions for null carriers (unused carriers).

The complex baseband signal in the frequency domain (useful symbol duration of the P1 symbol) is input into the P1 wide band fc error detection and correction unit 155U from the P1 orthogonal transformation unit 153U. The P1 wide band fc error detection and correction unit 155U calculates the power of each subcarrier of the input complex baseband signal in the frequency domain. The P1 wide band fc error detection and correction unit 155U then calculates the arrangement correlation between the sequence of a plurality of subcarrier power values and the active carrier arrangement sequence (input from the CDS table generation unit 154) while shifting the calculated subcarrier power values one subcarrier at a time. Subsequently, the P1 wide band fc error detection and correction unit 155U detects the largest correlation and detects the shift amount yielding the largest correlation as the frequency error amount (wide band carrier frequency error amount) in units of subcarrier intervals of the P1 symbol in the useful symbol duration of the P1 symbol.

Based on the detected wide band carrier frequency error amount, the P1 wide band fc error detection and correction unit 155U corrects the shift for the wide band carrier frequency of the complex baseband signal in the frequency domain (useful symbol duration of the P1 symbol). The P1 wide band fc error detection and correction unit 155U extracts only the active carriers from the complex baseband signal in the frequency domain (useful symbol duration of the P1 symbol) whose shift for the wide band carrier frequency has been corrected and outputs the extracted active carriers to the P1 decoding unit 156. The P1 wide band fc error detection and correction unit 155U outputs the detected wide band carrier frequency error amount to the fc correction unit 102 in FIG. 5.

The P1 symbol is input into the P1 orthogonal transformation unit 153G from the P1 narrow band fc error detection and correction unit 152. As shown in FIG. 7, the P1 orthogonal transformation unit 153G extracts the signal for the earlier guard interval duration (the signal for the guard interval (C) in FIG. 7) and the signal for the later guard interval duration (the signal for the guard interval (B) in FIG. 7) from the P1 symbol and combines the two symbols to be temporally continuous. Note that the combined duration of the earlier guard interval duration and the later guard interval duration is hereinafter referred to as a "combined guard interval duration". The P1 orthogonal transformation unit 153G orthogonally transforms the signal for the combined guard interval duration (a complex baseband signal in the time domain) and outputs the result of orthogonal transformation (a complex baseband signal in the frequency domain) to the P1 wide band fc error detection and correction unit 155G. Note that the P1 orthogonal transformation unit 153G performs orthogonal transformation based on a Fourier transform, a cosine transform, a wavelet transform, a Hadamard transform, or the like.

In this embodiment, as an example, the P1 orthogonal transformation unit 153G performs orthogonal transformation using a Fourier transform. An FFT is used for the Fourier transform. The P1 orthogonal transformation unit 153G performs an FFT with an FFT size of 1 k on the signal for the combined guard interval duration (the complex baseband signal in the time domain), outputting the results of the FFT (a complex baseband signal in the frequency domain) to the P1 wide band fc error detection and correction unit 155G. Note that processing by the P1 orthogonal transformation unit 153G is not limited to the above processing.

The complex baseband signal in the frequency domain (combined guard interval duration of the P1 symbol) is input into the P1 wide band fc error detection and correction unit 155G from the P1 orthogonal transformation unit 153G. The P1 wide band fc error detection and correction unit 155G calculates the power of each subcarrier of the input complex baseband signal in the frequency domain. The P1 wide band fc error detection and correction unit 155G calculates the arrangement correlation between the sequence of a plurality of subcarrier power values and the active carrier arrangement sequence (input from the CDS table generation unit 154) while shifting the calculated subcarrier power values one subcarrier at a time. The P1 wide band fc error detection and correction unit 155G detects the largest correlation and detects the shift amount yielding the largest correlation as the frequency error amount (wide band carrier frequency error amount) in units of subcarrier intervals of the P1 symbol in the combined guard interval duration of the P1 symbol.

Based on the detected wide band carrier frequency error amount, the P1 wide band fc error detection and correction unit 155G corrects the shift for the wide band carrier frequency of the complex baseband signal in the frequency domain (combined guard interval duration of the P1 symbol). The P1 wide band fc error detection and correction unit 155G extracts only the active carriers from the complex baseband signal in the frequency domain (combined guard interval duration of the P1 symbol) whose shift for the wide band carrier frequency has been corrected and outputs the extracted active carriers to the P1 decoding unit 156.

As described above, the signal for the earlier guard interval duration and the signal for the guard interval duration are predetermined portions of the useful symbol duration that are frequency shifted by $f_{SH}$ (one subcarrier higher in frequency than the signal for the predetermined portions of the useful symbol duration). In this embodiment, correction to shift the frequency of the complex baseband signal for the combined guard interval duration by $-f_{SH}$ (correction to shift the frequency in the opposite direction in order to eliminate the frequency shift of $f_{SH}$) is included in correction to shift the wide band carrier frequency based on the wide band carrier frequency error amount in the combined guard interval duration of the P1 symbol. In other words, the P1 wide band fc error detection and correction unit 155G also functions as a correction unit to perform correction to shift the frequency of the signal for the guard interval duration in the opposite direction (a frequency shift of $-f_{SH}$) in order to eliminate the frequency shift of $f_{SH}$ applied at the transmitting end.

Note that correction to shift the frequency of the complex baseband signal for the combined guard interval duration by $-f_{SH}$ is not limited in this way and may, for example, be performed as follows. A correction unit may be provided before the P1 orthogonal transformation unit 153G. This correction unit shifts the frequency of the complex baseband signal in the time domain by $-f_{SH}$ and outputs the frequency-shifted complex baseband signal in the time domain to the P1 orthogonal transformation unit 153G. Alternatively, a correction unit may be provided after the P1 orthogonal transformation unit 153G. This correction unit corrects the signal output by the P1 orthogonal transformation unit 153G (a complex baseband signal in the frequency domain) to be a frequency that is one subcarrier lower (corresponding to a frequency shift of $-f_{SH}$) and outputs the lower-frequency complex baseband signal in the frequency domain to the P1 wide band fc error detection and correction unit 155G. Alternatively, when performing orthogonal transformation, the P1 orthogonal transformation unit 153G may perform correction by shifting the frequency by $-f_{SH}$.

The active carriers in the useful symbol duration of the P1 symbol are input into the P1 decoding unit 156 from the P1 wide band fc error detection and correction unit 155U, and the active carriers in the combined guard interval duration are input into the P1 decoding unit 156 from the P1 wide band fc error detection and correction unit 155G. As described below with reference to FIG. 8 and other figures, the P1 decoding unit 156 uses the active carriers in the useful symbol duration of the P1 symbol and the active carriers in the combined guard interval duration of the P1 symbol to decode the P1 symbol. The P1 decoding unit 156 then outputs the P1 transmission information transmitted by the P1 symbol to the control information collection unit 80 in FIG. 5 as control information.

Figure 8:
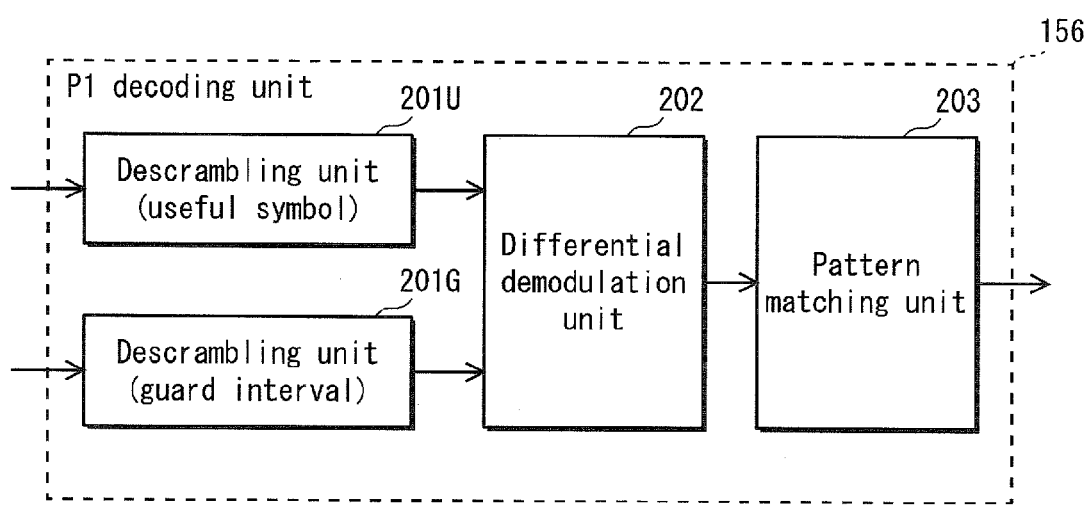
FIG. 8 shows the structure of a P1 decoding unit 156 in FIG. 6.
Figure 9:
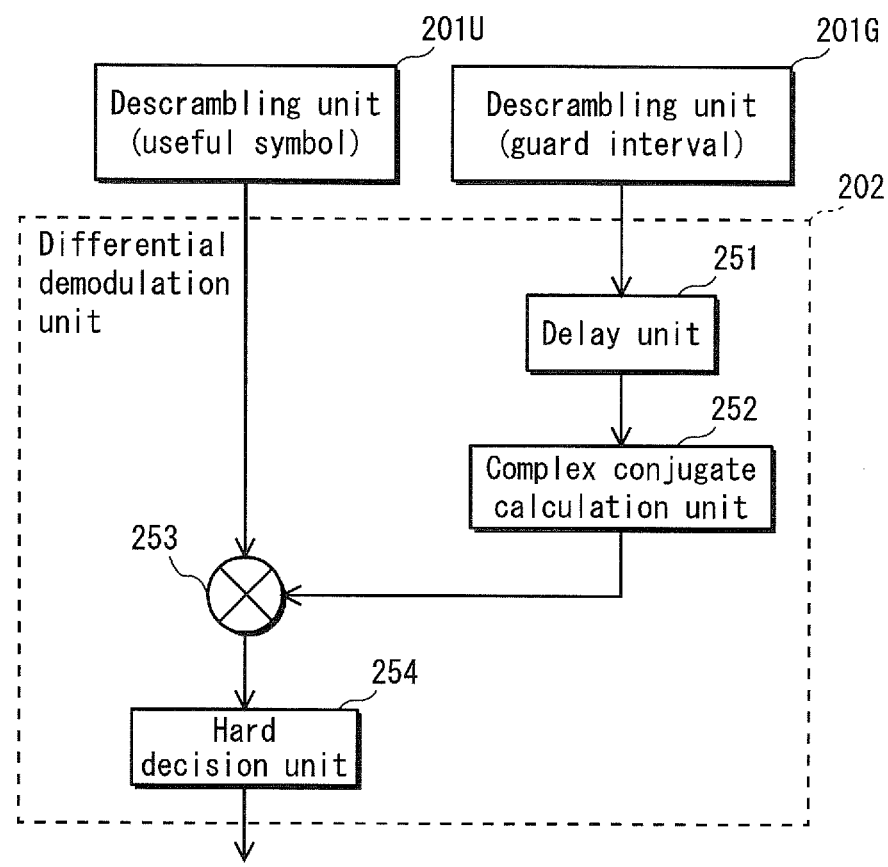
FIG. 9 shows the structure of a differential demodulation unit 202 in FIG. 8.

The following describes the P1 decoding unit 156 in FIG. 6 with reference to FIGS. 8 and 9.

FIG. 8 shows the structure of the P1 decoding unit 156 in FIG. 6. The P1 decoding unit 156 is provided with a descrambling unit 201U, a descrambling unit 201G, a differential demodulation unit 202, and a pattern matching unit 203. Note that in the P1 decoding unit 156 and the P1 decoding unit of other embodiments below, a P1 symbol is decoded using only the S1 signal in the low frequency domain of the P1 symbol.

A signal sequence $Act_U$ of active carriers in the useful symbol duration of the P1 symbol is input from the P1 wide band fc error detection and correction unit 155U in FIG. 6 into the descrambling unit 201U. The descrambling unit 201U performs the descrambling shown in Equation 20 below on the signal sequence $Act_U$ of active carriers and outputs a descrambled signal sequence $DESCR_U$ to the differential demodulation unit 202.

$$DESCR_U = DESCRAMBLING(Act_U) \quad \text{Equation 20}$$

Specifically, the descrambling unit 201U uses a signal $PRBS_i$ (i=0, 1, 2, ..., 319), based on PRBS and used for multiplication at the transmitting end, to perform the descrambling shown in Equation 21 below on a signal $Act_{U,i}$ constituting the signal sequence $Act_U$ of active carriers. The descrambling unit 201U then outputs a descrambled signal $DESCR_{U,i}$ to the differential demodulation unit 202.

$$DESCR_{U,i} = Act_{U,i} \times 2\left(\frac{1}{2} - PRBS_i\right) \quad \text{Equation 21}$$

A signal sequence $Act_G$ of active carriers in the combined guard interval duration of the P1 symbol is input from the P1 wide band fc error detection and correction unit 155G in FIG. 6 into the descrambling unit 201G. The descrambling unit 201G performs the descrambling shown in Equation 22 below on the signal sequence $Act_G$ of active carriers and outputs a descrambled signal sequence $DESCR_G$ to the differential demodulation unit 202.

$$DESCR_G = DESCRAMBLING(Act_G) \quad \text{Equation 22}$$

Specifically, the descrambling unit 201G uses a signal $PRBS_i$ (i=0, 1, 2, ..., 319), based on PRBS and used for multiplication at the transmitting end, to perform the descrambling shown in Equation 23 below on a signal $Act_{G,i}$ constituting the signal sequence $Act_G$ of active carriers. The descrambling unit 201G then outputs a descrambled signal $DESCR_{G,i}$ to the differential demodulation unit 202.

$$DESCR_{G,i} = Act_{G,i} \times 2\left(\frac{1}{2} - PRBS_i\right) \quad \text{Equation 23}$$

The signal sequence $DESCR_U$ for the useful symbol duration of the P1 symbol is input into the differential demodulation unit 202 from the descrambling unit 201U, and the signal sequence $DESCR_G$ for the combined guard interval duration of the P1 symbol is input into the differential demodulation unit 202 from the descrambling unit 201G. As described below with reference to FIG. 9, the differential demodulation unit 202 performs differential demodulation using the signal sequence $DESCR_U$ and the signal sequence $DESCR_G$, outputting a differentially demodulated signal sequence $DEMOD_{UG}$ to the pattern matching unit 203. Differential demodulation by the differential demodulation unit 202 corresponds to DBPSK.

The differential demodulation unit 202 is now described with reference to FIG. 9. FIG. 9 shows the structure of the differential demodulation unit 202 in FIG. 8. Note that in FIG. 9, the descrambling unit 201U and the descrambling unit 201G are also shown in order to clarify the input into the differential demodulation unit 202.

The differential demodulation unit 202 is provided with a delay unit 251, a complex conjugate calculation unit 252, a multiplier 253, and a hard decision unit 254. In the differential demodulation unit 202, a signal $DESCR_{G,i}$ (i=0, 1, ..., 319) constituting the signal sequence $DESCR_G$ for the combined guard interval duration of the P1 symbol is input, in order from the smallest subcarrier number, from the descrambling unit 201G into the delay unit 251. A signal $DESCR_{U,i}$ (i=0, 1, ..., 319) constituting the signal sequence $DESCR_U$ for the useful symbol duration of the P1 symbol is input, in order from the smallest subcarrier number, from the descrambling unit 201U into the multiplier 253.

The delay unit 251 delays each active carrier of the signal $DESCR_{G,i}$ (i=0, 1, ..., 319) input from the descrambling unit 201G by one active carrier and outputs the result to the complex conjugate calculation unit 252.

The complex conjugate calculation unit 252 calculates the complex conjugate of the signal output by the delay unit 251 (a signal for a signal sequence corresponding to the signal sequence $DESCR_G$ delayed by one active carrier) and outputs a signal for the calculated complex conjugate to the multiplier 253.

As shown in Equation 24 below, the multiplier 253 performs complex multiplication on the signal $DESCR_{U,i}$ (i=1, 2, ..., 319) input from the descrambling unit 201U and the signal $DESCR^*_{G,i-1}$ for the complex conjugate input from the complex conjugate calculation unit 252. The multiplier 253 then outputs a signal $DEMOD\_pre_{UG,i}$ resulting from the complex multiplication to the hard decision unit 254.

$$DEMOD\_pre_{UG,i} = DESCR_{U,i} \cdot DESCR^*_{G,i-1} \quad \text{Equation 24}$$

Since i=0 is a reference, the multiplier 253 does not perform complex multiplication, but rather outputs the signal $DESCR_{U,0}$ as is to the hard decision unit 254 as a signal $DEMOD\_pre_{UG,0}$, as shown in Equation 25 below.

$$DEMOD\_pre_{UG,0} = DESCR_{U,0} \quad \text{Equation 25}$$

Based on the polarity of the real axis as shown in Equation 26 below, the hard decision unit 254 demodulates (hard decision) the signal $DEMOD\_pre_{UG,i}$ (i=0, 1, ..., 319) input from the multiplier 253 and outputs a demodulated signal $DEMOD_{UG,i}$ to the pattern matching unit 203 in FIG. 8.

$$DEMOD_{UG,i} = \begin{cases} 0: \text{real}(DEMOD\_pre_{UG,i}) \geq 0 \\ 1: \text{real}(DEMOD\_pre_{UG,i}) < 0 \end{cases} \quad \text{Equation 26}$$

Note that as the hard decision, when the signal $DEMOD\_pre_{UG,i}$ is "0", the signal $DEMOD_{UG,i}$ is output as "0", but a "1" may be output instead. The same is true for other hard decisions as well.

Figure 10:
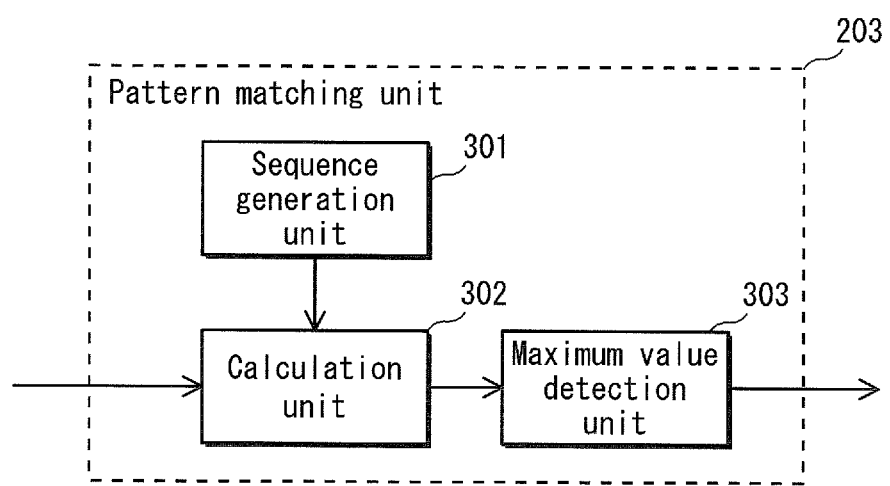
FIG. 10 shows the structure of a pattern matching unit 203 in FIG. 8.

As described below with reference to FIG. 10, the pattern matching unit 203 in FIG. 8 performs pattern matching using the signals $DEMOD_{UG,0}, DEMOD_{UG,1}, \ldots, DEMOD_{UG,319}$ differentially demodulated by the differential demodulation unit 202 and estimates the S1 signal and the S2 signal transmitted in the P1 symbol. The pattern matching unit 203 then acquires the P1 transmission information using the estimated S1 signal and S2 signal, outputting the acquired P1 transmission information to the control information collection unit 80 in FIG. 5. Note that the pattern matching unit 203 corresponds to an example of a transmission information estimation unit.

The pattern matching unit 203 is described with reference to FIG. 10. FIG. 10 shows the structure of the pattern matching unit 203 in FIG. 8. The pattern matching unit 203 is provided with a sequence generation unit 301, a calculation unit 302, and a maximum value detection unit 303.

The sequence generation unit 301 sequentially generates the sequence $CSS_{S1, k}$ (k=0, 1, . . . , 7) and the sequence $CSS_{S2, k}$ (k=0, 1, . . . , 15) shown in FIG. 38 and outputs the results to the calculation unit 302.

As shown in Equations 27 and 28 below, the calculation unit 302 divides the signals $DEMOD_{UG, 0}$, $DEMOD_{UG, 1}$, . . . , $DEMOD_{UG, 319}$ differentially demodulated by the differential demodulation unit 202 into a signal sequence $DEMOD\_CSS_{UG, S1}$ (corresponding to the S1 signal) and a signal sequence $DEMOD\_CSS_{UG, S2}$ (corresponding to the S2 signal).

$$DEMOD\_CSS_{UG,S1} = (DEMOD_{UG,0}, \ldots, DEMOD_{UG,63}) \quad \text{Equation 27}$$
$$= \begin{pmatrix} DEMOD\_CSS_{UG,S1,0}, \cdots, \\ DEMOD\_CSS_{UG,S1,63} \end{pmatrix}$$

$$DEMOD\_CSS_{UG,S2} = (DEMOD_{UG,64}, \ldots, DEMOD_{UG,319}) \quad \text{Equation 28}$$
$$= \begin{pmatrix} DEMOD\_CSS_{UG,S2,0}, \cdots, \\ DEMOD\_CSS_{UG,S2,255} \end{pmatrix}$$

As shown in Equation 29 below, the calculation unit 302 calculates correlations $CORR_{UG, S1, k}$ between the sequence $DEMOD\_CSS_{UG, S1}$ and each sequence $CSS_{S1, k}$ (k=0, 1, . . . , 7) in FIG. 38 input sequentially from the sequence generation unit 301, outputting the calculated correlation values to the maximum value detection unit 303. As shown in Equation 30 below, the calculation unit 302 calculates correlations $CORR_{UG, S2, k}$ between the sequence $DEMOD\_CSS_{UG, S2}$ and each sequence $CSS_{S2, k}$ (k=0, 1, . . . , 15) in FIG. 38 input sequentially from h sequence generation unit 301, outputting the calculated correlation values to the maximum value detection unit 303.

$$CORR_{UG,S1,k} = \sum_{i=0}^{63} DEMOD\_CSS_{UG,S1,i} \oplus CSS_{S1,k,i} \quad \text{Equation 29}$$

$\oplus$ indicates exclusive or $$CORR_{UG,S2,k} = \sum_{i=0}^{255} DEMOD\_CSS_{UG,S2,i} \oplus CSS_{S2,k,i} \quad \text{Equation 30}$$

$\oplus$ indicates exclusive or

The maximum value detection unit 303 estimates that the three-bit S1 signal (see FIG. 38) corresponding to the sequence $CSS_{S1, k}$ with the largest correlation among the eight correlations calculated using Equation 29 above is the transmitted S1 signal. The maximum value detection unit 303 estimates that the four-bit S2 signal (see FIG. 38) corresponding to the sequence $CSS_{S2, k}$ with the largest correlation among the 16 correlations calculated using Equation 30 above is the transmitted S2 signal. The maximum value detection unit 303 acquires the P1 transmission information using the estimated S1 signal and S2 signal, outputting the acquired P1 transmission information to the control information collection unit 80 in FIG. 5.

The following explains the reason behind improved accuracy of demodulation by the P1 decoding unit 156.

Figure 11:
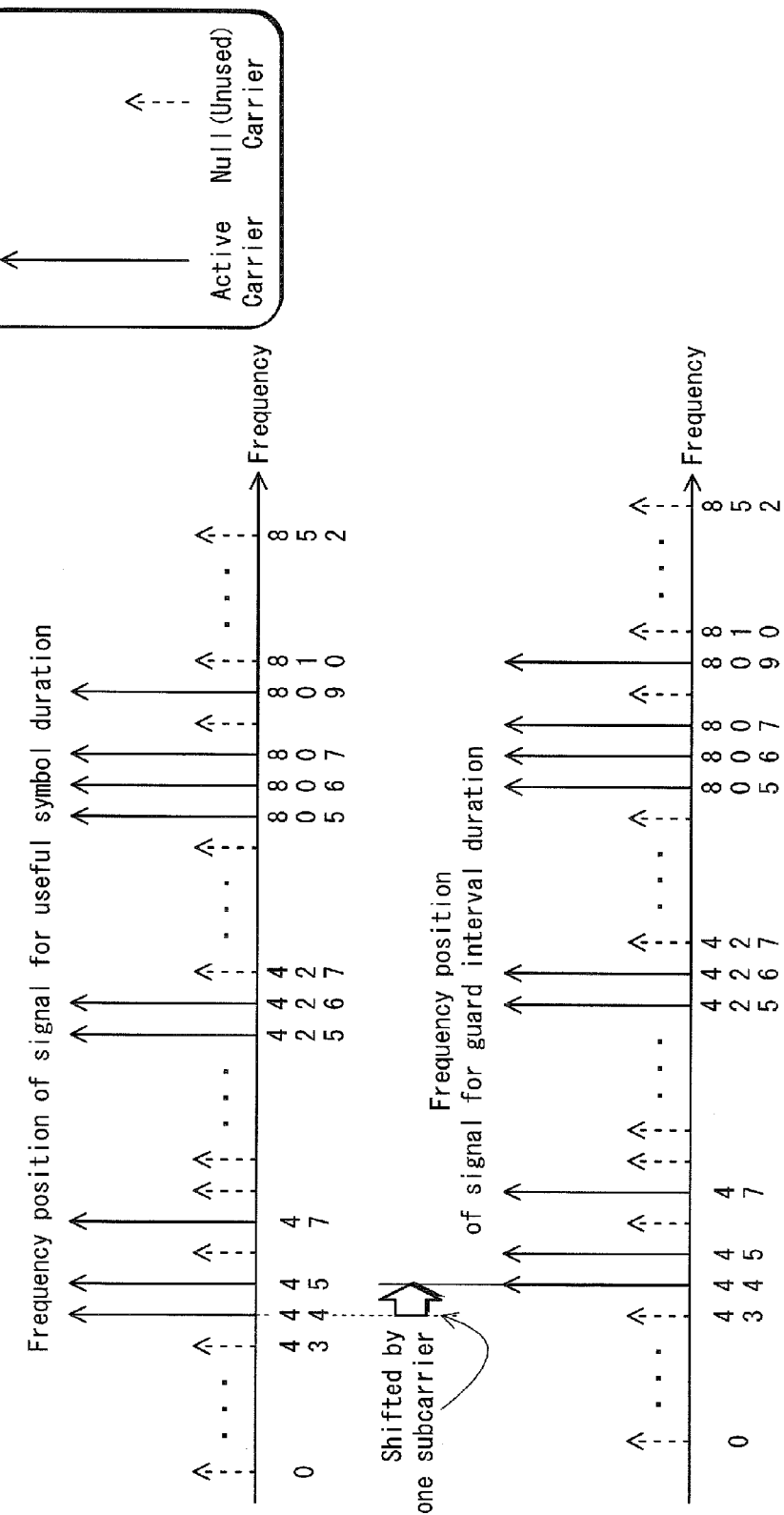
FIG. 11 is a schematic diagram comparing the frequency position of a signal for a useful symbol duration in a P1 symbol and the frequency position of a signal for a guard interval duration in a P1 symbol.

As described above, the signal for the earlier guard interval duration and the later guard interval duration of the P1 symbol is the signal for the corresponding duration of the useful symbol, shifted in frequency by $f_{SH}$ (i.e. frequency-shifted to be one subcarrier higher in frequency). In other words, as shown in FIG. 11, within the transmitted OFDM signal, the frequency position of the signal for the earlier guard interval duration and the later guard interval duration is shifted to be one subcarrier higher in frequency than the frequency position of the signal for the useful symbol duration. Note that in FIG. 11, the values shown below the frequency axis are subcarrier numbers, not the actual frequency values.

Accordingly, subcarrier number i of the signal for the useful symbol duration is located at the same frequency as subcarrier number (i−1) of the signal for the earlier guard interval duration or the later guard interval duration. Therefore, excluding noise and an inter-symbol interference component, these subcarriers have the same channel characteristics. For example, in FIG. 11, subcarrier number 45 of the signal for the useful symbol duration and subcarrier number 44 of the earlier guard interval duration have the same channel characteristics.

It therefore follows that by performing differential demodulation in the subcarrier direction using the signal for the useful symbol duration and the signal for the earlier guard interval duration and the later guard interval duration (the signal for the combined guard interval duration), the problem of a component of phase error remaining during differential demodulation due to a difference in channel characteristics between subcarriers can be controlled to the extent of one subcarrier. For example, if differential demodulation of subcarrier number 44 and subcarrier number 45 is performed using the signal for subcarrier number 45 of the useful symbol duration and the signal for subcarrier number 44 of the earlier guard interval duration, then since the channel characteristics are the same, the remaining component of the phase error disappears, thus eliminating the demodulation error caused by the remaining component of the phase error. Similarly, in the case of the rotation component received by each subcarrier when the orthogonal transformation (such as FFT) starting position is shifted, if differential demodulation is performed using the signal for subcarrier number 45 of the useful symbol duration and the signal for subcarrier number 44 of the earlier guard interval duration, then since the rotation component is the same, the remaining component of the phase error disappears, thus eliminating the demodulation error caused by the remaining component of the phase error.

The problem of a component of phase error remaining during differential demodulation due to a difference in channel characteristics between subcarriers can thus be controlled to the extent of one subcarrier, thereby allowing for a reduction in differential demodulation errors. As a result, decoding errors for the P1 symbol in the pattern matching unit 203 are reduced, thus allowing for the S1 and S2 signals to be correctly obtained even in an environment with multipath interference or when the starting position of orthogonal transformation (such as FFT) is shifted.

Embodiment 2

With reference to the drawings, the following describes Embodiment 2 of the present invention. Note that in the present embodiment, constituent elements that are substantially the same as the constituent elements of Embodiment 1 are indicated with the same reference signs, and a description thereof is omitted, since the same description as in Embodiment 1 applies.

The OFDM reception device of the present embodiment differs from the OFDM reception device 1 described in Embodiment 1 by being provided with a P1 decoding unit 350 that differs from the P1 decoding unit 156 of the OFDM reception device 1.

The P1 decoding unit 350 is described below with reference to the figures. In addition to differential demodulation using the signal for the useful symbol duration and the signal for the combined guard interval duration, the P1 decoding unit 350 decodes the P1 symbol by performing differential demodulation using only the signal for the useful symbol duration and differential demodulation using only the signal for the combined guard interval duration.

Figure 12:
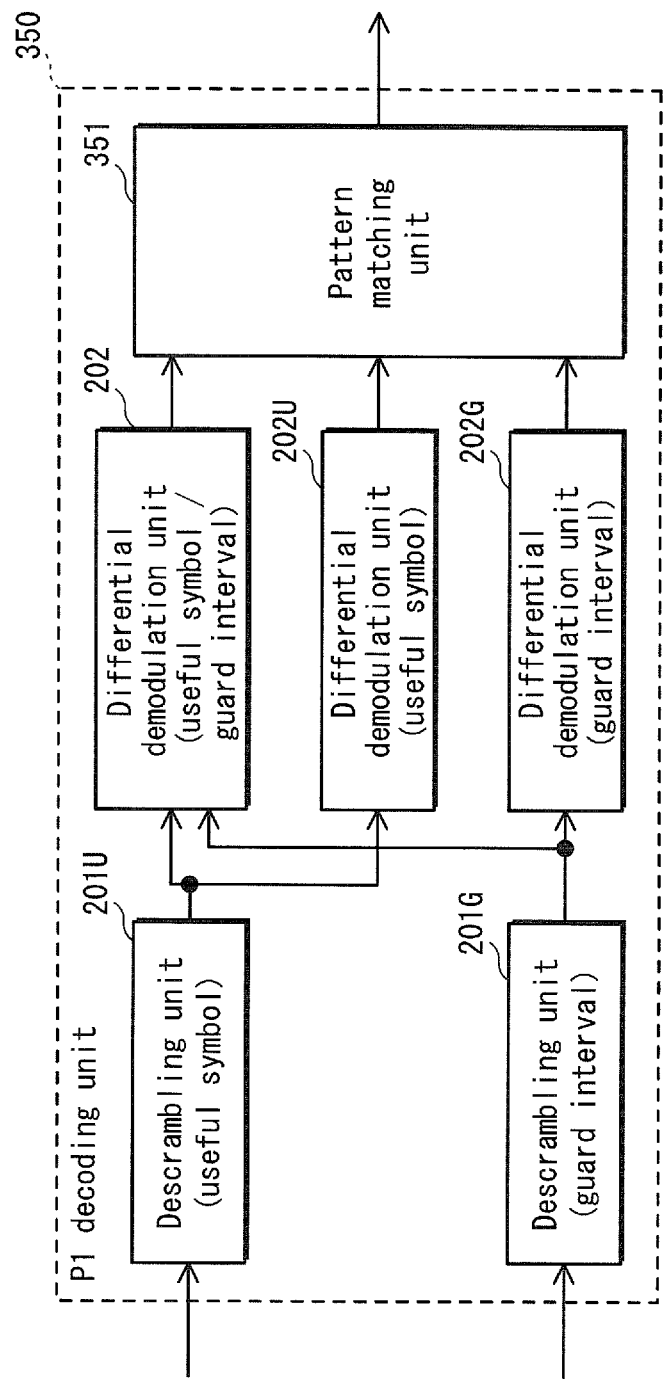
FIG. 12 shows the structure of a P1 decoding unit 350 according to Embodiment 2.

FIG. 12 shows the structure of the P1 decoding unit 350 in Embodiment 2. The P1 decoding unit 350 is provided with a descrambling unit 201U, a descrambling unit 201G, a differential demodulation unit 202, a differential demodulation unit 202U, a differential demodulation unit 202G, and a pattern matching unit 351.

The signal output by the descrambling unit 201U (signal sequence $DESCR_U$ for the useful symbol duration of the P1 symbol) is provided to the differential demodulation unit 202 and the differential demodulation unit 202U. The signal output by the descrambling unit 201G (signal sequence $DESCR_G$ for the combined guard interval duration of the P1 symbol) is provided to the differential demodulation unit 202 and the differential demodulation unit 202G. Note that as described in Embodiment 1, the differential demodulation unit 202 performs differential demodulation using the signal sequence $DESCR_U$ for the useful symbol duration of the P1 symbol and the signal sequence $DESCR_G$ for the combined guard interval duration of the P1 symbol.

Figure 13:
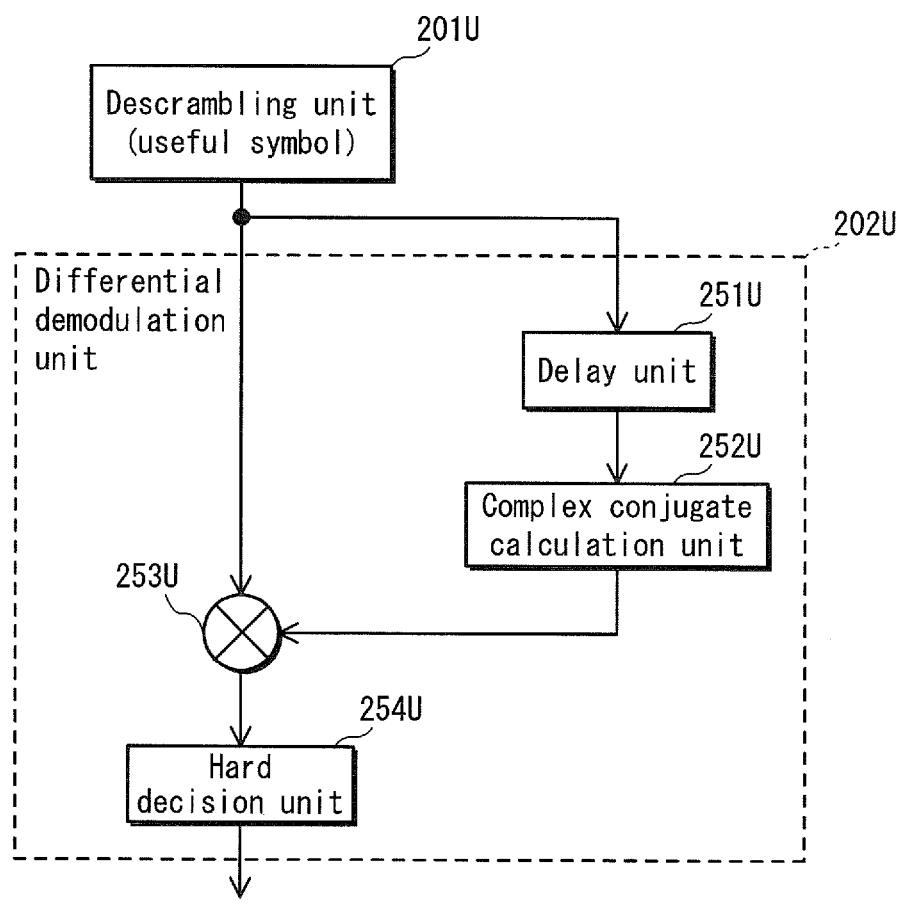
FIG. 13 shows the structure of a differential demodulation unit 202U in FIG. 12.

As described below with reference to FIG. 13, the differential demodulation unit 202U performs differential demodulation using only the signal sequence $DESCR_U$ for the useful symbol duration of the P1 symbol, outputting the differentially demodulated signal sequence $DEMOD_U$ to the pattern matching unit 351. Differential demodulation by the differential demodulation unit 202U corresponds to DBPSK.

The differential demodulation unit 202U is now described with reference to FIG. 13. FIG. 13 shows the structure of the differential demodulation unit 202U in FIG. 12. Note that in FIG. 13, the descrambling unit 201U is also shown in order to clarify the input into the differential demodulation unit 202U.

The differential demodulation unit 202U is provided with a delay unit 251U, a complex conjugate calculation unit 252U, a multiplier 253U, and a hard decision unit 254U. In the differential demodulation unit 202U, a signal $DESCR_{U,i}$ (i=0, 1, . . . , 319) constituting the signal sequence $DESCR_U$ for the useful symbol duration of the P1 symbol is input, in order from the smallest subcarrier number, from the descrambling unit 201U into the delay unit 251U and the multiplier 253U.

The delay unit 251U delays each active carrier of the signal $DESCR_{U,i}$ (i=0, 1, . . . , 319) input from the descrambling unit 201U by one active carrier and outputs the result to the complex conjugate calculation unit 252U.

The complex conjugate calculation unit 252U calculates the complex conjugate of the signal output by the delay unit 251U (a signal for a signal sequence corresponding to the signal sequence $DESCR_U$ delayed by one active carrier) and outputs a signal for the calculated complex conjugate to the multiplier 253U.

As shown in Equation 31 below, the multiplier 253U performs complex multiplication on the signal $DESCR_{U,i}$ (i=1, 2, . . . , 319) input from the descrambling unit 201U and the signal $DESCR^*_{U,i-1}$ for the complex conjugate input from the complex conjugate calculation unit 252U. The multiplier 253U then outputs a signal $DEMOD\_pre_{U,i}$ resulting from the complex multiplication to the hard decision unit 254U.

$$DEMOD\_pre_{U,i}=DESCR_{U,i} \cdot DESCR^*_{U,i-1} \qquad \text{Equation 31}$$

Since i=0 is a reference, the multiplier 253U does not perform complex multiplication, but rather outputs the signal $DESCR_{U,0}$ as is to the hard decision unit 254U as a signal $DEMOD\_pre_{U,0}$, as shown in Equation 32 below.

$$DEMOD\_pre_{U,0}=DESCR_{U,0} \qquad \text{Equation 32}$$

Based on the polarity of the real axis as shown in Equation 33 below, the hard decision unit 254U demodulates (hard decision) the signal $DEMOD\_pre_{U,i}$ (i=0, 1, . . . , 319) input from the multiplier 253U and outputs a demodulated signal $DEMOD_{U,i}$ to the pattern matching unit 351 in FIG. 12.

$$DEMOD_{U,i} = \begin{cases} 0: \text{real}(DEMOD\_pre_{U,i}) \geq 0 \\ 1: \text{real}(DEMOD\_pre_{U,i}) < 0 \end{cases} \qquad \text{Equation 33}$$

Figure 14:
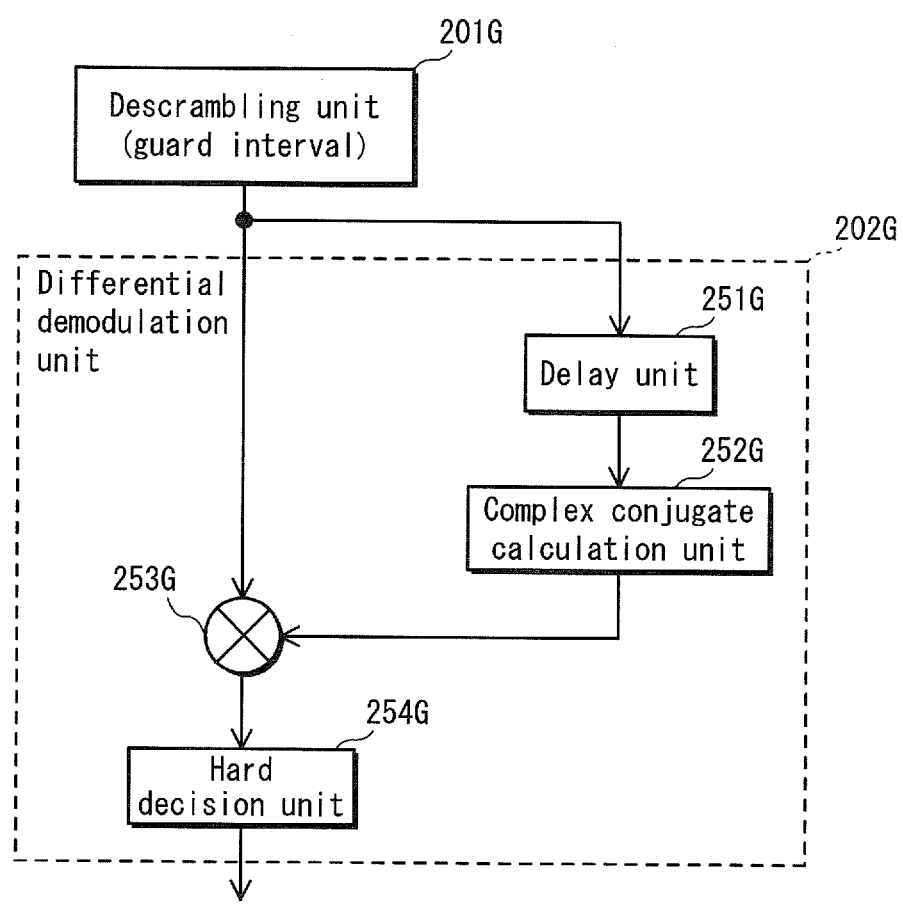
FIG. 14 shows the structure of a differential demodulation unit 202G in FIG. 12.

As described below with reference to FIG. 14, the differential demodulation unit 202G in FIG. 12 performs differential demodulation using only the signal sequence $DESCR_G$ for the combined guard interval duration of the P1 symbol, outputting the differentially demodulated signal sequence $DEMOD_G$ to the pattern matching unit 351. Differential demodulation by the differential demodulation unit 202G corresponds to DBPSK.

The differential demodulation unit 202G is described with reference to FIG. 14. FIG. 14 shows the structure of the differential demodulation unit 202G in FIG. 12. Note that in FIG. 14, the descrambling unit 201G is also shown in order to clarify the input into the differential demodulation unit 202G.

The differential demodulation unit 202G is provided with a delay unit 251G, a complex conjugate calculation unit 252G, a multiplier 253G, and a hard decision unit 254G. In the differential demodulation unit 202G, a signal $DESCR_{G,i}$ (i=0, 1, . . . , 319) constituting the signal sequence $DESCR_G$ for the combined guard interval duration of the P1 symbol is input, in order from the smallest subcarrier number, from the descrambling unit 201G into the delay unit 251G and the multiplier 253G.

The delay unit 251G delays each active carrier of the signal $DESCR_{G,i}$ (i=0, 1, . . . , 319) input from the descrambling unit 201G by one active carrier and outputs the result to the complex conjugate calculation unit 252G.

The complex conjugate calculation unit 252G calculates the complex conjugate of the signal output by the delay unit 251G (a signal for a signal sequence corresponding to the signal sequence $DESCR_G$ delayed by one active carrier) and outputs a signal for the calculated complex conjugate to the multiplier 253G.

As shown in Equation 34 below, the multiplier 253G performs complex multiplication on the signal $DESCR_{G,i}$ (i=1, 2, . . . , 319) input from the descrambling unit 201G and the signal $DESCR^*_{G,i-1}$ for the complex conjugate input from the complex conjugate calculation unit 252G. The multiplier 253G then outputs a signal $DEMOD\_pre_{G,i}$ resulting from the complex multiplication to the hard decision unit 254G.

$$DEMOD\_pre_{G,i}=DESCR_{G,i} \cdot DESCR^*_{G,i-1} \qquad \text{Equation 34}$$

Since i=0 is a reference, the multiplier 253G does not perform complex multiplication, but rather outputs the signal DESCR$_{G, 0}$ as is to the hard decision unit 254G as a signal DEMOD_pre$_{G, 0}$, as shown in Equation 35 below.

$$\text{DEMOD\_pre}_{G,0} = \text{DESCR}_{G,0} \quad \text{Equation 35}$$

Based on the polarity of the real axis as shown in Equation 36 below, the hard decision unit 254G demodulates (hard decision) the signal DEMOD_pre$_{G, i}$ (i=0, 1, ..., 319) input from the multiplier 253G and outputs a demodulated signal DEMOD$_{G, i}$ to the pattern matching unit 351 in FIG. 12.

$$\text{DEMOD}_{G,i} = \begin{cases} 0: & \text{real(DEMOD\_pre}_{G,i}) \geq 0 \\ 1: & \text{real(DEMOD\_pre}_{G,i}) < 0 \end{cases} \quad \text{Equation 36}$$

The pattern matching unit 351 in FIG. 12 divides the signals DEMOD$_{UG, 0}$ DEMOD$_{UG, 1}$, ..., DEMOD$_{UG, 319}$ differentially demodulated by the differential demodulation unit 202 into a signal sequence DEMOD_CSS$_{UG, S1}$ (corresponding to the S1 signal) and a signal sequence DEMOD_CSS$_{UG, S2}$ (corresponding to the S2 signal), as shown in Equations 27 and 28 above.

The pattern matching unit 351 also divides the signals DEMOD$_{U, 0}$, DEMOD$_{U, 1}$, ..., DEMOD$_{U, 319}$ differentially demodulated by the differential demodulation unit 202U into a signal sequence DEMOD_CSS$_{U, S1}$ (corresponding to the S1 signal) and a signal sequence DEMOD_CSS$_{U, S2}$ (corresponding to the S2 signal), as shown in Equations 37 and 38 below.

$$\text{DEMOD\_CSS}_{U,S1} = (DEMOD_{U,0}, \ldots, DEMOD_{U,63}) \quad \text{Equation 37}$$
$$= \begin{pmatrix} \text{DEMOD\_CSS}_{U,S1,0}, \cdots, \\ \text{DEMOD\_CSS}_{U,S1,63} \end{pmatrix}$$

$$\text{DEMOD\_CSS}_{U,S2} = (DEMOD_{U,64}, \ldots, DEMOD_{U,319}) \quad \text{Equation 38}$$
$$= \begin{pmatrix} \text{DEMOD\_CSS}_{U,S2,0}, \cdots, \\ \text{DEMOD\_CSS}_{U,S2,255} \end{pmatrix}$$

Furthermore, the pattern matching unit 351 divides the signals DEMOD$_{G, 0}$, DEMOD$_{G, 1}$, ..., DEMOD$_{G, 319}$ differentially demodulated by the differential demodulation unit 202G into a signal sequence DEMOD_CSS$_{G, S1}$ (corresponding to the S1 signal) and a signal sequence DEMOD_CSS$_{G, S2}$ (corresponding to the S2 signal), as shown in Equations 39 and 40 below.

$$\text{DEMOD\_CSS}_{G,S1} = (DEMOD_{G,0}, \ldots, DEMOD_{G,63}) \quad \text{Equation 39}$$
$$= \begin{pmatrix} \text{DEMOD\_CSS}_{G,S1,0}, \cdots, \\ \text{DEMOD\_CSS}_{G,S1,63} \end{pmatrix}$$

$$\text{DEMOD\_CSS}_{G,S2} = (DEMOD_{G,64}, \ldots, DEMOD_{G,319}) \quad \text{Equation 40}$$
$$= \begin{pmatrix} \text{DEMOD\_CSS}_{G,S2,0}, \cdots, \\ \text{DEMOD\_CSS}_{G,S2,255} \end{pmatrix}$$

As shown in Equation 29 above, Equation 41 below, and Equation 42 below, the pattern matching unit 351 calculates correlations CORR$_{UG, S1, k}$, CORR$_{U, S1, k}$, and CORR$_{G, S1, k}$ between the sequences CSS$_{S1, k}$ (k=0, 1, ..., 7) in FIG. 38 and the sequences DEMOD_CSS$_{UG, S1}$, DEMOD_CSS$_{G, S1}$ and DEMOD_CSS$_{G, S1}$.

$$CORR_{U,S1,k} = \sum_{i=0}^{63} \text{DEMOD\_CSS}_{U,S1,i} \oplus CSS_{S1,k,i} \quad \text{Equation 41}$$

$\oplus$ indicates exclusive or $$CORR_{G,S1,k} = \sum_{i=0}^{63} \text{DEMOD\_CSS}_{G,S1,i} \oplus CSS_{S1,k,i} \quad \text{Equation 42}$$

$\oplus$ indicates exclusive or

As shown in Equation 30 above, Equation 43 below, and Equation 44 below, the pattern matching unit 351 also calculates correlations CORR$_{UG, S2, k}$, CORR$_{U, S2, k}$, and CORR$_{G, S2, k}$ between the sequences CSS$_{S2, k}$ (k=0, 1, ..., 15) in FIG. 38 and the sequences DEMOD_CSS$_{UG, S2}$, DEMOD_CSS$_{G, S2}$, and DEMOD_CSS$_{G, S2}$.

$$CORR_{U,S2,k} = \sum_{i=0}^{255} \text{DEMOD\_CSS}_{U,S2,i} \oplus CSS_{S2,k,i} \quad \text{Equation 43}$$

$\oplus$ indicates exclusive or $$CORR_{G,S2,k} = \sum_{i=0}^{255} \text{DEMOD\_CSS}_{G,S2,i} \oplus CSS_{S2,k,i} \quad \text{Equation 44}$$

$\oplus$ indicates exclusive or

The pattern matching unit 351 estimates that the three-bit S1 signal (see FIG. 38) corresponding to the sequence CSS$_{S1, k}$ with the largest correlation among the 24 correlations calculated using Equations 29, 41, and 42 above is the transmitted S1 signal. The pattern matching unit 351 estimates that the four-bit S2 signal (see FIG. 38) corresponding to the sequence CSS$_{S2, k}$ with the largest correlation among the 48 correlations calculated using Equations 30, 43, and 44 above is the transmitted S2 signal. The pattern matching unit 351 acquires the P1 transmission information using the estimated S1 signal and S2 signal, outputting the acquired P1 transmission information to the control information collection unit 80 in FIG. 5 as control information.

With this structure, the P1 symbol can be decoded using the most reliable signal not only in an environment with multipath interference or when the starting position of orthogonal transformation (such as FFT) is shifted, but also when the received signal has been affected by impulse noise or the like in a portion of the useful symbol duration or the guard interval duration. The decoding accuracy of the P1 symbol thus improves.

Embodiment 3

With reference to the drawings, the following describes Embodiment 3 of the present invention. Note that in the present embodiment, constituent elements that are substantially the same as the constituent elements of Embodiments 1 and 2 are indicated with the same reference signs, and a description thereof is omitted, since the same description as in Embodiments 1 and 2 applies.

The OFDM reception device of the present embodiment differs from the OFDM reception devices described in Embodiments 1 and 2 by being provided with a P1 decoding unit 400 that differs from the P1 decoding units 156 and 350 of the above OFDM reception devices.

The P1 decoding unit 400 is described below with reference to the figures. The P1 decoding unit 400 performs differential demodulation using the signal for the useful symbol duration and the signal for the combined guard interval duration, but the mechanism for differential demodulation differs from the differential demodulation unit 202 in Embodiments 1 and 2.

Figure 15:
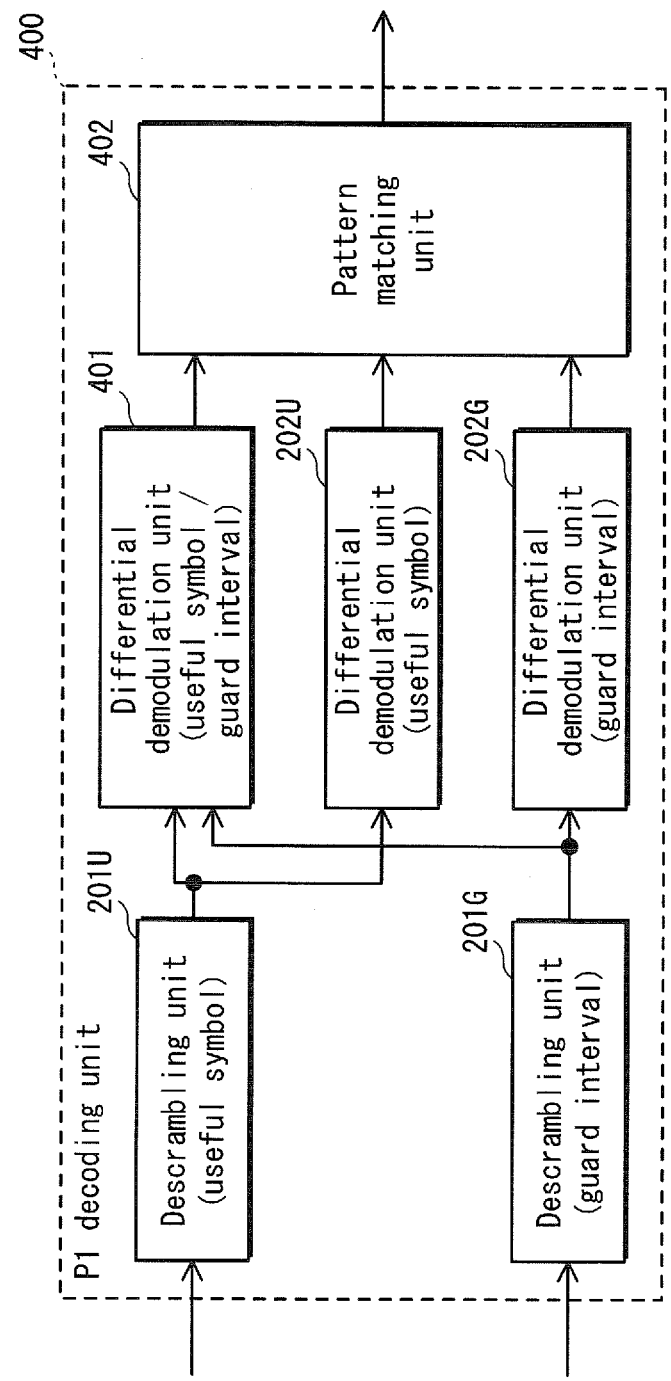
FIG. 15 shows the structure of a P1 decoding unit 400 according to Embodiment 3.

FIG. 15 shows the structure of the P1 decoding unit 400 in Embodiment 3.

The P1 decoding unit 400 is provided with a descrambling unit 201U, a descrambling unit 201G, a differential demodulation unit 401, a differential demodulation unit 202U, a differential demodulation unit 202G, and a pattern matching unit 402.

The signal output by the descrambling unit 201U (signal sequence $DESCR_U$ for the useful symbol duration of the P1 symbol) is provided to the differential demodulation unit 401 and the differential demodulation unit 202U. The signal output by the descrambling unit 201G (signal sequence $DESCR_G$ for the combined guard interval duration of the P1 symbol) is provided to the differential demodulation unit 401 and the differential demodulation unit 202G. Note that as described in Embodiment 2, the differential demodulation unit 202U performs differential demodulation using only the signal sequence $DESCR_U$ for the useful symbol duration of the P1 symbol. Also as described in Embodiment 2, the differential demodulation unit 202G performs differential demodulation using only the signal sequence $DESCR_G$ for the combined guard interval duration of the P1 symbol.

Figure 16:
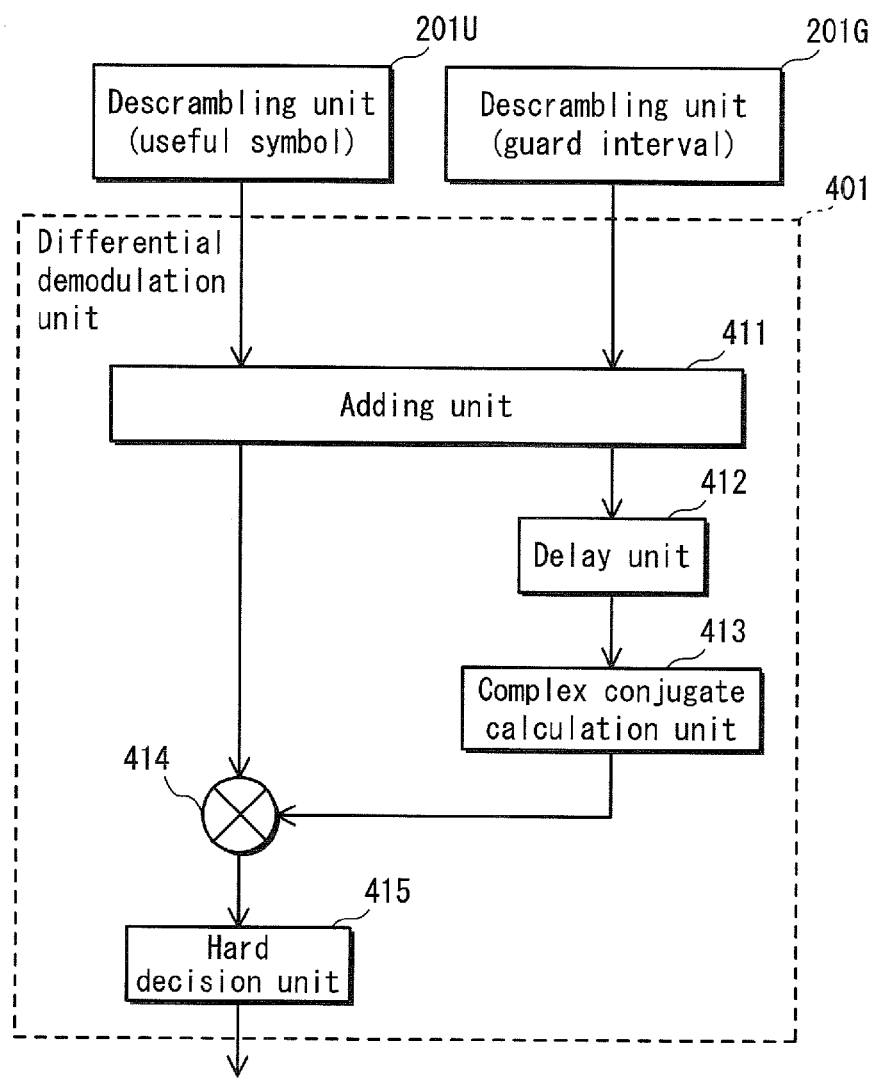
FIG. 16 shows the structure of a differential demodulation unit 401 in FIG. 15.

As described below with reference to FIG. 16, the differential demodulation unit 401 adds the signal sequence $DESCR_U$ for the useful symbol duration of the P1 symbol and the signal sequence $DESCR_G$ for the combined guard interval duration of the P1 symbol. The differential demodulation unit 401 performs differential demodulation using a signal sequence $DESCR_{SUG}$ yielded by the addition and outputs a differentially demodulated signal sequence $DEMOD_{SUG}$ to the pattern matching unit 402. Differential demodulation by the differential demodulation unit 401 corresponds to DBPSK.

The differential demodulation unit 401 is now described with reference to FIG. 16. FIG. 16 shows the structure of the differential demodulation unit 401 in FIG. 15. Note that in FIG. 16, the descrambling unit 201U and the descrambling unit 201G are also shown in order to clarify the input into the differential demodulation unit 401.

The differential demodulation unit 401 is provided with an adding unit 411, a delay unit 412, a complex conjugate calculation unit 413, a multiplier 414, and a hard decision unit 415. In the differential demodulation unit 401, a signal $DESCR_{U, i}$ (i=0, 1, ..., 319) constituting the signal sequence $DESCR_U$ for the useful symbol duration of the P1 symbol is input, in order from the smallest subcarrier number, from the descrambling unit 201U into the adding unit 411. A signal $DESCR_{G, i}$ (i=0, 1, ..., 319) constituting the signal sequence $DESCR_G$ for the combined guard interval duration of the P1 symbol is input, in order from the smallest subcarrier number, from the descrambling unit 201G into the adding unit 411.

The adding unit 411 adds the signal $DESCR_{U, i}$ (i=0, 1, ..., 319) and the signal $DESCR_{G, i}$, outputting a signal $DESCR_{SUG, i}$ yielded by the addition to the delay unit 412 and the multiplier 414.

The delay unit 412 delays each active carrier of the signal $DESCR_{SUG, i}$ (i=0, 1, ..., 319) input from the adding unit 411 by one active carrier and outputs the result to the complex conjugate calculation unit 413.

The complex conjugate calculation unit 413 calculates the complex conjugate of the signal output by the delay unit 412 (a signal for a signal sequence corresponding to the signal sequence $DESCR_{SUG}$ delayed by one active carrier) and outputs a signal for the calculated complex conjugate to the multiplier 414.

As shown in Equation 45 below, the multiplier 414 performs complex multiplication on the signal $DESCR_{SUG, i}$ (i=1, ..., 319) input from the adding unit 411 and the signal $DESCR^*_{SUG, i}$ for the complex conjugate input from the complex conjugate calculation unit 413. The multiplier 414 then outputs a signal $DEMOD\_pre_{SUG, i}$ resulting from the complex multiplication to the hard decision unit 415.

$$DEMOD\_pre_{SUG,i} = DESCR_{SUG,i} \cdot DESCR^*_{SUG,i-1} \quad \text{Equation 45}$$

Since i=0 is a reference, the multiplier 414 does not perform complex multiplication, but rather outputs the signal $DESCR_{SUG, 0}$ as is to the hard decision unit 415 as a signal $DEMOD\_pre_{SUG, 0}$, as shown in Equation 46 below.

$$DEMOD\_pre_{SUG,0} = DESCR_{SUG,0} \quad \text{Equation 46}$$

Based on the polarity of the real axis as shown in Equation 47 below, the hard decision unit 415 demodulates (hard decision) the signal $DEMOD\_pre_{SUG, i}$ (i=0, 1, ..., 319) input from the multiplier 414 and outputs a demodulated signal $DEMOD_{SUG, i}$ to the pattern matching unit 402 in FIG. 15.

$$DEMOD_{SUG,i} = \begin{cases} 0 : \text{real}(DEMOD\_pre_{SUG,i}) \geq 0 \\ 1 : \text{real}(DEMOD\_pre_{SUG,i}) < 0 \end{cases} \quad \text{Equation 47}$$

The pattern matching unit 402 in FIG. 15 divides the signals $DEMOD_{SUG, 0}$, $DEMOD_{SUG, 1}$, ..., $DEMOD_{SUG, 319}$ differentially demodulated by the differential demodulation unit 401 into a signal sequence $DEMOD\_CSS_{SUG, S1}$ (corresponding to the S1 signal) and a signal sequence $DEMOD\_CSS_{SUG, S2}$ (corresponding to the S2 signal), as shown in Equations 48 and 49 below.

$$DEMOD\_CSS_{SUG,S1} = (DEMOD_{SUG,0}, \ldots, DEMOD_{SUG,63}) \quad \text{Equation 48}$$
$$= \begin{pmatrix} DEMOD\_CSS_{SUG,S1,0}, \ldots, \\ DEMOD\_CSS_{SUG,S1,63} \end{pmatrix}$$

$$DEMOD\_CSS_{SUG,S2} = (DEMOD_{SUG,64}, \ldots, DEMOD_{SUG,319}) \quad \text{Equation 49}$$
$$= \begin{pmatrix} DEMOD\_CSS_{SUG,S2,0}, \ldots, \\ DEMOD\_CSS_{SUG,S2,255} \end{pmatrix}$$

The pattern matching unit 402 also divides the signals $DEMOD_{U, 0}$, $DEMOD_{U, 1}$, $DEMOD_{U, 319}$ differentially demodulated by the differential demodulation unit 202U into a signal sequence $DEMOD\_CSS_{U, S1}$ (corresponding to the S1 signal) and a signal sequence $DEMOD\_CSS_{U, S2}$ (corresponding to the S2 signal), as shown in Equations 37 and 38 above.

Furthermore, the pattern matching unit 402 divides the signals $DEMOD_{G, 0}$, $DEMOD_{G, 1}$, ..., $DEMOD_{G, 319}$ differentially demodulated by the differential demodulation unit 202G into a signal sequence $DEMOD\_CSS_{G, S1}$ (corresponding to the S1 signal) and a signal sequence $DEMOD\_CSS_{G, S2}$ (corresponding to the S2 signal), as shown in Equations 39 and 40 above.

As shown in Equation 50 below, Equation 41 above, and Equation 42 above, the pattern matching unit 402 calculates correlations $CORR_{SUG, S1, k}$, $CORR_{U, S1, k}$, and $CORR_{G, S1, k}$ between the sequences $CSS_{S1, k}$ (k=0, 1, ..., 7) in FIG. 38 and the sequences $DEMOD\_CSS_{SUG, S1}$, $DEMOD\_CSS_{U, S1}$, and $DEMOD\_CSS_{G, S1}$.

$$CORR_{SUG,S1,k} = \sum_{i=0}^{63} DEMOD\_CSS_{SUG,S1,i} \oplus CSS_{S1,k,i} \quad \text{Equation 50}$$

⊕ indicates exclusive or

As shown in Equation 51 below, Equation 43 above, and Equation 44 above, the pattern matching unit 402 calculates correlations $CORR_{SUG, S2, k}$, $CORR_{U, S2, k}$, and $CORR_{G, S2, k}$ between the sequences $CSS_{S2, k}$ (k=0, 1, ..., 15) in FIG. 38 and the sequences $DEMOD\_CSS_{SUG, S2}$, $DEMOD\_CSS_{U, S2}$, and $DEMOD\_CSS_{G, S2}$.

$$CORR_{SUG,S2,k} = \sum_{i=0}^{255} DEMOD\_CSS_{SUG,S2,i} \oplus CSS_{S2,k,i} \quad \text{Equation 51}$$

⊕ indicates exclusive or

The pattern matching unit 402 estimates that the three-bit S1 signal (see FIG. 38) corresponding to the sequence $CSS_{S1, k}$ with the largest correlation among the 24 correlations calculated using Equations 50, 41, and 42 above is the transmitted S1 signal. The pattern matching unit 402 estimates that the four-bit S2 signal (see FIG. 38) corresponding to the sequence $CSS_{S2, k}$ with the largest correlation among the 48 correlations calculated using Equations 51, 43, and 44 above is the transmitted S2 signal. The pattern matching unit 402 acquires the P1 transmission information using the estimated S1 signal and S2 signal, outputting the acquired P1 transmission information to the control information collection unit 80 in FIG. 5 as control information.

With this structure, demodulation can be performed using the most reliable signal even when the received signal has been affected by impulse noise or the like in a portion of the useful symbol duration or the guard interval duration, or in an environment in which demodulation errors easily occur, such as a very noisy environment or an environment with multipath interference. The accuracy of demodulation of the P1 symbol thus improves.

Embodiment 4

With reference to the drawings, the following describes Embodiment 4 of the present invention. Note that in the present embodiment, constituent elements that are substantially the same as the constituent elements of Embodiments 1 through 3 are indicated with the same reference signs, and a description thereof is omitted, since the same description as in Embodiments 1 through 3 applies.

The OFDM reception device of the present embodiment differs from the OFDM reception devices described in Embodiments 1 through 3 by being provided with a P1 decoding unit 450 that differs from the P1 decoding units 156, 350, and 400 of the above OFDM reception devices.

The P1 decoding unit 450 is described below with reference to the figures. The P1 decoding unit 450 performs all four types of differential demodulation described in Embodiments 1 through 3.

Figure 17:
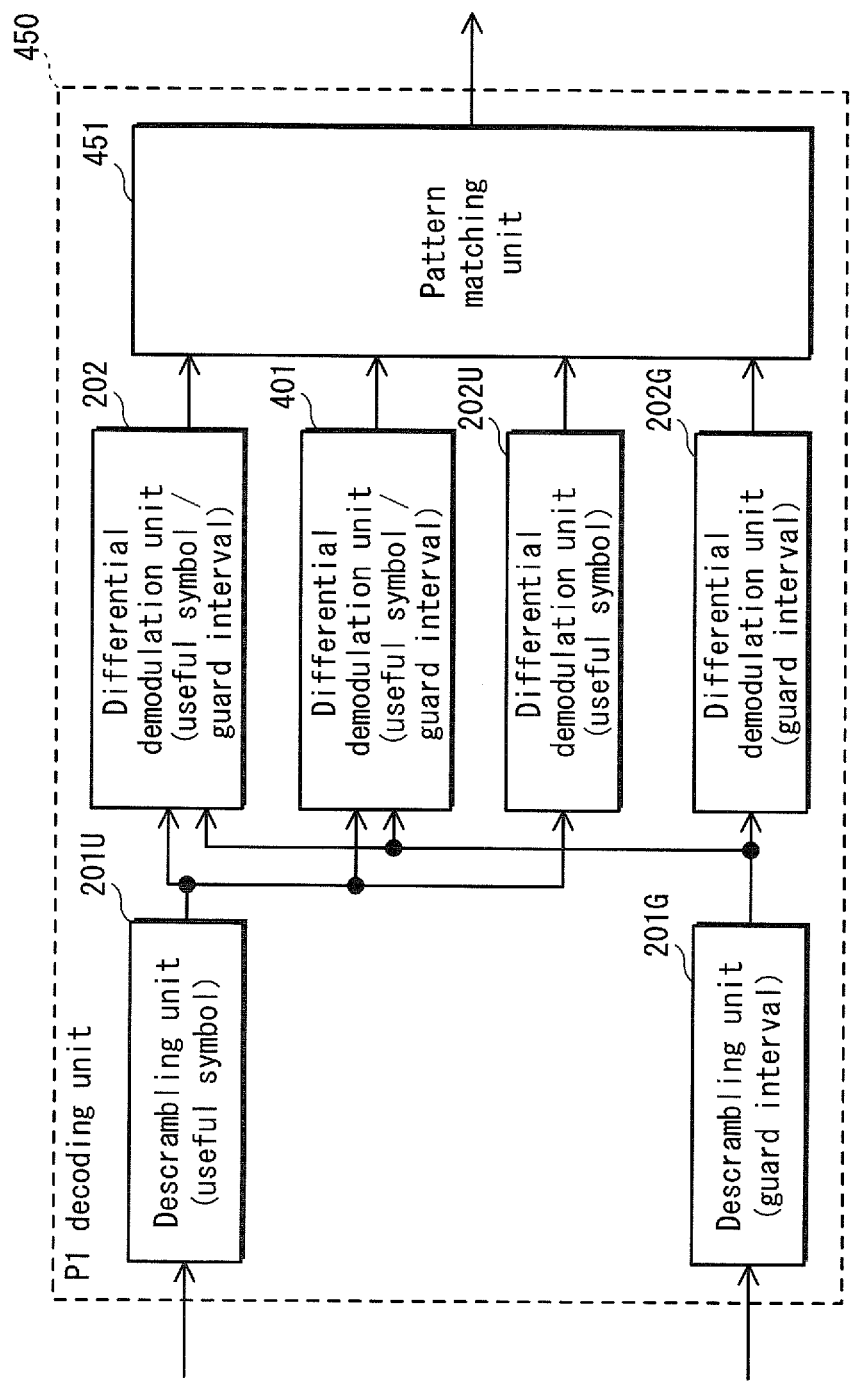
FIG. 17 shows the structure of a P1 decoding unit 450 according to Embodiment 5.

FIG. 17 shows the structure of the P1 decoding unit 450 in Embodiment 4. The P1 decoding unit 450 is provided with a descrambling unit 201U, a descrambling unit 201G, a differential demodulation unit 202, a differential demodulation unit 401, a differential demodulation unit 202U, a differential demodulation unit 202G, and a pattern matching unit 451.

As shown in Equations 27 and 28 above, the pattern matching unit 451 divides the signals $DEMOD_{UG, 0}$, $DEMOD_{UG, 1}$, $DEMOD_{UG, 319}$ differentially demodulated by the differential demodulation unit 202 into a signal sequence $DEMOD\_CSS_{UG, S1}$ (corresponding to the S1 signal) and a signal sequence $DEMOD\_CSS_{UG, S2}$ (corresponding to the S2 signal). The pattern matching unit 451 also divides the signals $DEMOD_{SUG, 0}$, $DEMOD_{SUG, 1}$, ..., $DEMOD_{SUG, 319}$ differentially demodulated by the differential demodulation unit 401 into a signal sequence $DEMOD\_CSS_{SUG, S1}$ (corresponding to the S1 signal) and a signal sequence $DEMOD\_CSS_{SUG, S2}$ (corresponding to the S2 signal), as shown in Equations 48 and 49 above.

Furthermore, the pattern matching unit 451 divides the signals $DEMOD_{U, 0}$, $DEMOD_{U, 1}$, $DEMOD_{U, 319}$ differentially demodulated by the differential demodulation unit 202U into a signal sequence $DEMOD\_CSS_{U, S1}$ (corresponding to the S1 signal) and a signal sequence $DEMOD\_CSS_{U, S2}$ (corresponding to the S2 signal), as shown in Equations 37 and 38 above. The pattern matching unit 451 also divides the signals $DEMOD_{G, 0}$, $DEMOD_{G, 1}$, ..., $DEMOD_{G, 319}$ differentially demodulated by the differential demodulation unit 202G into a signal sequence $DEMOD\_CSS_{G, S1}$ (corresponding to the S1 signal) and a signal sequence $DEMOD\_CSS_{G, S2}$ (corresponding to the S2 signal), as shown in Equations 39 and 40 above.

As shown in Equations 29, 50, 41, and 42 above, the pattern matching unit 451 calculates correlations $CORR_{UG, S1, k}$, $CORR_{SUG, S1, k}$, $CORR_{U, S1, k}$, and $CORR_{G, S1, k}$ between the sequences $CSS_{S1, k}$ (k=0, 1, ..., 7) in FIG. 38 and the sequences $DEMOD\_CSS_{UG, S1}$, $DEMOD\_CSS_{SUG, S1}$, $DEMOD\_CSS_{U, S1}$, and $DEMOD\_CSS_{G, S1}$.

As shown in Equations 30, 51, 43, and 44 above, the pattern matching unit 451 calculates correlations $CORR_{UG, S2, k}$, $CORR_{SUG, S2, k}$, $CORR_{U, S1, k}$, and $CORR_{G, S2, k}$ between the sequences $CSS_{S1, k}$ (k=0, 1, ..., 15) in FIG. 38 and the sequences $DEMOD\_CSS_{UG, S2}$, $DEMOD\_CSS_{SUG, S2}$, $DEMOD\_CSS_{U, S2}$, and $DEMOD\_CSS_{G, S2}$.

The pattern matching unit 451 estimates that the three-bit S1 signal (see FIG. 38) corresponding to the sequence $CSS_{S1, k}$ with the largest correlation among the 32 correlations calculated using Equations 29, 50, 41, and 42 above is the transmitted S1 signal. The pattern matching unit 451 estimates that the four-bit S2 signal (see FIG. 38) corresponding to the sequence $CSS_{S2, k}$ with the largest correlation among the 64 correlations calculated using Equations 30, 51, 43, and 44 above is the transmitted S2 signal. The pattern matching unit 451 acquires the P1 transmission information using the estimated S1 signal and S2 signal, outputting the acquired P1 transmission information to the control information collection unit 80 in FIG. 5.

With this structure, demodulation can be performed using the most reliable signal not only in an environment with multipath interference or when the starting position of orthogonal transformation (such as FFT) is shifted, but also when the received signal has been affected by impulse noise or the like in a portion of the useful symbol duration or the guard interval duration. The accuracy of demodulation of the P1 symbol thus improves.

Embodiment 5

With reference to the drawings, the following describes Embodiment 5 of the present invention. Note that in the present embodiment, constituent elements that are substantially the same as the constituent elements of Embodiments 1 through 4 are indicated with the same reference signs, and a description thereof is omitted, since the same description as in Embodiments 1 through 4 applies.

The OFDM reception device of the present embodiment differs from the OFDM reception devices described in Embodiments 1 through 4 by being provided with a P1 demodulation unit 500 that differs from the P1 demodulation unit 103 of the OFDM reception device 1 and the like described above.

The following describes the P1 demodulation unit 500 with reference to the drawings. In Embodiments 3 and 4, the signal for the useful symbol duration and the signal for the guard interval duration are orthogonally transformed separately, the results of orthogonal transformation are added after correction of the shift for the wide band carrier frequency, and differential demodulation is performed. By contrast, in the present embodiment, the frequency of the signal for the guard interval duration is shifted by $-f_{SH}$, and this signal is added to the signal for the useful symbol duration. The result of addition is orthogonally transformed, and after correction of the shift for the wide band carrier frequency, the results of the orthogonal transformation are used to perform differential demodulation.

Figure 18:
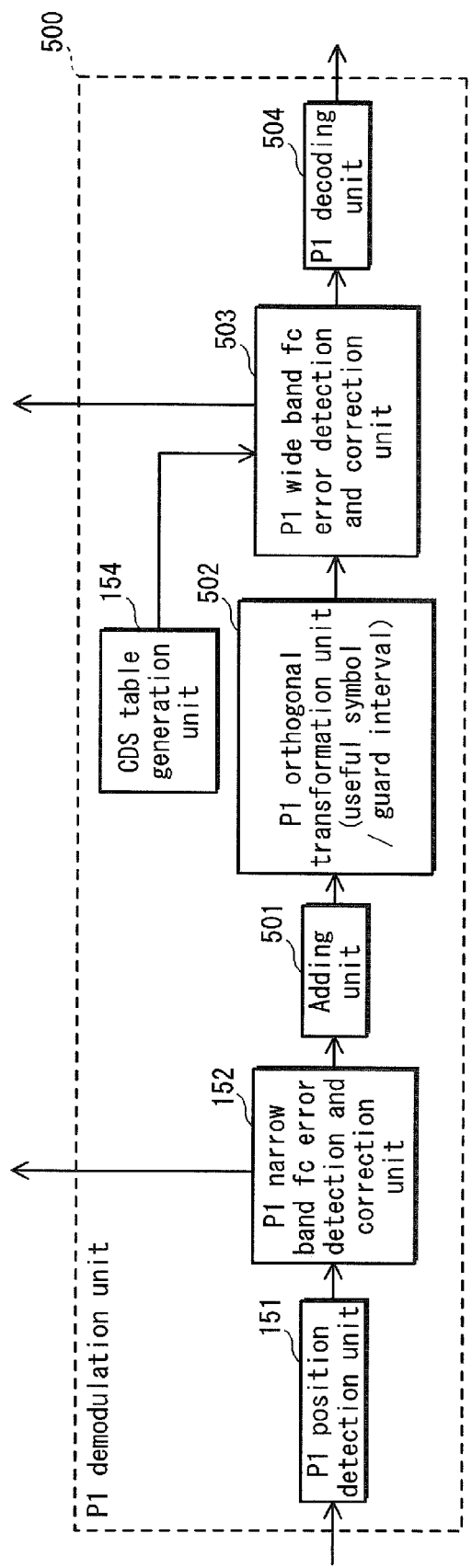
FIG. 18 shows the structure of a P1 demodulation unit 500 according to Embodiment 5.

FIG. 18 shows the structure of the P1 demodulation unit 500 in Embodiment 5. The P1 demodulation unit 500 includes a P1 position detection unit 151, a P1 narrow band fc error detection and correction unit 152, an adding unit 501, a P1 orthogonal transformation unit 502, a CDS table generation unit 154, a P1 wide band fc error detection and correction unit 503, and a P1 decoding unit 504. The signal output by the P1 narrow band fc error detection and correction unit 152 (P1 symbol with corrected shift for the narrow band carrier frequency) is provided to the adding unit 501.

Figure 19:
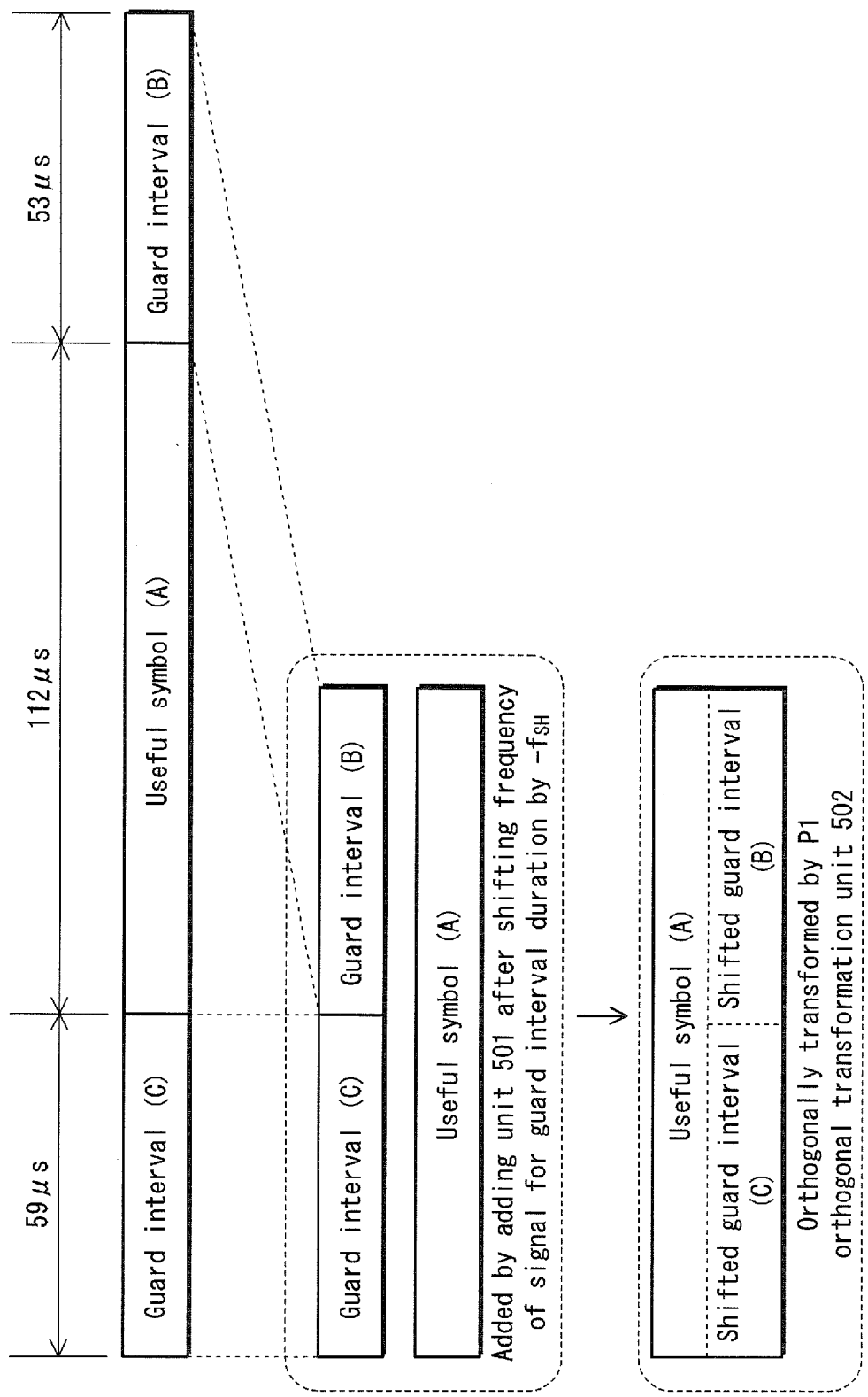
FIG. 19 is a schematic diagram illustrating processing by an adding unit 501 and a P1 orthogonal transformation unit 502 in FIG. 18.

As shown in FIG. 19, the adding unit 501 extracts the signal for the useful symbol duration from the P1 symbol. The adding unit 501 also extracts the guard interval duration on either side of the useful symbol from the P1 symbol, shifts the frequency of the guard interval durations by $-f_{SH}$, and combines the guard interval durations to be temporally continuous. The adding unit 501 adds the signal for the useful symbol duration and the signal for the combined guard interval duration, whose frequency has been shifted by $-f_{SH}$, and outputs the result of addition to the P1 orthogonal transformation unit 502. The adding unit 501 may alternatively combine the signal for the earlier guard interval duration and the signal for the later guard interval duration to be temporally continuous and then shift the frequency of the result by $-f_{SH}$.

As shown in FIG. 19, the P1 orthogonal transformation unit 502 orthogonally transforms the signal output by the adding unit 501 (a complex baseband signal in the time domain) and outputs the result of orthogonal transformation (a complex baseband signal in the frequency domain) to the P1 wide band fc error detection and correction unit 503. Note that the P1 orthogonal transformation unit 502 performs orthogonal transformation based on a Fourier transform, a cosine transform, a wavelet transform, a Hadamard transform, or the like.

In this embodiment, as an example, the P1 orthogonal transformation unit 502 performs orthogonal transformation using a Fourier transform. An FFT is used for the Fourier transform. The P1 orthogonal transformation unit 502 performs an FFT with an FFT size of 1 k on the signal output by the adding unit 501, outputting the results of the FFT (a complex baseband signal in the frequency domain) to the P1 wide band fc error detection and correction unit 503. Note that processing by the P1 orthogonal transformation unit 502 is not limited to the above processing.

The complex baseband signal in the frequency domain (a signal obtained based on the signal for the useful symbol duration of the P1 symbol and the signal for the guard interval duration of the P1 symbol) is input into the P1 wide band fc error detection and correction unit 503 from the P1 orthogonal transformation unit 502. The P1 wide band fc error detection and correction unit 503 calculates the power of each subcarrier of the input complex baseband signal in the frequency domain. The P1 wide band fc error detection and correction unit 503 then calculates the arrangement correlation between the sequence of a plurality of subcarrier power values and the active carrier arrangement sequence (input from the CDS table generation unit 154) while shifting the calculated subcarrier power values one subcarrier at a time. Subsequently, the P1 wide band fc error detection and correction unit 503 detects the largest correlation and detects the shift amount yielding the largest correlation as the frequency error amount (wide band carrier frequency error amount) in units of subcarrier intervals of the P1 symbol.

Based on the detected wide band carrier frequency error amount, the P1 wide band fc error detection and correction unit 503 corrects the shift for the wide band carrier frequency of the complex baseband signal in the frequency domain, extracts only the active carriers from the complex baseband signal in the frequency domain whose shift for the wide band carrier frequency has been corrected, and outputs the extracted active carriers to the P1 decoding unit 504. The P1 wide band fc error detection and correction unit 503 outputs the detected wide band carrier frequency error amount to the fc correction unit 102 in FIG. 5.

As described below with reference to FIG. 20 and other figures, the P1 decoding unit 504 uses the active carriers input from the P1 wide band fc error detection and correction unit 503 to decode the P1 symbol. The P1 decoding unit 504 outputs the P1 transmission information to the control information collection unit 80 in FIG. 5 as control information.

Figure 20:
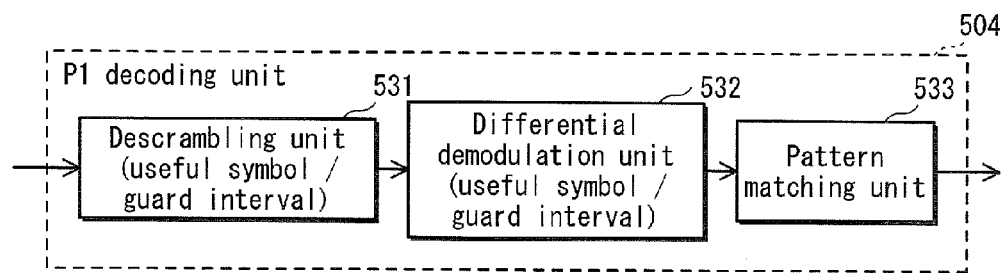
FIG. 20 shows the structure of a P1 decoding unit 504 in FIG. 18.
Figure 21:
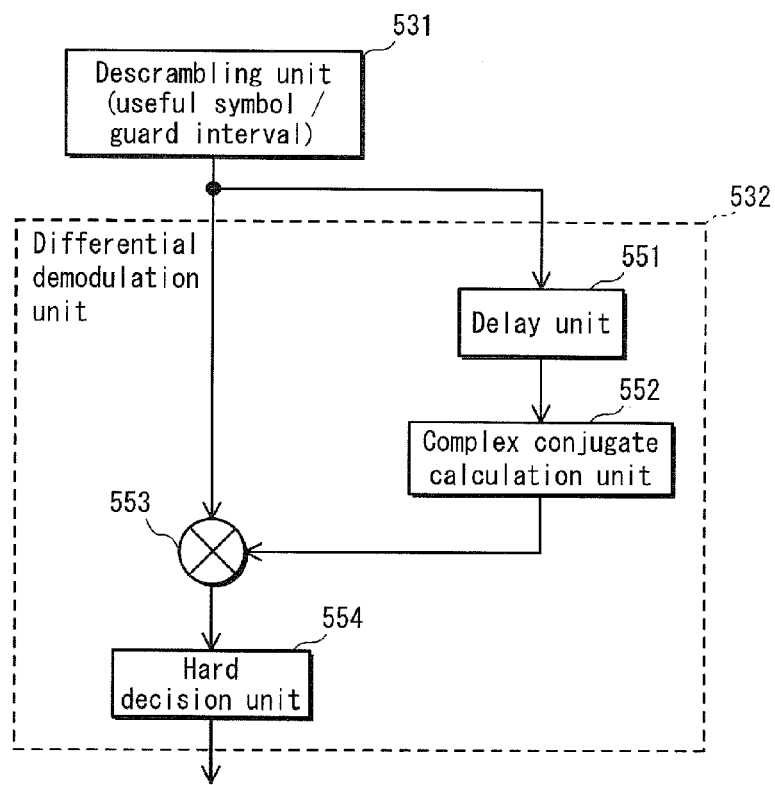
FIG. 21 shows the structure of a differential demodulation unit 532 in FIG. 20.

The following describes the P1 decoding unit 504 in FIG. 18 with reference to FIGS. 20 and 21.

FIG. 20 shows the structure of the P1 decoding unit 504 in FIG. 18. The P1 decoding unit 504 is provided with a descrambling unit 531, a differential demodulation unit 532, and a pattern matching unit 533.

A signal sequence $\text{Act}_{TUG}$ of active carriers (a signal obtained based on the signal for the useful symbol duration of the P1 symbol and the signal for the guard interval duration of the P1 symbol) is input into the descrambling unit 531 from the P1 wide band fc error detection and correction unit 503 in FIG. 18. The descrambling unit 531 performs the descrambling shown in Equation 52 below on the signal sequence $\text{Act}_{TUG}$ of active carriers and outputs a descrambled signal sequence $\text{DESCR}_{TUG}$ to the differential demodulation unit 532.

$$\text{DESCR}_{TUG} = \text{DESCRAMBLING}(\text{Act}_{TUG}) \qquad \text{Equation 52}$$

Specifically, the descrambling unit 531 uses a signal $PRBS_i$ (i=0, 1, ..., 319), based on PRBS and used for multiplication at the transmitting end, to perform the descrambling shown inEquation 53 below on a signal $Act_{TUG,\,i}$ constituting the signal sequence $Act_{TUG}$ of active carriers, outputting a descrambled signal $DESCR_{TUG,\,i}$ to the differential demodulation unit 532.

$$DESCR_{TUG,i} = Act_{TUG,i} \times 2\left(\frac{1}{2} - PRBS_i\right) \qquad \text{Equation 53}$$

As described below with reference to FIG. 21, the differential demodulation unit 532 performs differential demodulation using the signal sequence $DESCR_{TUG}$ input from the descrambling unit 531, outputting a differentially demodulated signal sequence $DEMOD_{TUG}$ to the pattern matching unit 533. Differential demodulation by the differential demodulation unit 532 corresponds to DBPSK.

The differential demodulation unit 532 is now described with reference to FIG. 21. FIG. 21 shows the structure of the differential demodulation unit 532 in FIG. 20. Note that in FIG. 21, the descrambling unit 531 is also shown in order to clarify the input into the differential demodulation unit 532.

The differential demodulation unit 532 is provided with a delay unit 551, a complex conjugate calculation unit 552, a multiplier 553, and a hard decision unit 554. In the differential demodulation unit 532, a signal $DESCR_{TUG,\,i}$ (i=0, 1, ..., 319) constituting the signal sequence $DESCR_{TUG}$ is input, in order from the smallest subcarrier number, from the descrambling unit 531 into the delay unit 551 and the multiplier 553.

The delay unit 551 delays each active carrier of the signal $DESCR_{TUG,\,i}$ (i=0, 1, ..., 319) input from the descrambling unit 531 by one active carrier and outputs the result to the complex conjugate calculation unit 552.

The complex conjugate calculation unit 552 calculates the complex conjugate of the signal output by the delay unit 551 (a signal for a signal sequence corresponding to the signal sequence $DESCR_{TUG}$ delayed by one active carrier) and outputs a signal for the calculated complex conjugate to the multiplier 553.

As shown in Equation 54 below, the multiplier 553 performs complex multiplication on the signal $DESCR_{TUG,\,i}$ (i=1, 2, ..., 319) input from the descrambling unit 531 and the signal $DESCR^*_{TUG,\,i-1}$ for the complex conjugate input from the complex conjugate calculation unit 552. The multiplier 553 then outputs a signal $DEMOD\_pre_{TUG,\,i}$ resulting from the complex multiplication to the hard decision unit 554.

$$DEMOD\_pre_{TUG,i} = DESCR_{TUG,i} \cdot DESCR^*_{TUG,i-1} \qquad \text{Equation 54}$$

Since i=0 is a reference, the multiplier 553 does not perform complex multiplication, but rather outputs the signal $DESCR_{TUG,\,0}$ as is to the hard decision unit 554 as a signal $DEMOD\_pre_{TUG,\,0}$, as shown in Equation 55 below.

$$DEMOD\_pre_{TUG,0} = DESCR_{TUG,0} \qquad \text{Equation 55}$$

Based on the polarity of the real axis as shown in Equation 56 below, the hard decision unit 554 demodulates (hard decision) the signal $DEMOD\_pre_{TUG,\,i}$ (i=0, 1, ..., 319) input from the multiplier 553 and outputs a demodulated signal $DEMOD_{TUG,\,i}$ to the pattern matching unit 533 in FIG. 20.

$$DEMOD_{TUG,i} = \begin{cases} 0 : \text{real}(DEMOD\_pre_{TUG,i}) \geq 0 \\ 1 : \text{real}(DEMOD\_pre_{TUG,i}) < 0 \end{cases} \qquad \text{Equation 56}$$

As shown in Equations 57 and 58 below, the pattern matching unit 533 divides the signals $DEMOD_{TUG,\,0}$, $DEMOD_{TUG,\,1}$, ..., $DEMOD_{TUG,\,319}$ differentially demodulated by the differential demodulation unit 532 into a signal sequence $DEMOD\_CSS_{TUG,\,S1}$ (corresponding to the S1 signal) and a signal sequence $DEMOD\_CSS_{TUG,\,S2}$ (corresponding to the S2 signal).

$$DEMOD\_CSS_{TUG,S1} = (DEMOD_{TUG,0}, \ldots, DEMOD_{TUG,63}) \qquad \text{Equation 57}$$
$$= (DEMOD\_CSS_{TUG,S1,0}, \ldots, DEMOD\_CSS_{TUG,S1,63})$$

$$DEMOD\_CSS_{TUG,S2} = (DEMOD_{TUG,64}, \ldots, DEMOD_{TUG,319}) \qquad \text{Equation 58}$$
$$= (DEMOD\_CSS_{TUG,S2,0}, \ldots, DEMOD\_CSS_{TUG,S2,255})$$

The pattern matching unit 533 calculates correlations $CORR_{TUG,\,S1,\,k}$ between the sequence $DEMOD\_CSS_{TUG,\,S1}$ and the sequences $CSS_{S1,\,k}$ (k=0, 1, ..., 7) in FIG. 38, as shown in Equation 59 below, and calculates correlations $CORR_{TUG,\,S2,\,k}$ between the sequence $DEMOD\_CSS_{TUG,\,S2}$ and the sequences $CSS_{S1,\,k}$ (k=0, 1, ..., 15) in FIG. 38, as shown in Equation 60 below.

$$CORR_{TUG,S1,k} = \sum_{i=0}^{63} DEMOD\_CSS_{TUG,S1,i} \oplus CSS_{S1,k,i} \qquad \text{Equation 59}$$

$\oplus$ indicates exclusive or $$CORR_{TUG,S2,k} = \sum_{i=0}^{255} DEMOD\_CSS_{TUG,S2,i} \oplus CSS_{S2,k,i} \qquad \text{Equation 60}$$

$\oplus$ indicates exclusive or

The pattern matching unit 533 estimates that the three-bit S1 signal (see FIG. 38) corresponding to the sequence $CSS_{S1,\,k}$ with the largest correlation among the eight correlations calculated using Equation 59 above is the transmitted S1 signal. The pattern matching unit 533 estimates that the four-bit S2 signal (see FIG. 38) corresponding to the sequence $CSS_{S1,\,k}$ with the largest correlation among the 16 correlations calculated using Equation 60 above is the transmitted S2 signal. The pattern matching unit 533 acquires the P1 transmission information using the estimated S1 signal and S2 signal, outputting the acquired P1 transmission information to the control information collection unit 80 in FIG. 5.

As described above, using a combination of the signal for the useful symbol duration and the signal for the guard interval duration, which is substantially the same as the signal for the useful symbol duration, allows for a reduction in errors after differential demodulation in an environment in which decoding errors easily occur, such as a very noisy environment or an environment with multipath interference. As a result, errors when decoding the P1 symbol can be reduced, allowing for stable reception.

Embodiment 6

With reference to the drawings, the following describes Embodiment 6 of the present invention. Note that in the present embodiment, constituent elements that are substantially the same as the constituent elements of Embodiments 1 through 5 are indicated with the same reference signs, and a description thereof is omitted, since the same description as in Embodiments 1 through 5 applies.

The OFDM reception device of the present embodiment differs from the OFDM reception devices described in Embodiments 1 through 5 by being provided with a P1 demodulation unit 600 that differs from the P1 demodulation unit 103 of the OFDM reception device 1 and the like described above.

The following describes the P1 demodulation unit 600 with reference to the drawings. The P1 demodulation unit 600 orthogonally transforms the signal for the useful symbol duration and performs differential demodulation based on the result of orthogonal transformation. The P1 demodulation unit 600 also orthogonally transforms the result of adding the signal for the useful symbol duration and the signal for the guard interval duration, after the frequency of the signal for the guard interval duration is shifted by $-f_{SH}$, and performs differential demodulation based on the result of orthogonal transformation.

Figure 22:
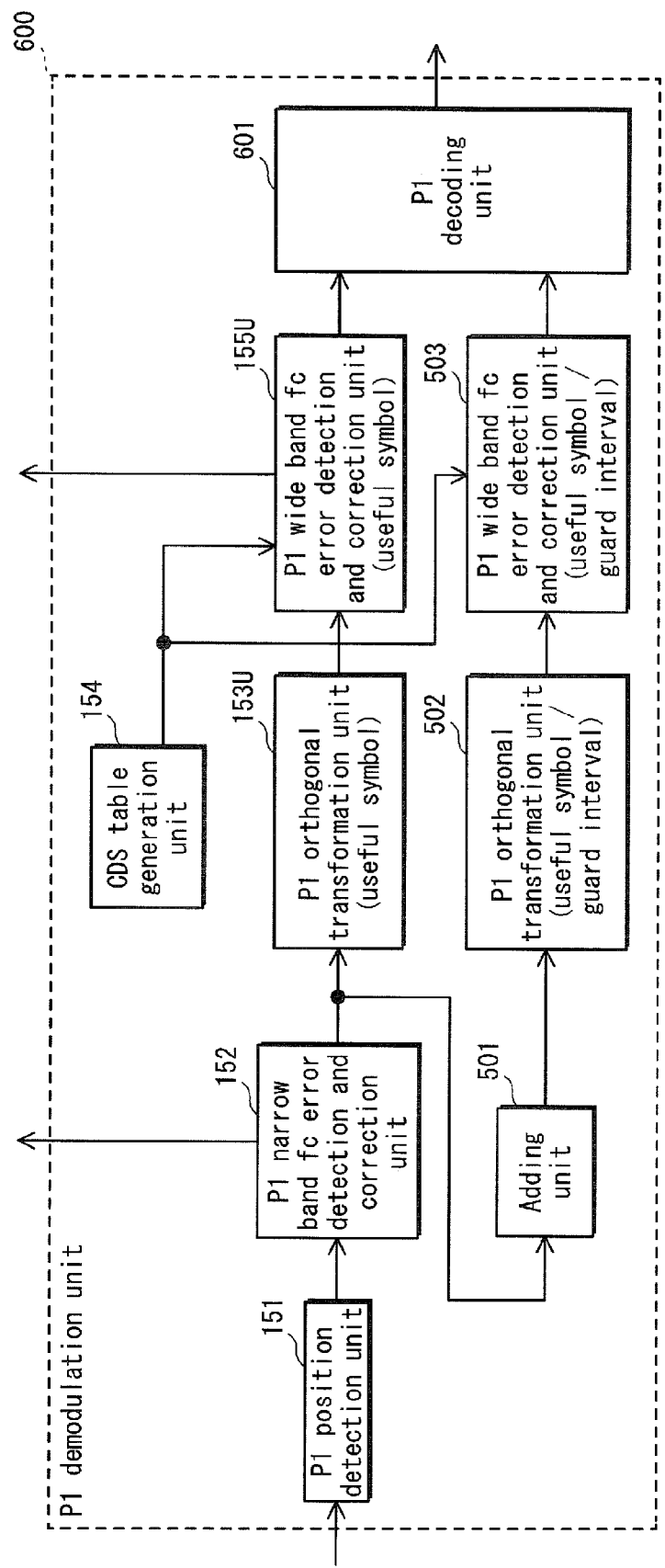
FIG. 22 shows the structure of a P1 demodulation unit 600 according to Embodiment 6.

FIG. 22 shows the structure of the P1 demodulation unit 600 in Embodiment 6. The P1 demodulation unit 600 includes a P1 position detection unit 151, a P1 narrow band fc error detection and correction unit 152, a P1 orthogonal transformation unit 153U, an adding unit 501, a P1 orthogonal transformation unit 502, a CDS table generation unit 154, a P1 wide band fc error detection and correction unit 155U, a P1 wide band fc error detection and correction unit 503, and a P1 decoding unit 601. Since the P1 wide band fc error detection and correction unit 155U outputs the detected wide band carrier frequency error amount to the fc correction unit 102 in FIG. 5, the P1 wide band fc error detection and correction unit 503 of the present embodiment does not output the detected wide band carrier frequency error amount to the fc correction unit 102 in FIG. 5. Note that the block to output the wide band carrier frequency error amount to the fc correction unit 102 may be switched, or two blocks may provide the output.

As described below with reference to FIG. 23 and other figures, the P1 decoding unit 601 uses a signal of active carriers input from the P1 wide band fc error detection and correction unit 155U and a signal of active carriers input from the P1 wide band fc error detection and correction unit 503 to decode the P1 symbol. The P1 decoding unit 601 then outputs the P1 transmission information to the control information collection unit 80 in FIG. 5 as control information.

Figure 23:
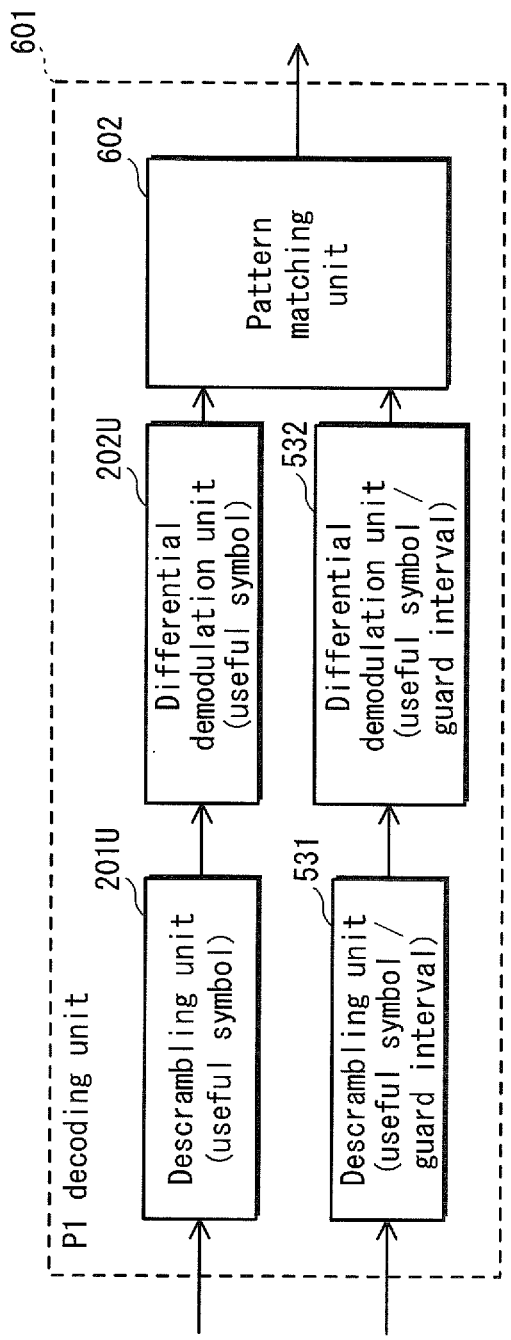
FIG. 23 shows the structure of a P1 decoding unit 601 in FIG. 22.

The following describes the P1 decoding unit 601 in FIG. 22 with reference to FIG. 23. FIG. 23 shows the structure of the P1 decoding unit 601 in FIG. 22. The P1 decoding unit 601 is provided with a descrambling unit 201U, a differential demodulation unit 202U, a descrambling unit 531, a differential demodulation unit 532, and a pattern matching unit 602. A signal of active carriers is provided to the descrambling unit 201U from the P1 wide band fc error detection and correction unit 155U, and a signal of active carriers is provided to the descrambling unit 531 from the P1 wide band fc error detection and correction unit 503.

As shown in Equations 37 and 38 above, the pattern matching unit 602 divides the signal output by the differential demodulation unit 202U into a signal sequence $\text{DEMOD\_CSS}_{U, S1}$ and a signal sequence $\text{DEMOD\_CSS}_{U, S2}$. As shown in Equations 57 and 58 above, the pattern matching unit 602 also divides the signal output by the differential demodulation unit 532 into a signal sequence $\text{DEMOD\_CSS}_{TUG, S1}$ and a signal sequence $\text{DEMOD\_CSS}_{TUG, S2}$.

As shown in Equations 41 and 59 above, the pattern matching unit 602 calculates correlations $\text{CORR}_{U, S1, k}$ and $\text{CORR}_{TUG, S1, k}$ between the sequences $\text{CSS}_{S1, k}$ (k=0, 1, . . . , 7) in FIG. 38 and the sequences $\text{DEMOD\_CSS}_{U, S1}$ and $\text{DEMOD\_CSS}_{TUG, S1}$. As shown in Equations 43 and 60 above, the pattern matching unit 602 calculates correlations $\text{CORR}_{U, S2, k}$ and $\text{CORR}_{TUG, S2, k}$ between the sequences $\text{CSS}_{S2, k}$ (k=0, 1, . . . , 15) in FIG. 38 and the sequences $\text{DEMOD\_CSS}_{U, S2}$ and $\text{DEMOD\_CSS}_{TUG, S2}$.

The pattern matching unit 602 estimates that the three-bit S1 signal (see FIG. 38) corresponding to the sequence $\text{CSS}_{S1, k}$ with the largest correlation among the 16 correlations calculated using Equations 41 and 59 above is the transmitted S1 signal. The pattern matching unit 602 estimates that the four-bit S2 signal (see FIG. 38) corresponding to the sequence $\text{CSS}_{S2, k}$ with the largest correlation among the 32 correlations calculated using Equations 43 and 60 above is the transmitted S2 signal. The pattern matching unit 602 acquires the P1 transmission information using the estimated S1 signal and S2 signal, outputting the acquired P1 transmission information to the control information collection unit 80 in FIG. 5.

With this structure, demodulation can be performed using the most reliable signal not only in an environment with multipath interference, but also when the received signal has been affected by impulse noise or the like in a portion of the guard interval duration. The accuracy of demodulation of the P1 symbol thus improves.

Embodiment 7

With reference to the drawings, the following describes Embodiment 7 of the present invention. Note that in the present embodiment, constituent elements that are substantially the same as the constituent elements of Embodiments 1 through 6 are indicated with the same reference signs, and a description thereof is omitted, since the same description as in Embodiments 1 through 6 applies.

The OFDM reception device of the present embodiment differs from the OFDM reception devices described in Embodiments 1 through 6 by being provided with a P1 demodulation unit 610 that differs from the P1 demodulation unit 103 of the OFDM reception device 1 and the like described above.

The following describes the P1 demodulation unit 610 with reference to the drawings. The P1 demodulation unit 610 orthogonally transforms the signal for the combined guard interval duration and performs, differential demodulation based on the result of orthogonal transformation. The P1 demodulation unit 610 also orthogonally transforms the result of adding the signal for the useful symbol duration and the signal for the guard interval duration, after the frequency of the signal for the guard interval duration is shifted by $-f_{SH}$, and performs differential demodulation based on the result of orthogonal transformation.

Figure 24:
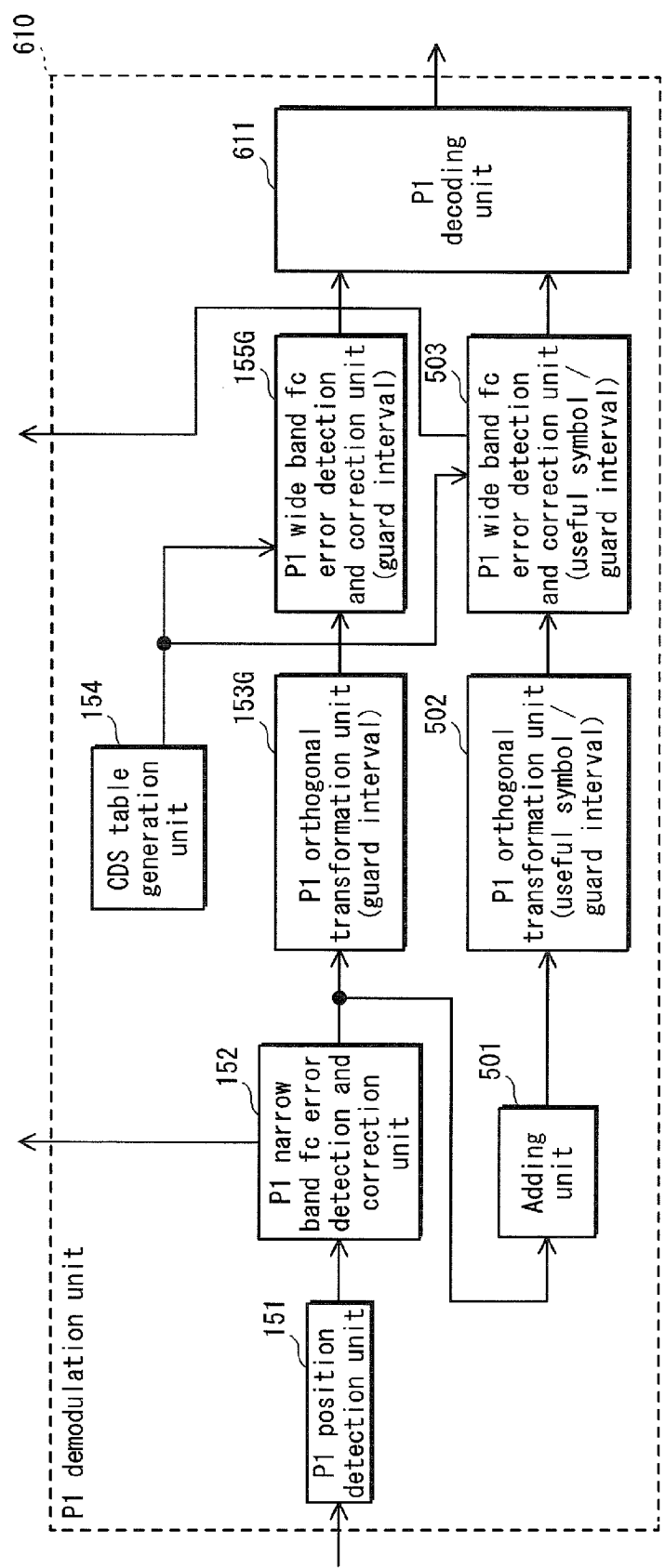
FIG. 24 shows the structure of a P1 demodulation unit 610 according to Embodiment 7.

FIG. 24 shows the structure of the P1 demodulation unit 610 in Embodiment 7. The P1 demodulation unit 610 includes a P1 position detection unit 151, a P1 narrow band fc error detection and correction unit 152, a P1 orthogonal transformation unit 153G, an adding unit 501, a P1 orthogonal transformation unit 502, a CDS table generation unit 154, a P1 wide band fc error detection and correction unit 155G, a P1 wide band fc error detection and correction unit 503, and a P1 decoding unit 611.

As described below with reference to FIG. 25 and other figures, the P1 decoding unit 611 uses a signal of active carriers input from the P1 wide band fc error detection and correction unit 155G and a signal of active carriers input from the P1 wide band fc error detection and correction unit 503 to decode the P1 symbol. The P1 decoding unit 611 then outputs the P1 transmission information to the control information collection unit 80 in FIG. 5 as control information.

Figure 25:
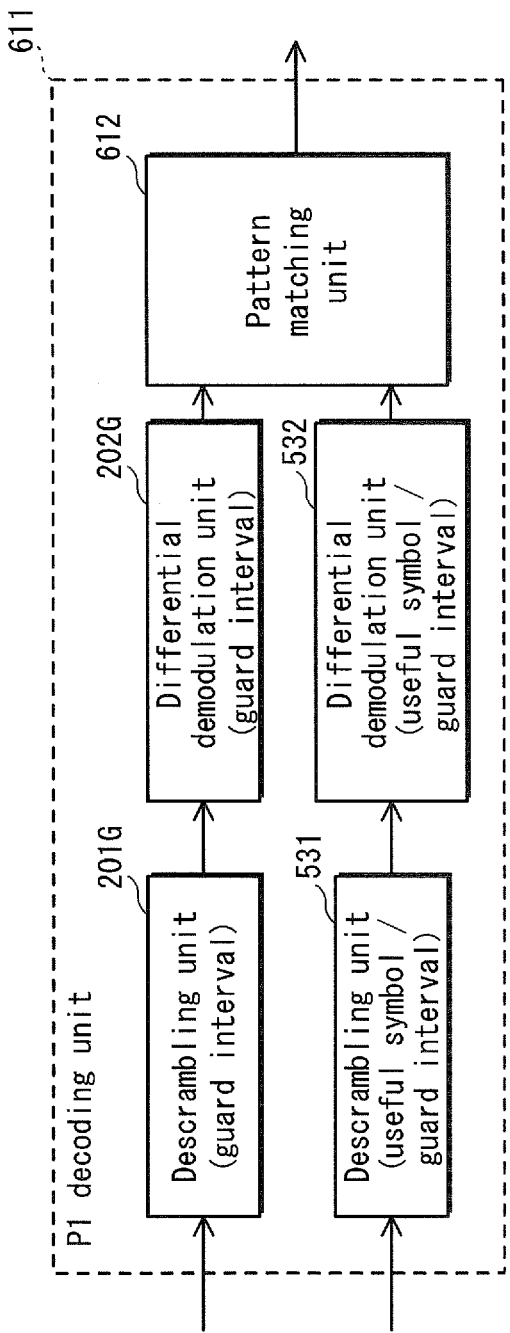
FIG. 25 shows the structure of a P1 decoding unit 611 in FIG. 24.

The following describes the P1 decoding unit 611 in FIG. 24 with reference to FIG. 25. FIG. 25 shows the structure of the P1 decoding unit 611 in FIG. 24. The P1 decoding unit 611 is provided with a descrambling unit 201G, a differential demodulation unit 202G, a descrambling unit 531, a differential demodulation unit 532, and a pattern matching unit 612. A signal of active carriers is provided to the descrambling unit 201G from the P1 wide band fc error detection and correction unit 155E and a signal of active carriers is provided to the descrambling unit 531 from the P1 wide band fc error detection and correction unit 503.

As shown in Equations 39 and 40 above, the pattern matching unit 612 divides the signal output by the differential demodulation unit 202G into a signal sequence $DEMOD\_CSS_{G,\,s1}$ and a signal sequence $DEMOD\_CSS_{G,\,S2}$. As shown in Equations 57 and 58 above, the pattern matching unit 612 also divides the signal output by the differential demodulation unit 532 into a signal sequence $DEMOD\_CSS_{TUG,\,S1}$ and a signal sequence $DEMOD\_CSS_{TUG,\,S2}$.

As shown in Equations 42 and 59 above, the pattern matching unit 612 calculates correlations $CORR_{G,\,S1,\,k}$ and $CORR_{TUG,\,S1,\,k}$ between the sequences $CSS_{S1,\,k}$ (k=0, 1, . . . , 7) in FIG. 38 and the sequences $DEMOD\_CSS_{G,\,S1}$ and $DEMOD\_CSS_{TUG,\,S1}$. As shown in Equations 44 and 60 above, the pattern matching unit 612 calculates correlations $CORR_{G,\,S2,\,k}$ and $CORR_{TUG,\,S2,\,k}$ between the sequences $CSS_{S2,\,k}$ (k=0, 1, . . . , 15) in FIG. 38 and the sequences $DEMOD\_CSS_{G,\,S2}$ and $DEMOD\_CSS_{TUG,\,S2}$.

The pattern matching unit 612 estimates that the three-bit S1 signal (see FIG. 38) corresponding to the sequence $CSS_{S1,\,k}$ with the largest correlation among the 16 correlations calculated using Equations 42 and 59 above is the transmitted S1 signal.

The pattern matching unit 612 estimates that the four-bit S2 signal (see FIG. 38) corresponding to the sequence $CSS_{S2,\,k}$ with the largest correlation among the 32 correlations calculated using Equations 44 and 60 above is the transmitted S2 signal. The pattern matching unit 612 acquires the P1 transmission information using the estimated S1 signal and S2 signal, outputting the acquired P1 transmission information to the control information collection unit 80 in FIG. 5.

With this structure, demodulation can be performed using the most reliable signal not only in an environment with multipath interference, but also when the received signal has been affected by impulse noise or the like in a portion of the useful symbol duration. The accuracy of demodulation of the P1 symbol thus improves.

Embodiment 8

With reference to the drawings, the following describes Embodiment 8 of the present invention. Note that in the present embodiment, constituent elements that are substantially the same as the constituent elements of Embodiments 1 through 7 are indicated with the same reference signs, and a description thereof is omitted, since the same description as in Embodiments 1 through 7 applies.

The OFDM reception device of the present embodiment differs from the OFDM reception devices described in Embodiments 1 through 7 by being provided with a P1 demodulation unit 620 that differs from the P1 demodulation unit 103 of the OFDM reception device 1 and the like described above.

The following describes the P1 demodulation unit 620 with reference to the drawings. The P1 demodulation unit 620 (1) orthogonally transforms the signal for the useful symbol duration and performs differential demodulation based on the result of orthogonal transformation of the useful symbol duration, (2) orthogonally transforms the signal for the guard interval duration and performs differential demodulation based on the result of orthogonal transformation of the guard interval duration, (3) performs differential demodulation based on the result orthogonal transformation of the useful symbol duration and the result of orthogonal transformation of the guard interval duration, and (4) orthogonally transforms the result of adding the signal for the useful symbol duration and the signal for the guard interval duration, after the frequency of the signal for the guard interval duration is shifted by $-f_{SH}$, and performs differential demodulation based on the result of orthogonal transformation.

Figure 26:
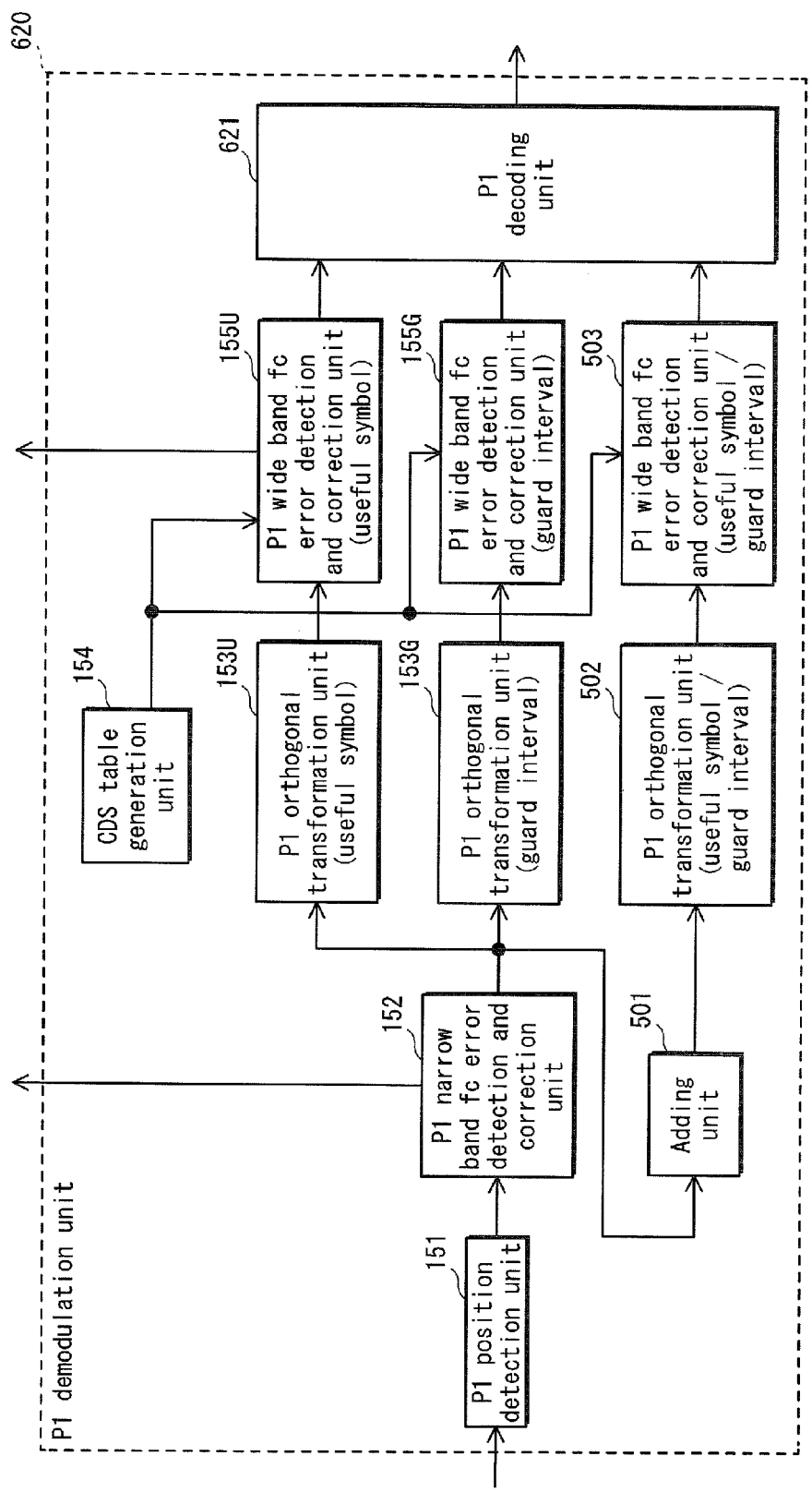
FIG. 26 shows the structure of a P1 demodulation unit 620 according to Embodiment 8.

FIG. 26 shows the structure of the P1 demodulation unit 620 in Embodiment 8. The P1 demodulation unit 620 is provided with a P1 position detection unit 151, a P1 narrow band fc error detection and correction unit 152, a P1 orthogonal transformation unit 153U, a P1 orthogonal transformation unit 153G, an adding unit 501, a P1 orthogonal transformation unit 502, a CDS table generation unit 154, a P1 wide band fc error detection and correction unit 155U, a P1 wide band fc error detection and correction unit 155G, a P1 wide band fc error detection and correction unit 503, and a P1 decoding unit 621. Since the P1 wide band fc error detection and correction unit 155U outputs the detected wide band carrier frequency error amount to the fc correction unit 102 in FIG. 5, the P1 wide band fc error detection and correction unit 503 of the present embodiment does not output the detected wide band carrier frequency error amount to the fc correction unit 102 in FIG. 5. Note that the block to output the wide band carrier frequency error amount to the fc correction unit 102 may be switched, or two blocks may provide the output.

As described below with reference to FIG. 27 and other figures, the P1 decoding unit 621 uses a signal of active carriers input from the P1 wide band fc error detection and correction unit 155U, a signal of active carriers input from the P1 wide band fc error detection and correction unit 155G, and a signal of active carriers input from the P1 wide band fc error detection and correction unit 503 to decode the P1 symbol. The P1 decoding unit 621 then outputs the P1 transmission information to the control information collection unit 80 in FIG. 5 as control information.

Figure 27:
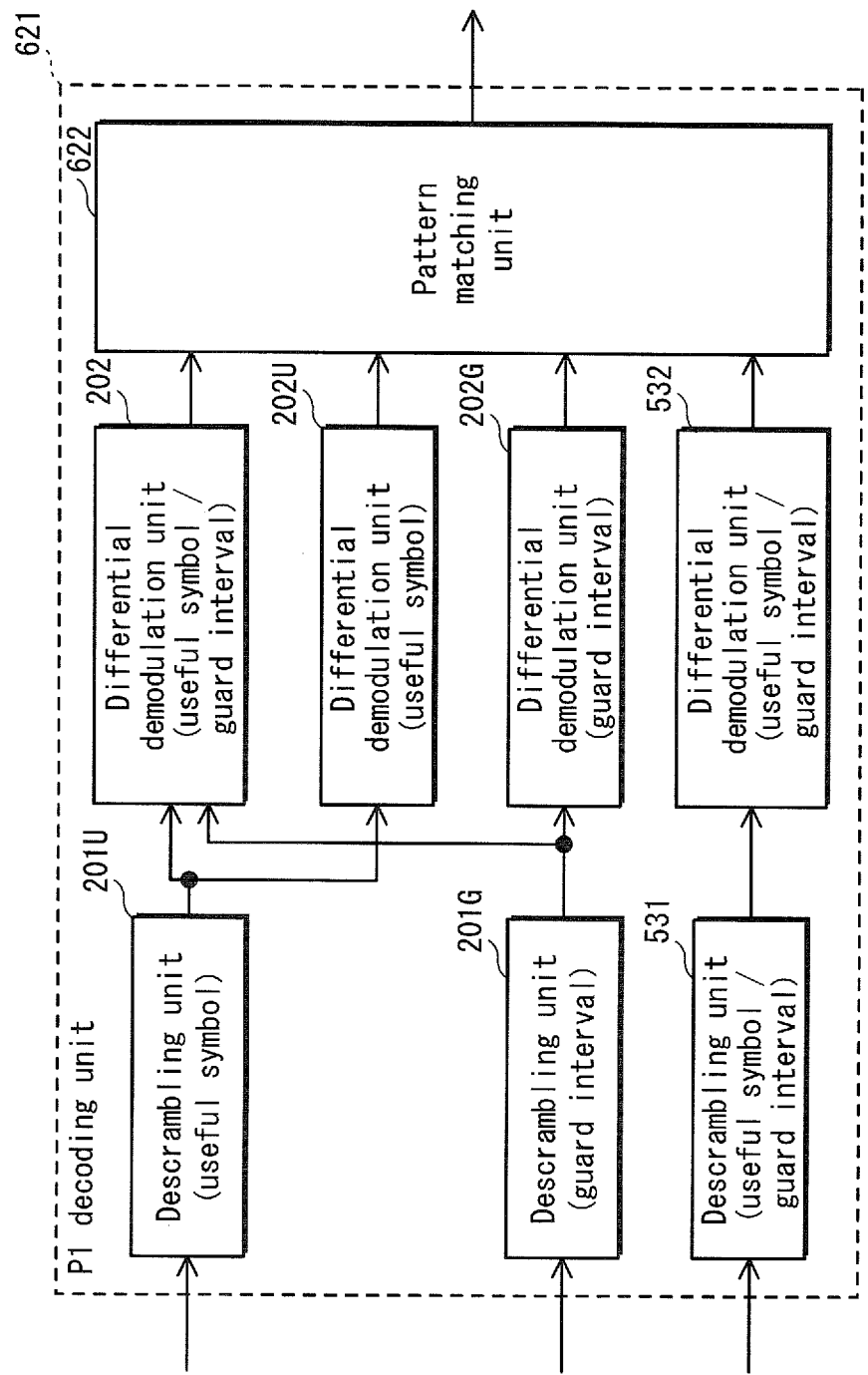
FIG. 27 shows the structure of a P1 decoding unit 621 in FIG. 26.

The following describes the P1 decoding unit 621 in FIG. 26 with reference to FIG. 27. FIG. 27 shows the structure of the P1 decoding unit 621 in FIG. 26. The P1 decoding unit 621 is provided with a descrambling unit 201U, a descrambling unit 201G, a differential demodulation unit 202, a differential demodulation unit 202U, a differential demodulation unit 202G, a descrambling unit 531, a differential demodulation unit 532, and a pattern matching unit 622. A signal of active carriers is provided to the descrambling unit 201U from the P1 wide band fc error detection and correction unit 155U, a signal of active carriers is provided to the descrambling unit 201G from the P1 wide band fc error detection and correction unit 155G, and a signal of active carriers is provided to the descrambling unit 531 from the P1 wide band fc error detection and correction unit 503.

As shown in Equations 27 and 28 above, the pattern matching unit 622 divides the signal output by the differential demodulation unit 202 into a signal sequence DEMOD_CSS$_{UG, S1}$ and a signal sequence DEMOD_CSS$_{UG, S2}$. As shown in Equations 37 and 38 above, the pattern matching unit 622 divides the signal output by the differential demodulation unit 202U into a signal sequence DEMOD_CSS$_{U, S1}$ and a signal sequence DEMOD_CSS$_{U, S2}$. As shown in Equations 39 and 40 above, the pattern matching unit 622 divides the signal output by the differential demodulation unit 202G into a signal sequence DEMOD_CSS$_{G, S1}$ and a signal sequence DEMOD_CSS$_{G, S2}$. As shown in Equations 57 and 58 above, the pattern matching unit 622 divides the signal output by the differential demodulation unit 532 into a signal sequence DEMOD_CSS$_{TUG, S1}$ and a signal sequence DEMOD_CSS$_{TUG, S2}$.

As shown in Equations 29, 41, 42, and 59 above, the pattern matching unit 622 calculates correlations CORR$_{UG, S1, k}$, CORR$_{U, S1, k}$, CORR$_{G, S1, k}$ and CORR$_{TUG, S1, k}$ between the sequences CSS$_{S1, k}$ (k=0, 1, ..., 7) in FIG. 38 and the sequences DEMOD_CSS$_{UG, S1}$, DEMOD_CSS$_{U, S1}$, DEMOD_CSS$_{G, S1}$, and DEMOD_CSS$_{TUG, S1}$. As shown in Equations 30, 43, 44, and 60 above, the pattern matching unit 622 calculates correlations CORR$_{UG, S2, k}$, CORR$_{U, S2, k}$, CORR$_{G, S2, k}$ and CORR$_{TUG, S2, k}$ between the sequences CSS$_{S2, k}$ (k=0, 1, ..., 15) in FIG. 38 and the sequences DEMOD_CSS$_{UG, S2}$, DEMOD_CSS$_{U, S2}$, DEMOD_CSS$_{G, S2}$, and DEMOD_CSS$_{TUG, S2}$.

The pattern matching unit 622 estimates that the three-bit S1 signal (see FIG. 38) corresponding to the sequence CSS$_{S1, k}$ with the largest correlation among the 32 correlations calculated using Equations 29, 41, 42, and 59 above is the transmitted S1 signal. The pattern matching unit 622 estimates that the four-bit S2 signal (see FIG. 38) corresponding to the sequence CSS$_{S2, k}$ with the largest correlation among the 64 correlations calculated using Equations 30, 43, 44, and 60 above is the transmitted S2 signal. The pattern matching unit 622 acquires the P1 transmission information using the estimated S1 signal and S2 signal, outputting the acquired P1 transmission information to the control information collection unit 80 in FIG. 5.

With this structure, demodulation can be performed using the most reliable signal not only in an environment with multipath interference or when the starting position of orthogonal transformation (such as FFT) is shifted, but also when the received signal has been affected by impulse noise or the like in a portion of the useful symbol duration or the guard interval duration. The accuracy of demodulation of the P1 symbol thus improves.

Embodiment 9

With reference to the drawings, the following describes Embodiment 9 of the present invention. Note that in the present embodiment, constituent elements that are substantially the same as the constituent elements of Embodiments 1 through 8 are indicated with the same reference signs, and a description thereof is omitted, since the same description as in Embodiments 1 through 8 applies.

The OFDM reception device of the present embodiment differs from the OFDM reception devices described in Embodiments 1 through 8 by being provided with a P1 demodulation unit 630 that differs from the P1 demodulation unit 103 of the OFDM reception device 1 and the like described above.

The following describes the P1 demodulation unit 630 with reference to the drawings. The P1 demodulation unit 630 orthogonally transforms the signal for the guard interval duration and performs differential demodulation based on the result of orthogonal transformation of the guard interval duration.

Figure 28:
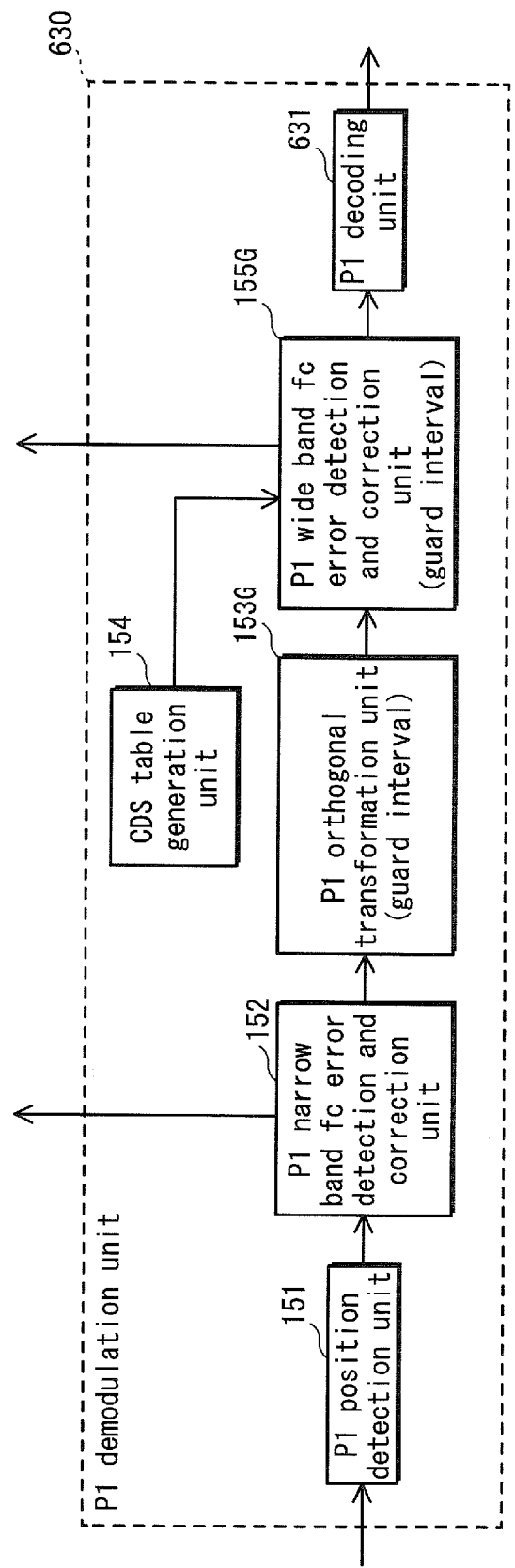
FIG. 28 shows the structure of a P1 demodulation unit 630 according to Embodiment 9.

FIG. 28 shows the structure of the P1 demodulation unit 630 in Embodiment 9. The P1 demodulation unit 630 is provided with a P1 position detection unit 151, a P1 narrow band fc error detection and correction unit 152, a P1 orthogonal transformation unit 153E a CDS table generation unit 154, a P1 wide band fc error detection and correction unit 1556, and a P1 decoding unit 631.

In addition to the functions of the P1 wide band fc error detection and correction unit 155G described in Embodiment 1, the P1 wide band fc error detection and correction unit 155G in the present embodiment subtracts one subcarrier from the detected wide band carrier frequency error amount and outputs the result to the fc correction unit 102 in FIG. 5 as the wide band carrier frequency error amount of the P1 symbol. This is performed in the case that the P1 wide band fc error detection and correction unit 155G has detected a frequency shift of $f_{SH}$. Note that if correction to return a frequency shift of $f_{SH}$ to the original value is performed separately, the P1 wide band fc error detection and correction unit 155G outputs the detected wide band carrier frequency error amount as is to the fc correction unit 102 in FIG. 5 as the wide band carrier frequency error amount of the P1 symbol.

As described below with reference to FIG. 29 and other figures, the P1 decoding unit 631 uses the signal of active carriers input from the P1 wide band fc error detection and correction unit 155G to decode the P1 symbol. The P1 decoding unit 631 outputs the P1 transmission information to the control information collection unit 80 in FIG. 5 as control information.

Figure 29:
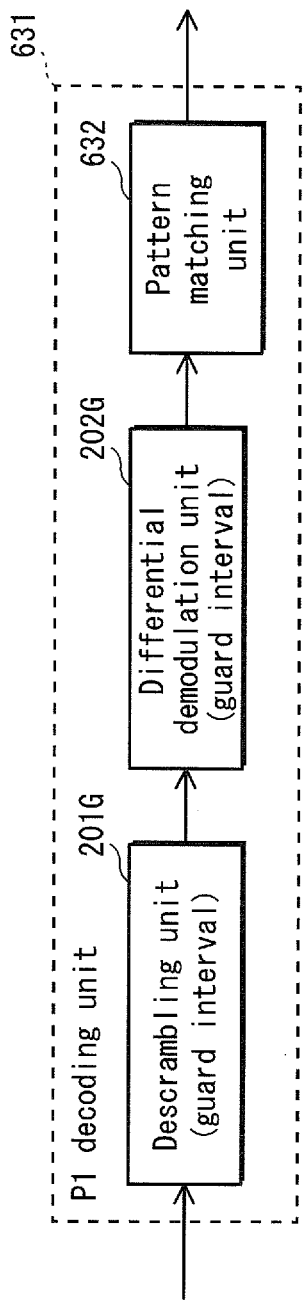
FIG. 29 shows the structure of a P1 decoding unit 631 in FIG. 28.

The following describes the P1 decoding unit 631 in FIG. 28 with reference to FIG. 29. FIG. 29 shows the structure of the P1 decoding unit 631 in FIG. 28. The P1 decoding unit 631 is provided with a descrambling unit 201G, a differential demodulation unit 202G, and a pattern matching unit 632. A signal of active carriers is provided to the descrambling unit 201G from the P1 wide band fc error detection and correction unit 155G.

As shown in Equations 39 and 40 above, the pattern matching unit 632 divides the signal output by the differential demodulation unit 202G into a signal sequence DEMOD_CSS$_{G, S1}$ and a signal sequence DEMOD_CSS$_{G, S2}$.

As shown in Equation 42 above, the pattern matching unit 632 calculates correlations CORR$_{G, S1, k}$ between the sequences CSS$_{S1, k}$ (k=0, 1, ..., 7) in FIG. 38 and the sequence DEMOD_CSS$_{G, S1}$. As shown in Equation 44 above, the pattern matching unit 632 also calculates correlations CORR$_{G, S2, k}$ between the sequences CSS$_{S2, k}$ (k=0, 1, ..., 15) in FIG. 38 and the sequence DEMOD_CSS$_{G, S2}$.

The pattern matching unit 632 estimates that the three-bit S1 signal (see FIG. 38) corresponding to the sequence CSS$_{S1, k}$ with the largest correlation among the eight correlations calculated using Equation 42 above is the transmitted S1 signal and estimates that the four-bit S2 signal (see FIG. 38) corresponding to the sequence CSS$_{S2, k}$ with the largest correlation among the 16 correlations calculated using Equation 44 above is the transmitted S2 signal. The pattern matching unit 632 acquires the P1 transmission information using the estimated S1 signal and S2 signal, outputting the acquired P1 transmission information to the control information collection unit 80 in FIG. 5.

With this structure, errors when decoding OFDM symbols can be reduced even in an environment in which the signal for the useful symbol duration is blocked, thus allowing for stable reception.

Embodiment 10

With reference to the drawings, the following describes Embodiment 10 of the present invention. Note that in the present embodiment, constituent elements that are substantially the same as the constituent elements of Embodiments 1 through 9 are indicated with the same reference signs, and a description thereof is omitted, since the same description as in Embodiments 1 through 9 applies.

The OFDM reception device of the present embodiment differs from the OFDM reception device 1 described in Embodiment 1 by being provided with a pattern matching unit 700 that differs from the pattern matching unit 203 of the OFDM reception device 1.

The pattern matching unit 700 is described with reference to the figures. Out of consideration for how the physical subcarrier interval between active carriers is not fixed, the pattern matching unit 700 performs a correlation calculation by weighting based on the physical subcarrier interval.

Figure 30:
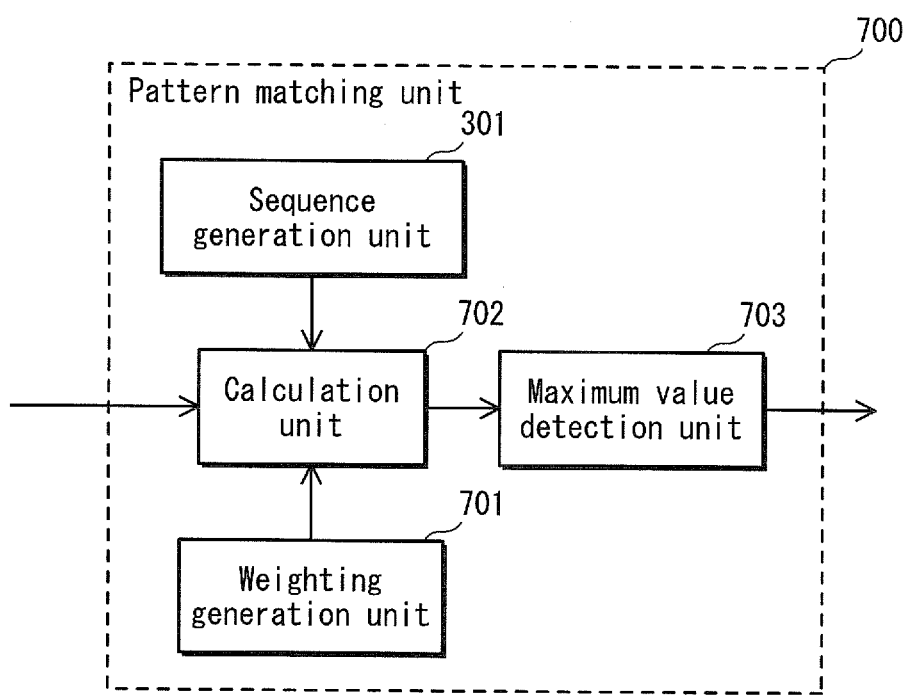
FIG. 30 shows the structure of a pattern matching unit 700 according to Embodiment 10.

FIG. 30 shows the structure of the pattern matching unit 700 in Embodiment 10. The pattern matching unit 700 is provided with a sequence generation unit 301, a weighting generation unit 701, a calculation unit 702, and a maximum value detection unit 703.

The weighting generation unit 701 generates weighting coefficients $w_{S1,i}$ such that the value of the weighting coefficients $w_{S1,i}$ decreases with an increase in the physical sub-carrier interval between two active signals used to calculate the signal $DEMOD_{UG,i}$ (i=0, 1, . . . , 63), i.e. the signal $DEMOD\_CSS_{UG,S1,i}$ (i=0, 1, . . . , 63). The weighting generation unit 701 outputs the value of the generated weighting coefficients $w_{S2,i}$ to the calculation unit 702. The weighting generation unit 701 also generates weighting coefficients $W_{S2,i}$ such that the value of the weighting coefficients $W_{S2,i}$ decreases with an increase in the physical subcarrier interval between two active signals used to calculate the signal $DEMOD_{UG,i}$ (i=64, 64, . . . , 319), i.e. the signal $DEMOD\_CSS_{UG,S2,i}$ (i=0, 1, . . . , 255). The weighting generation unit 701 outputs the value of the generated weighting coefficients $W_{S2,i}$ to the calculation unit 702. For example, the weighting generation unit 701 generates the weights shown in FIGS. 31 and 32. The "physical subcarrier interval" in FIGS. 31 and 32 is the physical subcarrier interval between two active carriers used to calculate the signals $DEMOD\_CSS_{UG,S1,i}$ and $DEMOD\_CSS_{UG,S2,i}$. Note that the values of the weights are not limited to the values shown in FIGS. 31 and 32.

As shown in Equations 27 and 28 above, the calculation unit 702 divides the signals $DEMOD_{UG,0}$, $DEMOD_{UG,1}$, $DEMOD_{UG,319}$ differentially demodulated by the differential demodulation unit 202 into a signal sequence $DEMOD_{UG\_}CSS_{S1}$ and a signal sequence $DEMOD_{UG\_}CSS_{S2}$.

As shown in Equation 61 below, the calculation unit 702 uses the values of the weighting coefficients $w_{S1,i}$ generated by the weighting generation unit 701 to calculate correlations $CORR_{UG,S1,k}$ between the sequences $CSS_{S1,k}$ (k=0, 1, . . . , 7) input sequentially from the sequence generation unit 301 and the sequence $DEMOD\_CSS_{UG,S1}$. The calculation unit 702 outputs the correlations to the maximum value detection unit 703.

$$CORR_{UG,S1,k} = \sum_{i=0}^{63} (DEMOD\_CSS_{UG,S1,i} \oplus CSS_{S1,k,i})w_{S1,i} \qquad \text{Equation 61}$$

$\oplus$ indicates exclusive or

As shown in Equation 62 below, the calculation unit 702 uses the values of the weighting coefficients $w_{S1,k}$ generated by the weighting generation unit 701 to calculate correlations $CORR_{UG,S2,k}$ between the sequences $CSS_{S2,k}$ (k=0, 1, . . . , 15) input sequentially from the sequence generation unit 301 and the sequence $DEMOD\_CSS_{UG,S2}$. The calculation unit 702 outputs the correlations to the maximum value detection unit 703.

$$CORR_{UG,S2,k} = \sum_{i=0}^{255} (DEMOD\_CSS_{UG,S2,i} \oplus CSS_{S2,k,i})w_{S2,i} \qquad \text{Equation 62}$$

$\oplus$ indicates exclusive or

The maximum value detection unit 703 estimates that the three-bit S1 signal (see FIG. 38) corresponding to the sequence $CSS_{S1,k}$ with the largest correlation among the eight correlations calculated using Equation 61 above is the transmitted S1 signal. The maximum value detection unit 703 estimates that the four-bit S2 signal (see FIG. 38) corresponding to the sequence $CSS_{S2,k}$ with the largest correlation among the 16 correlations calculated using Equation 62 above is the transmitted S2 signal. The maximum value detection unit 703 acquires the P1 transmission information using the estimated S1 signal and S2 signal, outputting the acquired P1 transmission information to the control information collection unit 80 in FIG. 2.

With this structure, the P1 symbol can be decoded by placing a greater weight on differential demodulation results that have a lower probability of error. As a result, errors when decoding the P1 symbol can be further reduced, allowing for stable reception.

<<Supplementary Explanation>>

The present invention is not limited to the above-described embodiments but rather may be implemented in any form in order to achieve the object of the present invention or a related or associated object thereof. For example, the following modifications are possible.

(1) In the above embodiments, between the S1 signal in the low frequency domain and the S1 signal in the high frequency domain, only the S1 signal in the low frequency domain of the P1 symbol is used when decoding the P1 symbol, but decoding is not limited in this way. It is also possible to use both S1 signals, or to use only the S1 signal in the high frequency domain. Using both S1 signals allows for estimation of the S1 signal using two S1 signals in different frequency ranges, thus improving the accuracy of estimation of the S1 signal.

As a specific example, the following describes two methods of adapting the P1 decoding unit 156 in Embodiment 1 to the above case.

One method of adaptation is as follows.

The descrambling unit 201U and the descrambling unit 201G in the P1 decoding unit 156 each perform the calculations in Equations 21 and 23 above for i=0, 1, . . . , 383. The differential demodulation unit 202 performs the calculations in Equations 24 and 25 above for i=0, 1, . . . , 383. The differential demodulation unit 202 performs the calculation in Equation 63 below for i=0, 1, . . . , 63. To facilitate this explanation, let the substitution shown in Equation 64 be performed in the case of i=64, 65, . . . , 319. The differential demodulation unit 202 performs the demodulation (hard decision) shown in Equation 65 below.

$$\text{DEMOD\_pre2}_{UG,i} = \qquad\qquad\qquad\qquad\text{Equation 63}$$
$$\text{DEMOD\_pre}_{UG,i} + \text{DEMOD\_pre}_{UG,i+320} : 0 \le i \le 63$$

$$\text{DEMOD\_pre2}_{UG,i} = \text{DEMOD\_pre}_{UG,i} : 64 \le i \le 319 \qquad \text{Equation 64}$$

$$\text{DEMOD}_{UG,i} = \begin{cases} 0 : \text{real}(\text{DEMOD\_pre2}_{UG,i}) \ge 0 \\ 1 : \text{real}(\text{DEMOD\_pre2}_{UG,i}) < 0 \end{cases} \quad \text{Equation 65}$$

$$CORR_{S1,k} = \sum_{i=0}^{63} \text{DEMOD\_pre}_{UG,i} \times 2\left(\frac{1}{2} - CSS_{S1,k,i}\right) \quad \text{Equation 66}$$

$$CORR_{S2,k} = \sum_{i=0}^{255} \text{DEMOD\_pre}_{UG,i+64} \times 2\left(\frac{1}{2} - CSS_{S2,k,i}\right) \quad \text{Equation 67}$$

Instead of using the results of the demodulation (hard decision) shown in Equation 26 above, the pattern matching unit 203 uses the results of the demodulation (hard decision) shown in Equation 65 above to estimate the S1 signal and the S2 signal and to acquire the P1 transmission information.

Another method of adaptation is as follows.

The descrambling unit 201U and the descrambling unit 201G in the P1 decoding unit 156 each perform the calculations in Equations 21 and 23 above for i=0, 1, . . . , 383. The differential demodulation unit 202 performs the calculations in Equations 24 and 25 above for i=0, 1, . . . , 383.

In addition to calculating the correlations between the results of demodulation of the S1 signal in the low frequency domain ($\text{DEMOD}_{UG,\,0}$, . . . , $\text{DEMOD}_{UG,\,63}$) and the sequences $CSS_{S1,k}$ (k=0, 1, . . . , 7), the pattern matching unit 203 calculates the correlations between the results of demodulation of the S1 signal in the high frequency domain ($\text{DEMOD}_{UG,\,320}$, . . . , $\text{DEMOD}_{UG,\,383}$) and the sequences $CSS_{S1,\,k}$ (k=0, 1, . . . , 7). The pattern matching unit 203 calculates the correlations between the results of demodulation of the S2 signal ($\text{DEMOD}_{UG,\,64}$, . . . , $\text{DEMOD}_{UG,\,319}$) and the sequences $CSS_{S2,\,k}$ (k=0, 1, . . . , 15).

The pattern matching unit 203 estimates that the three-bit S1 signal (see FIG. 38) corresponding to the sequence $CSS_{S1,\,k}$ with the largest correlation among the 16 correlations (eight sequences $CSS_{S1}$×two S1 signals) is the transmitted S1 signal. The pattern matching unit 203 estimates that the four-bit S2 signal (see FIG. 38) corresponding to the sequence $CSS_{S2,\,k}$ with the largest correlation among the 16 correlations (the number of sequences $CSS_{S2}$) is the transmitted S2 signal. The pattern matching unit 203 then acquires the P1 transmission information using the estimated S1 signal and S2 signal.

(2) In the above embodiments, the hard decision unit of the differential demodulation units performs a hard decision, but the present invention is not limited in this way. The differential demodulation units may provide the results of differential calculation (the output of the multiplier) to the pattern matching unit without performing a hard decision, and the pattern matching unit may calculate the correlations between the results and the sequences in FIG. 38.

As a specific example, the following describes a method of adapting the P1 decoding unit 156 in Embodiment 1 to the above case.

The differential demodulation unit 202 is not provided with a hard decision unit 254 and outputs the signal output by the multiplier 253 as is to the pattern matching unit 203. As shown in Equation 66 below, the pattern matching unit 203 calculates correlations $CORR_{S1,\,k}$ between the sequences $CSS_{S1,\,k}$ (k=0, 1, . . . , 7) in FIG. 38 and the sequences ($\text{DEMOD\_pre}_{UG,\,0}$, . . . , $\text{DEMOD\_pre}_{UG,\,63}$). As shown in Equation 67 below, the pattern matching unit 203 calculates correlations $CORR_{S2,\,k}$ between the sequences $CSS_{S1,\,k}$ (k=0, 1, . . . , 7) in FIG. 38 and the sequences ($\text{DEMOD\_pre}_{UG,\,64}$, . . . , $\text{DEMOD\_pre}_{UG,\,319}$).

The pattern matching unit 203 estimates that the three-bit S1 signal (see FIG. 38) corresponding to the sequence $CSS_{S1,\,k}$ with the largest correlation among the eight correlations calculated using Equation 66 above is the transmitted S1 signal. The pattern matching unit 203 estimates that the four-bit S2 signal (see FIG. 38) corresponding to the sequence $CSS_{S2,\,k}$ with the largest correlation among the 16 correlations calculated using Equation 67 above is the transmitted S2 signal. The pattern matching unit 203 acquires the P1 transmission information using the estimated S1 signal and S2 signal.

(3) In the above embodiments, the one orthogonal transformation unit or one P1 orthogonal transformation unit is provided for each orthogonal transformation, but the present invention is not limited in this way. Some or all of these units may be used in common. For example, instead of providing the orthogonal transformation unit 106, the P1 orthogonal transformation unit 153U, and the P1 orthogonal transformation unit 153G separately, some or all of these units may be used in common.

(4) In the above embodiments, the CDS table generation unit 154 may, for example, store a table with the content of FIG. 39 in advance and generate an active carrier arrangement sequence and based on this table. Alternatively, the CDS table generation unit 154 may be composed of a logic circuit to generate an active carrier arrangement sequence. Note that the method of generating the active carrier arrangement sequence based on the CDS table generation unit 154 is not particularly limited.

(5) Since the above embodiments are described as applied to the DVB-T2 transmission standard, each P1 decoding unit performs pattern matching after differential demodulation. The present invention is not, however, limited in this way. For example, for application to a transmission scheme with error correction coding, error correction would be performed after differential demodulation, and decoding would be performed using the results with the fewest errors.

(6) In Embodiments 1 through 4 respectively, the P1 decoding unit 156 is provided with the differential demodulation unit 202, the P1 decoding unit 350 is provided with three differential demodulation units 202, 202U, and 202G, the P1 decoding unit 400 is provided with three differential demodulation units 202U, 202G, and 401, and the P1 decoding unit 450 is provided with three differential demodulation units 202, 202U, and 202G, but the present invention is not limited in this way.

For example, the P1 decoding unit may be provided with only the differential demodulation unit 401. Alternatively, the P1 decoding unit may be provided with two differential demodulation units 202 and 202U, with two differential demodulation units 202 and 202G, or with two differential demodulation units 202U and 202G. Furthermore, the P1 decoding unit may be provided with two differential demodulation units 202 and 401, with two differential demodulation units 202U and 401, or with two differential demodulation units 202G and 401.

Additionally, the P1 decoding unit may be provided with three differential demodulation units 202, 202U, and 401, or with three differential demodulation units 202, 202G, and 401.

The P1 decoding unit 621 in Embodiment 9 may be provided with the differential demodulation unit 401 instead of the differential demodulation unit 202, or the differential demodulation unit 202 may be omitted (with only the differential demodulation units 202U, 202G, and 532 being provided).

(7) The differential demodulation unit 401 in Embodiment 3 adds the signals output by the descrambling unit 201U and the descrambling unit 201G, performs differential calculation on the added signal (processing by the delay unit 412, the complex conjugate calculation unit 413, and the multiplier 414), and then performs a hard decision, but processing is not limited in this way and may, for example, be as follows. The differential demodulation unit may both perform differential calculation on the signal output from the descrambling unit 201U (processing by the delay unit 251U, the complex conjugate calculation unit 252U, and the multiplier 253U; see FIG. 13) and also perform differential calculation on the signal output from the descrambling unit 201G (processing by the delay unit 251G, the complex conjugate calculation unit 252G, and the multiplier 253G; see FIG. 14). The differential demodulation unit may then add the results of differential calculation for the signal output by the descrambling unit 201U and the results of differential calculation for the signal output by the descrambling unit 201G, performing a hard decision on the added signal.

(8) In Embodiment 10, the pattern matching unit 700 decodes the P1 symbol by performing weighting in accordance with the size of the physical subcarrier interval between active carriers in the signal output by the differential demodulation unit 202. Alternatively, the pattern matching unit 700 may for example decode the P1 symbol by performing weighting in accordance with the size of the physical subcarrier interval between active carriers in the signals output by the differential demodulation units 202U, 202G, 401, and 532. Note that the P1 symbol may be decoded by performing weighting in accordance with the size of the physical subcarrier interval between active carriers in the signal output by the differential demodulation unit that does not perform the above hard decision. In these cases, substantially the same method as in Embodiment 10 may be used to assign the values of the weights.

(9) In Embodiment 1, the P1 wide band fc error detection and correction unit 155U and the P1 wide band fc error detection and correction unit 155G each detect the wide band carrier frequency error amount.

The wide band carrier frequency error amount in the signal for the combined guard interval duration, however, can be expected to be the same as the wide band carrier frequency error amount in the signal for the useful symbol duration, with the exception of the portion corresponding to the frequency shift of $f_{SH}$.

Therefore, it is possible to have only one of the P1 wide band fc error detection and correction unit 155U and the P1 wide band fc error detection and correction unit 155G detect the wide band carrier frequency error amount. The other unit (a constituent element without the function of detecting the wide band carrier frequency error amount) may then take the portion corresponding to the frequency shift of $f_{SH}$ into consideration and correct the shift for the wide band carrier frequency.

Note that when the P1 wide band fc error detection and correction unit 155U (or the P1 wide band fc error detection and correction unit 155G) detects the wide band carrier frequency error amount, the other unit (a constituent element without the function of detecting the wide band carrier frequency error amount) corrects the shift for the wide band carrier frequency by using, as the wide band carrier frequency error amount, a value yielded by adding one subcarrier to the detected wide band carrier frequency error amount (or a value yielded by subtracting one subcarrier from the detected wide band carrier frequency error amount). When only the P1 wide band fc error detection and correction unit 155G detects the wide band carrier frequency error amount, the P1 wide band fc error detection and correction unit 155G subtracts one subcarrier from the detected wide band carrier frequency error amount and outputs the result to the fc correction unit 102 in FIG. 5 as the wide band carrier frequency error amount of the P1 symbol. In these cases, the frequency shift of $f_{SH}$ has been taken into consideration. If correction processing to return the frequency shift of $f_{SH}$ to the original value is performed separately, then the detected wide band carrier frequency error amounts are equivalent. Therefore, the above addition or subtraction would be unnecessary.

In other embodiments in which a plurality of constituent elements detect wide band carrier frequency error amounts, it is possible as above for only a portion of the constituent elements to have the function of detecting the wide band carrier frequency error amount. When correcting the shift for the wide band carrier frequency, the other constituent elements may then take into consideration the portion of the wide band carrier frequency error amount, as detected by the above constituent elements, that corresponds to the frequency shift of $f_{SH}$.

Figure 33:
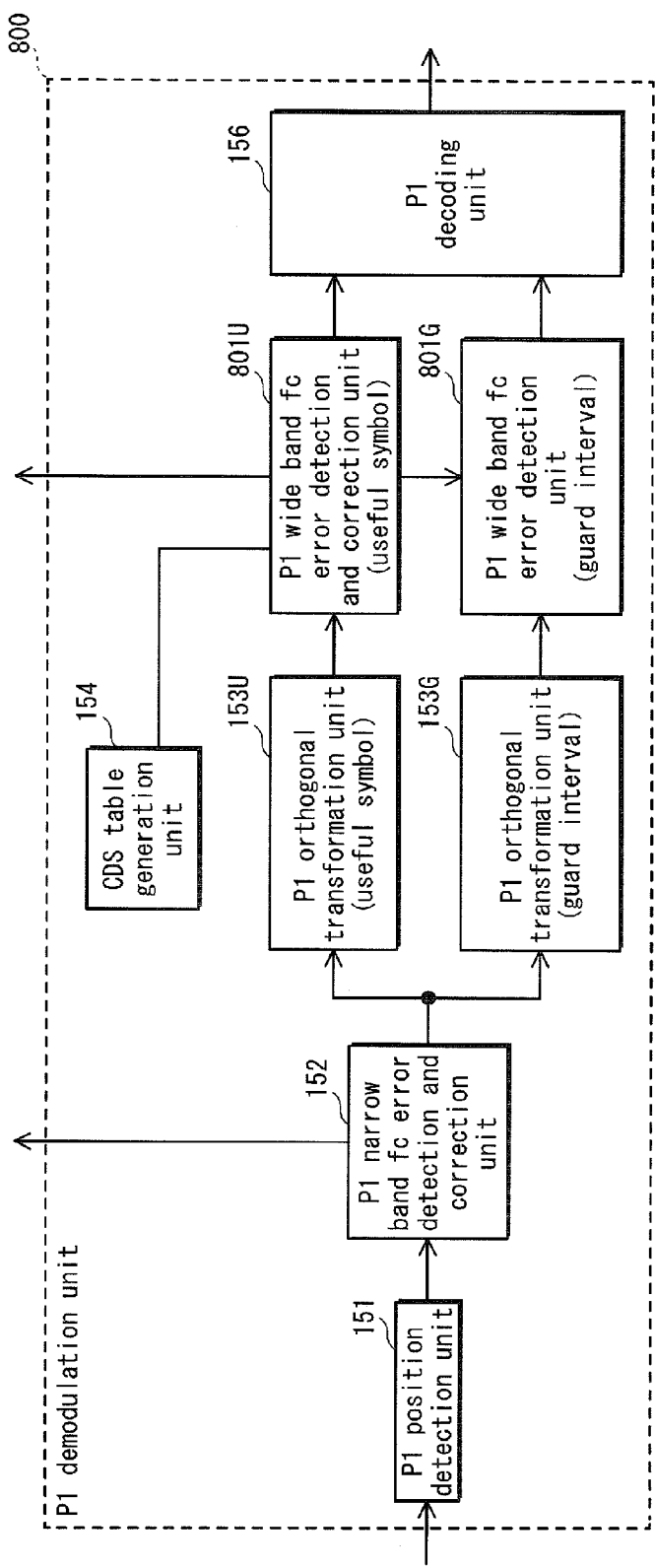
FIG. 33 shows the structure of a P1 demodulation unit 800 according to a modification.
Figure 34:
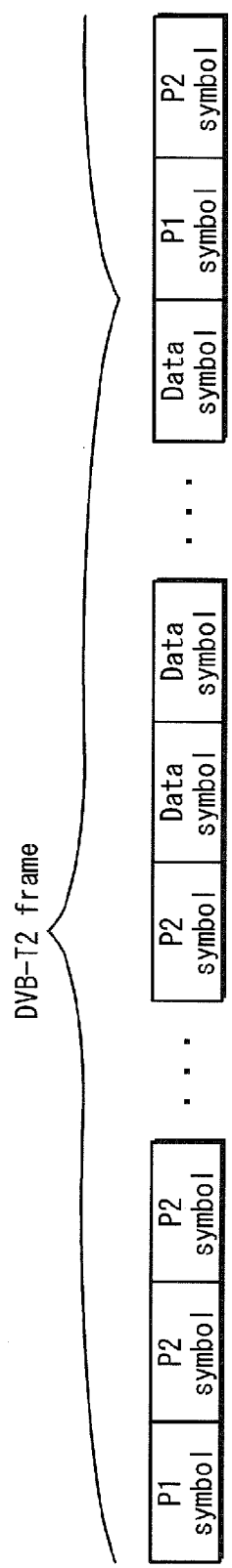
FIG. 34 is a schematic diagram showing the frame structure of the DVB-T2 transmission standard.

As a specific example, the following describes a method of adapting the P1 demodulation unit 103 in Embodiment 1 to the above case, with reference to FIG. 33. FIG. 33 shows the structure of a P1 demodulation unit 800. The P1 demodulation unit 800 is provided with a P1 position detection unit 151, a P1 narrow band fc error detection and correction unit 152, a P1 orthogonal transformation unit 153U, a P1 orthogonal transformation unit 1536, a CDS table generation unit 154, a P1 wide band fc error detection and correction unit 801U, a P1 wide band fc error correction unit 8016, and a P1 decoding unit 156.

In addition to the functions of the P1 wide band fc error detection and correction unit 155U described in Embodiment 1, the P1 wide band fc error detection and correction unit 801U includes the function of outputting the detected wide band carrier frequency error amount to the P1 wide band fc error correction unit 801G.

Considering how the signal for the guard interval duration is the signal for the useful symbol duration with a frequency shift of $f_{SH}$, the P1 wide band fc error correction unit 801G adds one subcarrier to the wide band carrier frequency error amount input from the P1 wide band fc error detection and correction unit 801U and estimates that the resulting value is the wide band carrier frequency error amount for the combined guard interval duration of the P1 symbol. Based on the estimated wide band carrier frequency error amount, the P1 wide band fc error correction unit 801G corrects the shift for the wide band carrier frequency of the complex baseband signal in the frequency domain for the combined guard interval duration of the P1 symbol. The P1 wide band fc error correction unit 801G extracts only the active carriers from the complex baseband signal in the frequency domain whose shift for the wide band carrier frequency has been corrected and outputs the extracted active carriers to the P1 decoding unit 156.

(10) In the above embodiments, the narrow band carrier frequency error amount and the wide band carrier frequency error amount detected by the P1 demodulation units are output to the fc correction unit 102. The fc correction unit 102 uses these amounts when correcting the shift for carrier frequency. The present invention is not, however, limited in this way. When correcting the shift for carrier frequency, the fc correction unit 102 may be configured to use only one, or neither, of the narrow band carrier frequency error amount and the wide band carrier frequency error amount detected by the P1 demodulation units.

Furthermore, the method for the narrow band fc error calculation unit 105 and the wide band fc error calculation unit 107 to calculate the narrow band carrier frequency error amount and the wide band carrier frequency error amount in the P2 symbols and the data symbols is not particularly limited, and a well-known method may be adopted. For example, the narrow band carrier frequency error amount may be calculated from the phase difference between symbols of the pilot signals included in the P2 symbols and the data symbols in the signal output by the orthogonal transformation unit 106.

(11) In the above embodiments, an OFDM reception device conforming to the DVB-T2 transmission standard has been described, but the present invention is not limited in this way. For example, in a transmission standard using FEF periods within the DVB-T2 transmission standard, a P1 symbol is inserted at the top of an FEF period, and therefore the present invention may also be applied to an OFDM reception device or the like conforming to a transmission standard using an FEF period.

(12) The above embodiments make use of P1 symbols conforming to the DVB-T2 transmission format, but the present invention is not limited to P1 symbols. The present invention may also be applied to OFDM symbols that include a signal for a useful symbol duration generated based on transmission information and a signal for a guard interval duration generated based on the signal for the useful symbol duration.

For example, the signal for the guard interval duration is not limited to a signal yielded by shifting the frequency of the signal for the useful symbol duration by $f_{SH}$. The signal for the useful symbol duration need not be shifted in frequency, or may be shifted in frequency by an amount other than $f_{SH}$. Furthermore, the signal for the guard interval duration is not limited to a signal yielded by shifting the frequency of the entire signal for the useful symbol duration. The frequency of a portion of the signal for the useful symbol duration may be shifted, with the frequency of the remaining portion not being shifted.

The guard interval duration is not limited to being divided between the earlier guard interval duration and the later guard interval duration. The guard interval duration may be composed of only the earlier guard interval duration, or of only the later guard interval duration. Note that the guard interval duration may also be divided into three or more sections. For example, the useful symbol duration may be divided, and a section of the guard interval duration may be inserted between the sections of the useful symbol duration.

The time of the guard interval duration is not limited to matching the time of the useful symbol duration. These times may differ.

(13) In the above embodiments, the FFT size is 1 k, but the FFT size is not limited to 1 k and may be a different value (such as 2 k, 4 k, 8 k, or the like).

(14) The P1 decoding unit in the above embodiments descrambles the input signal of active carriers, but the P1 decoding unit is not limited in this way. For example, if scrambling is not applied at the transmitting end, the P1 decoding unit need not perform descrambling.

(15) In the above embodiments, differential demodulation is demodulation corresponding to DBPSK, but differential demodulation is not limited in this way. The differential demodulation may be demodulation corresponding to differential modulation other than DBPSK, such as Differential Quadrature Phase Shift Keying (DQPSK). In the above embodiments, an example of differential modulation is described, but the modulation need not be differential modulation.

(16) In Embodiment 1, of the two signals on which the multiplier 253 in the differential demodulation unit 202 performs complex multiplication, the signal sequence $DESCR_G$ for the combined guard interval duration is delayed by one active carrier, but the present invention is not limited in this way. The signal sequence $DESCR_U$ for the useful symbol duration may be delayed by one active carrier.

For example, when the frequency of the signal for the guard interval duration on either side of the useful symbol duration (the combined guard interval duration) is shifted to be higher than the signal for the useful symbol duration, as in the DVB-T2 transmission standard, then it is preferable for the signal sequence $DESCR_G$ for the combined guard interval duration to be delayed by one active carrier.

On the other hand, when the frequency of the signal for the guard interval duration on either side of the useful symbol duration is shifted to be lower than the signal for the useful symbol duration, unlike the DVB-T2 transmission standard, then it is preferable for the signal sequence $DESCR_U$ for the useful symbol duration to be delayed by one active carrier.

Note that in the above cases, instead of delaying the signal that is described as being delayed, the signal other than the signal described as being delayed may be moved forward by one active carrier.

(17) Each of the constituent elements in the reception device of each of the above embodiments may be implemented as an LSI, which is an integrated circuit. In this case, the constituent elements may respectively be made into discrete chips, or part or all of the components may be made into one chip. While described here as an LSI, depending on the degree of integration, the terms IC, system LSI, super LSI, or ultra LSI are also used. In addition, the method for assembling integrated circuits is not limited to LSI, and a dedicated circuit or a general-purpose processor may be used. A Field Programmable Gate Array (FPGA) or a reconfigurable processor, which allows reconfiguration of the connection and setting of circuit cells inside the LSI, may be used. Furthermore, if technology for assembling integrated circuits that replace LSIs emerges, owing to advances in semiconductor technology or to another derivative technology, the integration of functional blocks may naturally be accomplished using such technology. The application of biotechnology or the like is possible.

(18) At least a portion of the procedures for operations by the reception device described in the above embodiments may be listed in a reception program. For example, a Central Processing Unit (CPU) may read the program from a memory and execute the program, or the program may be stored on a recording medium for distribution or the like.

(19) A reception device may be implemented to perform at least a portion of the reception processing by the reception device in the above embodiments.

(20) The above embodiments may be achieved by combining any reception device, reception method, reception circuit, or program for performing a portion of the reception processing achieved by the above embodiments. For example, the embodiments may be achieved as follows. A portion of the structure of the reception device described in the above embodiments may be achieved by a reception device or an integrated circuit, whereas the procedures for operations performed by the remaining structures may be listed in a reception program and stored in memory. A CPU, for example, may then read and execute the reception program.

(21) The contents of the above embodiments and the like may be combined freely.

INDUSTRIAL APPLICABILITY

The present invention can be used in an OFDM reception device that receives OFDM symbols including a signal for a useful symbol duration generated based on transmission information and a signal for a guard interval duration generated based on the signal for the useful symbol duration.

REFERENCE SIGNS LIST 30 demodulation unit
103 P1 demodulation unit
151 P1 position detection unit
152 P1 narrow band fc error detection and correction unit
153U P1 orthogonal transformation unit
153G P1 orthogonal transformation unit
154 CDS table generation unit
155U P1 wide band fc error detection and correction unit
155G P1 wide band fc error detection and correction unit
156 P1 decoding unit
201U descrambling unit
201G descrambling unit
202 differential demodulation unit
203 pattern matching unit
251 delay unit
252 complex conjugate calculation unit
253 multiplier
254 hard decision unit

The invention claimed is:

1. An OFDM reception device for receiving an OFDM symbol that includes a signal for a useful symbol duration generated based on transmission information and a signal for a guard interval duration generated based on the signal for the useful symbol duration, comprising:
a first orthogonal transformation unit configured to perform an orthogonal transformation on the signal for the useful symbol duration;
a second orthogonal transformation unit configured to perform an orthogonal transformation on the signal for the guard interval duration; and
a decoding unit configured to decode the OFDM symbol in accordance with results of the orthogonal transformation by the first orthogonal transformation unit and results of the orthogonal transformation by the second orthogonal transformation unit, wherein
the OFDM symbol is a P1 symbol in a DVB-T2 transmission scheme,
the guard interval duration is composed of an earlier guard interval duration that is earlier than the useful symbol duration and a later guard interval duration that is after the useful symbol duration, and
the second orthogonal transformation unit combines a signal for the earlier guard interval duration and a signal for the later guard interval duration, and performs the orthogonal transformation by orthogonally transforming a signal that is a combination of the signal for the earlier guard interval duration and the signal for the later guard interval duration.

2. An OFDM reception device for receiving an OFDM symbol that includes a signal for a useful symbol duration generated based on transmission information and a signal for a guard interval duration generated based on the signal for the useful symbol duration, comprising:
a first orthogonal transformation unit configured to perform an orthogonal transformation on the signal for the useful symbol duration;
a second orthogonal transformation unit configured to perform an orthogonal transformation on the signal for the guard interval duration; and
a decoding unit configured to decode the OFDM symbol in accordance with results of the orthogonal transformation by the first orthogonal transformation unit and results of the orthogonal transformation by the second orthogonal transformation unit, wherein
the signal for the useful symbol duration and the signal for the guard interval duration are differentially modulated in a subcarrier direction, and
the decoding unit includes:
a differential demodulation unit configured to perform differential demodulation in accordance with the results of the orthogonal transformation by the first orthogonal transformation unit and the results of the orthogonal transformation by the second orthogonal transformation unit; and
a transmission information estimation unit configured to estimate the transmission information in accordance with results of the differential demodulation by the differential demodulation unit.

3. The OFDM reception device of claim 2, wherein
the differential demodulation unit performs the differential demodulation by using the results of the orthogonal transformation by the first orthogonal transformation unit and the results of the orthogonal transformation by the second orthogonal transformation unit without adding the results of the orthogonal transformation by the first orthogonal transformation unit and the results of the orthogonal transformation by the second orthogonal transformation unit.

4. The OFDM reception device of claim 3, wherein
the differential demodulation unit performs the differential demodulation using results of adding the results of the orthogonal transformation by the first orthogonal transformation unit and the results of the orthogonal transformation by the second orthogonal transformation unit.

5. An OFDM reception device for receiving an OFDM symbol that includes a signal for a useful symbol duration generated based on transmission information and a signal for a guard interval duration generated based on the signal for the useful symbol duration, comprising:
a first orthogonal transformation unit configured to perform an orthogonal transformation on the signal for the useful symbol duration;
a second orthogonal transformation unit configured to perform an orthogonal transformation on the signal for the guard interval duration; and
a decoding unit configured to decode the OFDM symbol in accordance with results of the orthogonal transformation by the first orthogonal transformation unit and results of the orthogonal transformation by the second orthogonal transformation unit, wherein the signal for the useful symbol duration and the signal for the guard interval duration are differentially modulated in a subcarrier direction, and the decoding unit includes:

a differential demodulation unit configured to perform differential demodulation in accordance with the results of the orthogonal transformation by the first orthogonal transformation unit and the results of the orthogonal transformation by the second orthogonal transformation unit, and to perform one of (i) differential demodulation in accordance with only the results of the orthogonal transformation by the first orthogonal transformation unit and (ii) differential demodulation in accordance with only the results of the orthogonal transformation by the second orthogonal transformation unit; and a transmission information estimation unit configured to estimate the transmission information in accordance with results of the differential demodulation by the differential demodulation unit.

6. The OFDM reception device of claim 5, wherein the differential demodulation in accordance with the results of the orthogonal transformation by the first orthogonal transformation unit and the results of the orthogonal transformation by the second orthogonal transformation unit is at least one of (i) differential demodulation using the results of the orthogonal transformation by the first orthogonal transformation unit and the results of the orthogonal transformation by the second orthogonal transformation unit without adding the results of the orthogonal transformation by the first orthogonal transformation unit and the results of the orthogonal transformation by the second orthogonal transformation unit, and (ii) differential demodulation using results of adding the results of the orthogonal transformation by the first orthogonal transformation unit and the results of the orthogonal transformation by the second orthogonal transformation unit.

7. An OFDM reception device for receiving an OFDM symbol that includes a signal for a useful symbol duration generated based on transmission information and a signal for a guard interval duration generated based on the signal for the useful symbol duration, comprising:

a first orthogonal transformation unit configured to perform an orthogonal transformation on the signal for the useful symbol duration;

a second orthogonal transformation unit configured to perform an orthogonal transformation on the signal for the guard interval duration; and a decoding unit configured to decode the OFDM symbol in accordance with results of the orthogonal transformation by the first orthogonal transformation unit and results of the orthogonal transformation by the second orthogonal transformation unit, wherein the signal for the useful symbol duration and the signal for the guard interval duration are differentially modulated in a subcarrier direction, the signal for the useful symbol duration and the signal for the guard interval duration are each composed of a plurality of active carriers and a plurality of null carriers, a physical subcarrier interval between adjacent active carriers is not constant, and the decoding unit includes:

a differential demodulation unit configured to perform differential demodulation in accordance with the results of the orthogonal transformation by the first orthogonal transformation unit and the results of the orthogonal transformation by the second orthogonal transformation unit; and a transmission information estimation unit configured to estimate the transmission information in accordance with results of the differential demodulation by the differential demodulation unit by applying weights such that the weights decrease for larger physical subcarrier intervals.

8. An OFDM reception device for receiving an OFDM symbol that includes a signal for a useful symbol duration generated based on transmission information and a signal for a guard interval duration generated based on the signal for the useful symbol duration, comprising:

an adding unit configured to perform addition on the signal for the useful symbol duration and the signal for the guard interval duration;

an orthogonal transformation unit configured to perform an orthogonal transformation on results of the addition by the adding unit; and a decoding unit configured to decode the OFDM symbol in accordance with results of the orthogonal transformation by the orthogonal transformation unit, wherein a portion or entirety of the signal for the guard interval duration is a frequency-shifted portion or entirety of the useful symbol duration, the OFDM symbol is a P1 symbol in a DVB-T2 transmission scheme, the guard interval duration is composed of an earlier guard interval duration that is earlier than the useful symbol duration and a later guard interval duration that is after the useful symbol duration, and the adding unit combines a signal for the earlier guard interval duration and a signal for the later guard interval duration, and performs the addition using a signal that is a combination of the signal for the earlier guard interval duration and the signal for the later guard interval duration.

9. An OFDM reception device for receiving an OFDM symbol that includes a signal for a useful symbol duration generated based on transmission information and a signal for a guard interval duration generated based on the signal for the useful symbol duration, comprising:

an adding unit configured to perform addition on the signal for the useful symbol duration and the signal for the guard interval duration;

an orthogonal transformation unit configured to perform an orthogonal transformation on results of the addition by the adding unit; and a decoding unit configured to decode the OFDM symbol in accordance with results of the orthogonal transformation by the orthogonal transformation unit, wherein a portion or entirety of the signal for the guard interval duration is a frequency-shifted portion or entirety of the useful symbol duration, the OFDM reception device further comprises a first orthogonal transformation unit configured to perform an orthogonal transformation on the signal for the useful symbol duration, the decoding unit includes:

a differential demodulation unit configured to perform (i) differential demodulation in accordance with only the results of the orthogonal transformation by the orthogonal transformation unit and (ii) differential demodulation in accordance with only results of the orthogonal transformation by the first orthogonal transformation unit; and a transmission information estimation unit configured to estimate the transmission information in accordance with results of the differential demodulation by the differential demodulation unit, the OFDM reception device further comprises
a second orthogonal transformation unit configured to perform an orthogonal transformation on the signal for the guard interval duration, and the differential demodulation unit additionally performs differential demodulation in accordance with only results of the orthogonal transformation by the second orthogonal transformation unit.

10. The OFDM reception device of claim 9, wherein
the differential demodulation unit additionally performs differential demodulation in accordance with the results of the orthogonal transformation by the first orthogonal transformation unit and the results of the orthogonal transformation by the second orthogonal transformation unit.

11. An OFDM reception device for receiving an OFDM symbol that includes a signal for a useful symbol duration generated based on transmission information and a signal for a guard interval duration generated based on the signal for the useful symbol duration, comprising:

an adding unit configured to perform addition on the signal for the useful symbol duration and the signal for the guard interval duration;

an orthogonal transformation unit configured to perform an orthogonal transformation on results of the addition by the adding unit; and a decoding unit configured to decode the OFDM symbol in accordance with results of the orthogonal transformation by the orthogonal transformation unit, wherein a portion or entirety of the signal for the guard interval duration is a frequency-shifted portion or entirety of the useful symbol duration, the OFDM reception device further comprises
a first orthogonal transformation unit configured to perform an orthogonal transformation on the signal for the useful symbol duration, the decoding unit includes:
a differential demodulation unit configured to perform (i) differential demodulation in accordance with only the results of the orthogonal transformation by the orthogonal transformation unit and (ii) differential demodulation in accordance with only results of the orthogonal transformation by the first orthogonal transformation unit; and
a transmission information estimation unit configured to estimate the transmission information in accordance with results of the differential demodulation by the differential demodulation unit, the OFDM reception device further comprises
a second orthogonal transformation unit configured to perform an orthogonal transformation on the signal for the guard interval duration, and the differential demodulation unit additionally performs differential demodulation in accordance with the results of the orthogonal transformation by the first orthogonal transformation unit and results of the orthogonal transformation by the second orthogonal transformation unit.

12. An OFDM reception device for receiving an OFDM symbol that includes a signal for a useful symbol duration generated based on transmission information and a signal for a guard interval duration generated based on the signal for the useful symbol duration, comprising:

an adding unit configured to perform addition on the signal for the useful symbol duration and the signal for the guard interval duration;

an orthogonal transformation unit configured to perform an orthogonal transformation on results of the addition by the adding unit; and a decoding unit configured to decode the OFDM symbol in accordance with results of the orthogonal transformation by the orthogonal transformation unit, wherein a portion or entirety of the signal for the guard interval duration is a frequency-shifted portion or entirety of the useful symbol duration, the OFDM reception device further comprises
a first orthogonal transformation unit configured to perform an orthogonal transformation on the signal for the guard interval duration, the decoding unit includes:
a differential demodulation unit configured to perform (i) differential demodulation in accordance with only the results of the orthogonal transformation by the orthogonal transformation unit and (ii) differential demodulation in accordance with only results of the orthogonal transformation by the first orthogonal transformation unit; and
a transmission information estimation unit configured to estimate the transmission information in accordance with results of the differential demodulation by the differential demodulation unit, the OFDM reception device further comprises
a second orthogonal transformation unit configured to perform an orthogonal transformation on the signal for the useful symbol duration, and the differential demodulation unit additionally performs differential demodulation in accordance with the results of the orthogonal transformation by the first orthogonal transformation unit and results of the orthogonal transformation by the second orthogonal transformation unit.

13. An OFDM reception device for receiving an OFDM symbol that includes a signal for a useful symbol duration generated based on transmission information and a signal for a guard interval duration generated based on the signal for the useful symbol duration, comprising:

an adding unit configured to perform addition on the signal for the useful symbol duration and the signal for the guard interval duration;

an orthogonal transformation unit configured to perform an orthogonal transformation on results of the addition by the adding unit; and a decoding unit configured to decode the OFDM symbol in accordance with results of the orthogonal transformation by the orthogonal transformation unit, wherein a portion or entirety of the signal for the guard interval duration is a frequency-shifted portion or entirety of the useful symbol duration, the OFDM reception device further comprises
a first orthogonal transformation unit configured to perform an orthogonal transformation on the signal for the useful symbol duration; and
a second orthogonal transformation unit configured to perform an orthogonal transformation on the signal for the guard interval duration, and the decoding unit includes:
a differential demodulation unit configured to perform (i) differential demodulation in accordance with only the results of the orthogonal transformation by the orthogonal transformation unit and (ii) differential demodulation in accordance with results of the orthogonal transformation by the first orthogonal transformation unit and results of the orthogonal transformation by the second orthogonal transformation unit; and a transmission information estimation unit configured to estimate the transmission information in accordance with results of the differential demodulation by the differential demodulation unit.

14. An OFDM reception device for receiving an OFDM symbol that includes a signal for a useful symbol duration generated based on transmission information and a signal for a guard interval duration generated based on the signal for the useful symbol duration, comprising:

an adding unit configured to perform addition on the signal for the useful symbol duration and the signal for the guard interval duration;

an orthogonal transformation unit configured to perform an orthogonal transformation on results of the addition by the adding unit; and a decoding unit configured to decode the OFDM symbol in accordance with results of the orthogonal transformation by the orthogonal transformation unit, wherein a portion or entirety of the signal for the guard interval duration is a frequency-shifted portion or entirety of the useful symbol duration, the signal for the useful symbol duration and the signal for the guard interval duration are differentially modulated in a subcarrier direction, the signal for the useful symbol duration and the signal for the guard interval duration are each composed of a plurality of active carriers and a plurality of null carriers, a physical subcarrier interval between adjacent active carriers is not constant, and the decoding unit includes:

a differential demodulation unit configured to perform differential demodulation in accordance with the results of the orthogonal transformation by the orthogonal transformation unit; and a transmission information estimation unit configured to estimate the transmission information in accordance with results of the differential demodulation by the differential demodulation unit by applying weights such that the weights decrease for larger physical subcarrier intervals.

15. An OFDM reception device for receiving an OFDM symbol that includes a signal for a useful symbol duration generated based on transmission information and a signal for a guard interval duration composed of a plurality of guard interval duration segments that are generated based on the signal for the useful symbol duration and are temporally discontinuous, comprising:

an orthogonal transformation unit configured to combine the plurality of guard interval duration segments so that the signal for the guard interval duration is temporally continuous and to perform an orthogonal transformation on results of combination; and a decoding unit configured to decode the OFDM symbol in accordance with results of the orthogonal transformation by the orthogonal transformation unit.

16. An OFDM reception method used in an OFDM reception device for receiving an OFDM symbol that includes a signal for a useful symbol duration generated based on transmission information and a signal for a guard interval duration generated based on the signal for the useful symbol duration, comprising:

a first orthogonal transformation step of performing an orthogonal transformation on the signal for the useful symbol duration;

a second orthogonal transformation step of performing an orthogonal transformation on the signal for the guard interval duration; and a decoding step of decoding the OFDM symbol in accordance with results of the orthogonal transformation in the first orthogonal transformation step and results of the orthogonal transformation in the second orthogonal transformation step, the OFDM symbol is a P1 symbol in a DVB-T2 transmission scheme, the guard interval duration is composed of an earlier guard interval duration that is earlier than the useful symbol duration and a later guard interval duration that is after the useful symbol duration, and the second orthogonal transformation step combines a signal for the earlier guard interval duration and a signal for the later guard interval duration, and performs the orthogonal transformation by orthogonally transforming a signal that is a combination of the signal for the earlier guard interval duration and the signal for the later guard interval duration.

17. An OFDM reception method used in an OFDM reception device for receiving an OFDM symbol that includes a signal for a useful symbol duration generated based on transmission information and a signal for a guard interval duration generated based on the signal for the useful symbol duration, comprising:

an adding step of performing addition on the signal for the useful symbol duration and the signal for the guard interval duration;

an orthogonal transformation step of performing an orthogonal transformation on results of the addition in the adding step; and a decoding step of decoding the OFDM symbol in accordance with results of the orthogonal transformation in the orthogonal transformation step, wherein a portion or entirety of the signal for the guard interval duration is a frequency-shifted portion or entirety of the useful symbol duration, the OFDM symbol is a P1 symbol in a DVB-T2 transmission scheme, the guard interval duration is composed of an earlier guard interval duration that is earlier than the useful symbol duration and a later guard interval duration that is after the useful symbol duration, and the adding unit combines a signal for the earlier guard interval duration and a signal for the later guard interval duration, and performs the addition using a signal that is a combination of the signal for the earlier guard interval duration and the signal for the later guard interval duration.

18. An OFDM reception method used in an OFDM reception device for receiving an OFDM symbol that includes a signal for a useful symbol duration generated based on transmission information and a signal for a guard interval duration generated based on the signal for the useful symbol duration, comprising:

a first orthogonal transformation step of performing an orthogonal transformation on the signal for the useful symbol duration;

a second orthogonal transformation step of performing an orthogonal transformation on the signal for the guard interval duration; and a decoding step of decoding the OFDM symbol in accordance with results of the orthogonal transformation in the first orthogonal transformation step and results of the orthogonal transformation in the second orthogonal transformation step, wherein the signal for the useful symbol duration and the signal for the guard interval duration are differentially modulated in a subcarrier direction, and the decoding step includes:
- a differential demodulation step of performing differential demodulation in accordance with the results of the orthogonal transformation in the first orthogonal transformation step and the results of the orthogonal transformation in the second orthogonal transformation step; and
- a transmission information estimation step of estimating the transmission information in accordance with results of the differential demodulation in the differential demodulation step.

* * * * *